United States Patent [19]

Tredennick et al.

[11] 4,342,078

[45] Jul. 27, 1982

[54] INSTRUCTION REGISTER SEQUENCE DECODER FOR MICROPROGRAMMED DATA PROCESSOR AND METHOD

[75] Inventors: Harry L. Tredennick; Thomas G. Gunter, both of Austin, Tex.

[73] Assignee: Motorola, Inc., Schaumburg, Ill.

[21] Appl. No.: 41,202

[22] Filed: May 21, 1979

[51] Int. Cl.³ .............................................. G06F 9/26
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,585,600 | 6/1971 | Saltini | 364/200 |
| 3,636,522 | 1/1972 | Buschmann et al. | 364/200 |
| 3,958,221 | 5/1976 | Serra et al. | 364/200 |
| 3,990,054 | 11/1976 | Perlowski | 364/200 |
| 3,991,404 | 11/1976 | Brioschi et al. | 364/200 |
| 4,037,202 | 7/1977 | Terzian | 364/200 |
| 4,075,687 | 2/1978 | Nissen et al. | 364/200 |
| 4,110,822 | 8/1978 | Porter et al. | 364/200 |
| 4,131,943 | 12/1978 | Shiraogawa | 364/200 |
| 4,155,120 | 5/1979 | Keefer et al. | 364/200 |
| 4,159,520 | 6/1979 | Prioste | 364/200 |
| 4,160,289 | 7/1979 | Bambara et al. | 364/200 |
| 4,173,041 | 10/1979 | Dvorak et al. | 364/200 |

Primary Examiner—Gareth D. Shaw
Assistant Examiner—Thomas M. Heckler
Attorney, Agent, or Firm—Anthony J. Sarli, Jr.

[57] ABSTRACT

A data processor which includes an instruction register for storing a macroinstruction to be executed, a decoder responsive to the stored macroinstruction for generating two or more starting addresses, and a selector which receives the starting addresses generated by the decoder and which selects one of the starting addresses as a next address in response to one or more selection signals. The data processor also includes a control structure which receives the next address chosen by the selector and which selects one of the starting addresses as a next address in response to one or more selection signals. The data processor also icludes a control structure which receives the next address chosen by the selector and which, in response to the next address, derives the selection signals to which the selector will respond in order to select a subsequent next address. The decoder and selector may be adapted such that an additional starting address is provided to the selector such that the selector chooses this additional starting address regardless of the condition of the one or more selection signals generated by the control structure. The control structure may be implemented with a microprogrammed control store containing a plurality of microinstruction routines each having a corresponding starting address such that the starting addresses generated by the decoder correspond to various microinstruction routines contained in the microprogrammed control store.

11 Claims, 59 Drawing Figures

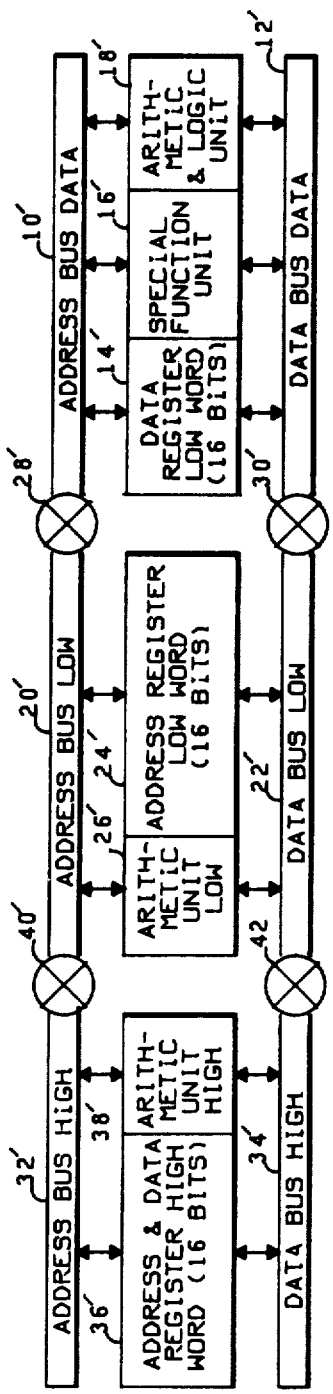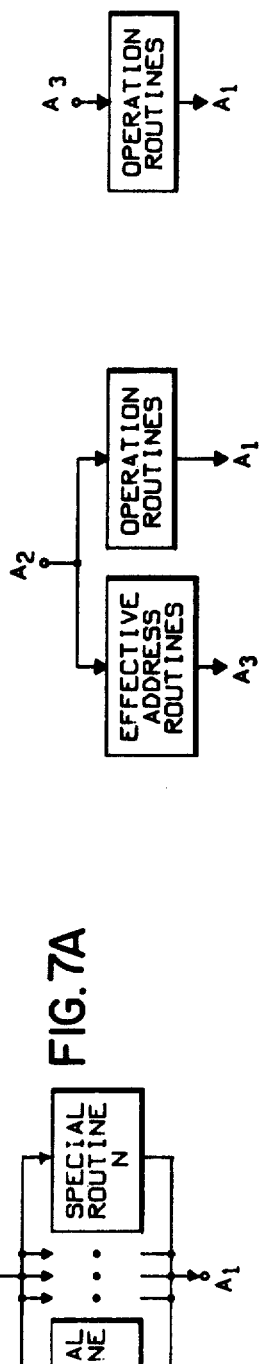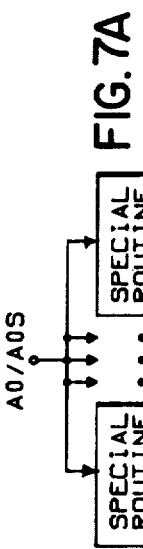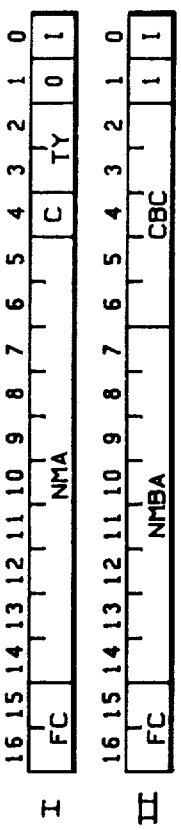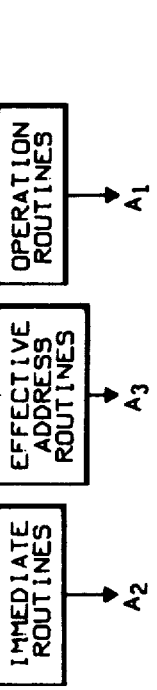

FIG. 10A

*Opcode decode table indexed by address bits A9A8, A7A6, A5A4 (rows) and A3A2, A1A0 (columns).*

Lower grid (A9A8 = 00):

| A7A6\A5A4 / A3A2 A1A0 | 00 00 | 00 01 | 00 10 | 00 11 | 01 00 | 01 01 | 01 10 | 01 11 | 10 00 | 10 01 | 10 10 | 10 11 | 11 00 | 11 01 | 11 10 | 11 11 |
|---|---|---|---|---|---|---|---|---|---|---|---|---|---|---|---|---|
| 00 00 | rstp1 M1 | dvumb M1 halt1 | zzz1d M1 | bser1 M1 | rtr4 I1 | sftm2 I1 | mpiw4 I1 | srr15 I1 | mmdw1 MI2 | mmmw1 MI2 | mmrl1 MI2 | stop1 MI2 | asx16 I1 | asx17 I1 | asx18 I1 | asxw5 I1 |
| 00 01 | | | | | rcal3 B1 bbci2 | mpow2 I1 | mpow3 I1 | dvs16 B1 | bbcw3 MB | stmr5 MB | mrgw1 M2 MB MI2 | leaa1 MI2 | | | | dvs16 B1 dvs1d |
| 00 10 | malw2 I1 | mmrw2 B1 | trpv3 B1 | mmiw2 I1 | | | | | | | | | bbci3 B1 | stmr4 B1 | trpv2 B1 | |

Upper grid (A9A8 = 01, A7A6 = 00):

| A5A4 / A3A2 A1A0 | 00 00 | 00 01 | 00 10 | 00 11 | 01 00 | 01 01 | 01 10 | 01 11 | 10 00 | 10 01 | 10 10 | 10 11 | 11 00 | 11 01 | 11 10 | 11 11 |
|---|---|---|---|---|---|---|---|---|---|---|---|---|---|---|---|---|
| 00 | adrw1 I1 | ads13 I1 | aixw0 ldmx1 I1 | asbb5 I1 | stiw2 I1 | stiw3 I1 | stiw4 I1 | stmd3 I1 | mmd11 MI | mmm11 MI | mmi11 MI | rset1 MI | bbcw1 I1 | bcsm1 I1 | bcsm2 I1 | cmmwx I1 |
| 01 | | | | | leaa2 B1 | rset5 B1 | mrq12 I1 | sma13 I1 | rca13 M2 | stmr6 M2 | mrg11 MI | lusp1 MI | dvuma I1 | rset3 B1 | paaw1 I1 | ldmx4 B1 |
| 10 | | mmm12 I1 | mmmw2 I1 | mmrw3 I1 | ldmx3 B1 | | | | | | | | | | | |

| | | 00 | 01 | 10 | 11 | | 00 | 01 | 10 | 11 |
|---|---|---|---|---|---|---|---|---|---|---|
| | | | MI3 | MI4 | MI3 | MI3 | | MI | MI | MI | MI |
| 00 | 00 | asxw2 | roaw1 | asxw3 | ldmr2 | 00 | asx13 | roal1 | asx14 | unlk1 |
| | 01 | dvumb MB3 chkr3 | mmxw1 | nnrw1 | trap3 | | rset4 M | mmx11 MI | nnrl1 MI | bser3 MI |
| | 10 | aixw2 MB4 | bsri2 MI4 | aixw1 MI4 | exge1 MI4 | | aixl2 MB | bsrw2 MI | aixl1 MI | btsr1 MI |
| | 11 | aixw2 M3 zzz14 | malw3 MI3 popm1 | rmdw2 MI2 | zzz1b MI4 | | leax2 MB | ldmr1 MI | rmd13 MI | zzz1c MI |
| 01 | 00 | | | | | | | | | |
| | 01 | chkr4 B1 | dvur3 I1 | nnml2 I1 | tasr1 I1 | | peax5 I1 | maw13 I1 | stmx2 I1 | ldmd3 I1 |
| | 10 | | | | | | | | | |
| | 11 | exge1 I1 susp1 | bsri1 I1 | bsrw1 I1 | pinw2 I1 | | btsr2 I1 | chkm1 I1 | chkr1 I1 | chkr2 I1 |
| 10 | 00 | | | | | | | | | |
| | 01 | | | | | | | | | |
| | 10 | | | | | | | | | |
| | 11 | | | | | | | | | |
| 11 | 00 | trac1 M5 | rorw1 MI7 | adsw1 MI6 | romw1 MI6 | | itlx1 M | rorl1 MI | adsl1 MI | romm1 MI |
| | 01 | trap1 MB | cprw1 MI | mpiw1 MI | cpmw1 MI | | stiw1 M | cprl1 MI | mpil1 MI | cpml1 MI |
| | 10 | aixw4 MB8 | malw3 MI8 | ablw1 MI8 | aixw∅ MI8 | | asx15 MB | smal1 MI | abl11 MI | aixl∅ MI |
| | 11 | zzz15 | stmd1 | jsal1 | jsrx∅ MI | | leax3 MB | ldmx∅ MI | jmal1 MI | jmpx∅ MI |

FIG. 10B CONTINUED

Top table (11 / 11):

| | 00 | 01 | 10 | 11 |
|---|---|---|---|---|
| | zzz00 | rcal1 (MI) | zzz01 | zzz02 |
| | zzz03 | rmxl1 (MI) | zzz04 | zzz05 |
| | rmx12 (MB) | peax6 (MI) | peax1 (MI) | bcsr1 (MI) |
| | stmx4 (MB) | zzz08 | zzz09 | zzz0a |
| | mpil2 (MI) | bbci1 (MI) | stmx3 (MI) | nnml1 (MI) |
| | dvs02 (MI) | pinl1 (MI) | dvs01 (MI) | sccr1 (MI) |
| | zzz06 | rbrb1 (MI) | mpol1 (MI) | cpmm1 (MI) |
| | zzz0f | zzz10 | zzz11 | zzz12 |
| | rmx13 (MB) | smaw1 (MI) | rall1 (MI) | rmx10 (MI) |
| | stmx5 (MB) | ldmd1 (MI) | unlk2 (MI) | peax0 (MI) |

Bottom table (10 / 10):

| | 00 | 01 | 10 | 11 |
|---|---|---|---|---|
| | asbb2 (MI) | reaw1 (MI) | asbb3 (MI) | popm2 (MI) |
| | itlx6 (M) | rmxw1 (MI) | nbcr1 (MI) | bser5 (MI) |
| | rmxw2 (MB) | paaw2 (MI) | leax1 (MI) | bclr1 (MI) |
| | peax2 (MB) | rtr2 (MI) | zzz06 | zzz07 |
| | mpiw2 (MI2) | dcnt1 (MI2) | aixw1 / ldmx2 (MI2) | nnmw1 (MI2) |
| | dvum1 (MI2) | adrl1 (MI2) | dvur1 (MI2) | sccb1 (MI2) |
| | strw1 (M) | rorm1 (MI) | mpow1 (MI) | roml1 (MI) |
| | zzz0c | cprm1 (MI) | zzz0d | zzz0e |
| | rmxw3 (MB) | lmal1 (MI) | ralw1 (MI) | rmxw0 (MI) |
| | peax3 (MB) | lmaw1 (MI) | paal1 (MI) | leax0 (MI) |

| | 00 | 01 | 10 | 11 |
|---|---|---|---|---|
| | dvum5 B1 / dvs12 | dvumb B1 / dvs0e | dvum2 I1 | pinw1 I1 |
| | rstp2 I1 | rstp5 I1 | rstw1 I1 | rts3 I1 |
| | dvs13 B1 | dvs14 I1 | dvum0 I1 | push2 I1 |
| | nbcr3 B1 | peaa1 I1 | pead1 I1 | pinl2 I1 |
| | dvs0f MB | lmal2 MI | dvs09 MB | trap5 MB |
| | rstp4 MI | rmdl2 MI | ral12 MI | raql1 MI |
| | dvs0a MB | dvs0d MB | dvumz MB | dvs0c M |
| | srrw3 MB2 | jmpx1 MI | trap6 MI | mmil2 MI |

I1 = 10

| | 00 | 01 | 10 | 11 |
|---|---|---|---|---|
| | jmal2 I1 | dvume I1 / dvs08 | dvs11 I1 | pinl3 I1 |
| | rrgl2 I1 | rrgm1 I1 | rrgw2 I1 | rset2 I1 |
| | dvum9 B1 | dvum9 B1 / dvumc | dvs1c B1 | dvum7 B1 / dvum8 |
| | srrl4 B1 | jsaw1 I1 | jsaw2 I1 | jsaw3 I1 |
| | dvume MB2 | e#11 MI2 | dvum5 MB2 | itlx4 MI2 |
| | rstp3 MI2 | ral13 MI2 | ralw2 MI2 | raqw1 MI2 |
| | dvum6 MB2 | dvumb MB2 | mmrw2 MB2 / dvum4 | dvum7 MB2 |
| | srrl3 MB | jsrx1 MI2 | ldmd4 MI2 | mmrl2 MI2 |

|  | 00 | 01 | 10 | 11 |
|---|---|---|---|---|
| 10 | tmrl3 (I1) | roal2 (I1) | roal3 (I1) | roal4 (I1) |
|  | mmfw2D81 / mmaw2 | bcsr5 (I1) | bser4 (I1) | bser6 (I1) |
|  | adrl2 (I1) | morl2 (I1) | stmw1 (I1) | btsi1 (I1) |
|  | bclm2 (I1) | mawl2 (I1) | lmaw2 (I1) | ablw3 (I1) |
|  | mmrw1 (MI2) | mmxw0 (MI2) | morw1 (MI2) | maww2 (MI2) |
|  | ldmr4 (MB2) | jsaw0 (MI2) | Ofw1 (MI2) | jsrd1 (MI2) |
|  | asxl1 (MI) | rrgl1 (MI) | nbcr2 (MI) | rtr1 (MI) |
|  | ldmr3 (MB) | stmd2 (MI) | sftm1 (MI) | rorm2 (M) |

|  | 00 | 01 | 10 | 11 |
|---|---|---|---|---|
| 11 | toml2 (I1) | toml3 (I1) | rorl3 (I1) | rorm3 (I1) |
|  | popm6 (BI) | bsrt3 (I1) | bsrw3 (I1) | btsm1 (I1) |
|  | ZZZ17 | ZZZ18 | ZZZ19 | ZZZ1a |
|  | ZZZ1e | ZZZ1f | ZZZ20 | ZZZ21 |
|  | mmiw1 (MI) | mmxl0 (MI) | morl1 (MI) | morw2 (MI) |
|  | popm4 (MB) | jmaw1 (M) | laal2 (M) | jmpd1 (M) |
|  | asbb1 (MI) | tsrl1 (MI) | ZZZ22 (MI) | rts1 (MI) |
|  | popm3 (MB) | ZZZ23 | ZZZ24 | mulm2 (M) |

| | 00 | 01 | 10 | 11 |
|---|---|---|---|---|
| 00 0000 00 | rstp1 m | dvumb dm | zzz1d m | bser1 m |
| 00 0000 01 | adrw1 | adsl3 | aixw0 d | asbb5 |
| 00 0000 10 | push6 | rbrb3 | rcal2 | rlql1 |
| 00 0000 11 | rmil2 | rmil3 | rmml2 | rmrl2 |
| 00 0100 00 | rtr4 | sftm2 | mpiw4 | srr15 |
| 00 0100 01 | stiw2 | stiw3 | stiw4 | stmd3 |
| 00 0100 10 | stmr2 | stmw2 | stmx1 | strw2 |
| 00 0100 11 | swap1 | swap2 | tasm1 | tasm2 |
| 00 1000 0x | mmdw1 | mmmw1 | mmrl1 | stop1 |
| 00 1000 10 | tasr2 | trap2 | trap4 | tsml2 |
| 00 1000 11 | tsrl2 | unlk3 | unlk4 | link3 |
| 00 1100 00 | asx16 | asx17 | asx18 | asxw5 |
| 00 1100 01 | bbcw1 | bcsm1 | bcsm2 | cmmw4 |
| 00 1100 10 | cpdl2 | cpml2 | cprl2 | cprm2 |
| 00 1100 11 | dcnt2 | jmpa1 | jsal2 | malw1 |
| 01 0000 xx | asxw2 | roaw1 | asxw3 | ldmr2 |

FIG. 11A

|  | 00 | 01 | 10 | 11 |
|---|---|---|---|---|
| 00 0010 00 | malw2 | mmrw2 b | trpv3 b | mmiw2 |
| 00 0010 01 | mmm12 | mmmw2 | mmrw3 | ldmx3 b |
| 00 0010 10 | mpi13 | mulm6 b | mpi14 | popm6 db |
| 00 0010 11 | mpiw3 | dvum3 b | mpol2 | mpol3 |
| 00 0110 00 | rcal3 db | mpow2 | mpow3 | dvs16 b |
| 00 0110 01 | leaa2 b | rset5 b | mrgl2 | smal3 |
| 00 0110 10 | mrgm1 | mulm3 b | btsr3 b | mstw1 |
| 00 0110 11 | dvs07 b | dvs05 b | mulm1 | mulr1 |
| 00 1010 0x | rcal3 b | stmr6 b | mrgw1 | leaa1 |
| 00 1010 10 | dvumf b | mulm5 b | bcsr3 b | push5 b |
| 00 1010 11 | nbcm1 | dvum3 db | nnrl2 | paal2 |
| 00 1110 00 | bbci3 b | stmr4 b | trpv2 b | dvs16 db |
| 00 1110 01 | dvuma | rset3 b | paaw1 | ldmx4 b |
| 00 1110 10 | dvumd b | mulm4 b | bcsr4 b | push4 b |
| 00 1110 11 | dvs10 b | trac1 db | pdc11 | pdc12 |
| 01 0000 xx | aixw2 b | bsri2 | aixw1 | exge1 |

FIG. 11B

|            | 00        | 01        | 10        | 11        |
|------------|-----------|-----------|-----------|-----------|
| 01 0001 xx | dvumb db  | mmxw1     | nnrw1     | trap3     |
| 01 0101 00 | chkr4 b   | dvur3     | nnml2     | tasr1     |
| 01 0101 01 | peax5     | maw13     | stmx2     | ldmd3     |
| 01 0101 1x | mpiw2     | dcnt1     | aixw1 d   | nnmw1     |
| 01 110x xx | trac1 b   | rorw1     | adsw1     | romw1     |
| 10 0001 0x | mmxw2 b   | jsrx2 b   | asxw4     | b         |
| 10 0001 10 | jma12     | dvume d   | dvs11     | pin13     |
| 10 0001 11 | dvum5 db  | dvumb db  | dvum2     | pinw1     |
| 10 0101 0x | cmmw2     | cpdw1     | ldmr5     | smaw3 b   |
| 10 0101 10 | dvum9 b   | dvum9 db  | dvs1c b   | dvum7 db  |
| 10 0101 11 | dvs13 b   | dvs14     | dvum0     | push2     |
| 10 1001 00 | jsra1     | jsrd2     | laaw1     | ldmx6     |
| 10 1001 01 | lead2     | pead2     | link1     | roaw2 b   |
| 10 1001 1x | dvume b   | e#11      | dvum5 b   | itlx4     |
| 10 1101 0x | mmxw3 b   | jsrx3 b   | rmrw1     | sccb2 b   |
| 10 1101 1x | dvum6 b   | dvumb b   | mmrw2 db  | dvum7 b   |

FIG. 11C

|  | 00 | 01 | 10 | 11 |
|---|---|---|---|---|
| 01 0011 xx | aixw2 db | malw3 d | rmdw2 | zzz1b |
| 01 0111 00 | exge1 d | bsri1 | bsrw1 | pinw2 |
| 01 0111 01 | btsr2 | chkm1 | chkr1 | chkr2 |
| 01 0111 1x | dvum1 | adrl1 | dvur1 | sccb1 |
| 01 111x xx | aixw4 b | malw3 | ablw1 | aixw0 |
| 10 0011 0x | ablw1 d | abl13 | rmmw1 | ablw2 |
| 10 0011 10 | rrgl2 | rrgm1 | rrgw2 | rset2 |
| 10 0011 11 | rstp2 | rstp5 | rstw1 | rts3 |
| 10 0111 0x | e#w1 | abww1 | dvs17 b | adsw2 |
| 10 0111 10 | srrl4 b | jsaw1 | jsaw2 | jsaw3 |
| 10 0011 11 | nbcr3 b | peaa1 | pead1 | pinl2 |
| 10 1011 00 | dvs06 | bcsr3 db | link4 | dvs03 db |
| 10 1011 01 | dvs15 | mall1 | mall2 | mall3 |
| 10 1010 1x | rstp3 | rall3 | ralw2 | raqw1 |
| 10 1111 0x | rmrl1 | bclr4 b | dvs03 | dvs1b b |
| 10 1111 1x | srrw3 b | jsrx1 | ldmd4 | mmrl2 |

FIG. 11D

|  | 00 | 01 | 10 | 11 |
|---|---|---|---|---|
| 11 0000 0x | asx12 | sriw1 | srrw1 | srrw2 |
| 11 0000 10 | rmr13 | roal2 | roal3 | roal4 |
| 11 0000 11 | rom12 | rom13 | ror13 | rorm3 |
| 11 0100 00 | cmm13 | cmm15 | cmm16 | cmm17 |
| 11 0100 01 | itlx2 | itlx3 | itlx5 | itlx7 |
| 11 0100 10 | adr12 | mor12 | stmw1 | btsi1 |
| 11 0100 11 | zzz17 | zzz18 | zzz19 | zzz1a |
| 11 1000 0x | lead1 | maqw1 | bcsr2 | maww1 |
| 11 1000 1x | mmrw1 | mmxw0 | morw1 | maww2 |
| 11 1100 xx | pdcw1 | rrgw1 | asbb6 | cmmw3 |

FIG. 11E

|  | 00 | 01 | 10 | 11 |
|---|---|---|---|---|
| 11 0010 0x | bclm1 | jsrd3 | cmmw1 | rcaw2 b |
| 11 0010 10 | mmrw2 db | bcsr5 | bser4 | bser6 |
| 11 0010 11 | popm6 b | bsri3 | bsrw3 | btsm1 |
| 11 0110 00 | exge2 | pdcw2 | extr1 | extr2 |
| 11 0110 01 | pead3 | leax4 | peax4 | adrw2 |
| 11 0110 10 | bclm2 | mawl2 | lmaw2 | ablw3 |
| 11 0110 11 | zzz1e | zzz1f | zzz20 | zzz21 |
| 11 1010 0x | trac2 | stmr1 | raww1 | rmdw1 |
| 11 1010 1x | ldmr4 b | jsaw0 | o#w1 | jsrd1 |
| 11 1110 xx | o#11 b | smaw2 | tsmw1 | rorl2 b |

ALU CONTROL TABLE

| oper | alu function | into cbit | c5'/1s | c4'/0/1 | c3'/msb | c2'/X' | c1'/1 | c0'/0 | csl' | cand' | cxor' | cor' | csr' | sub' | abdea' |
|------|--------------|-----------|--------|---------|---------|--------|-------|-------|------|-------|-------|------|------|------|--------|
| ext  | a7 → r8 — r15 | 0 → C   |        |         |         |        |       |       |      |       | x     |      |      |      | x      |
| addl | a + d + 1 → r | cm' → C |        |         |         |        | x     |       |      |       |       |      |      |      |        |
| add  | a + d → r     | cm → C  |        |         |         | x      |       | x     |      |       |       |      |      |      |        |
| addx | a + d + x → r | cm' → C |        |         |         |        |       | x     |      |       |       |      |      |      |        |
| sub  | d + a' + 1 → r| cm' → C |        |         |         |        | x     | x     |      |       |       |      |      |      |        |
| subx | d + a' + x' → r| cm' → C|        |         |         |        |       |       |      | x     | x     |      |      |      |        |
| sub0 | d + a' → r    | 0 → C   |        |         |         |        |       |       |      |       |       |      |      |      |        |
| and  | a ∧ d → r     | 0 → C   |        |         |         |        | x     | x     |      | x     |       |      |      |      |        |
| or   | a ∨ d → r     | 0 → C   |        |         |         |        |       | x     |      |       |       | x    |      |      |        |
| exor | ad → a'd'     |         |        |         |         |        |       |       |      |       |       |      |      |      |        |
| lss  | X → alu → alue → 0/1 | msb → C | x |    |         |        |       |       |      |       |       |      |      |      |        |
| lsr  | 0 → ... → x   | abd[0] → C |      |         |         |        | x     |       | x    | x     |       |      | x    |      |        |
| lsl  | X → ... → 0   | msb → C |        |         |         |        | x     |       | x    | x     |       |      |      |      |        |
| asr  | X → ... → x   | abd[0] → C |      |         |         |        | x     |       | x    | x     |       |      | x    |      |        |
| asl  | X → ... → 0   | msb → C |        |         | x       |        |       |       |      | x     |       |      |      |      |        |
| rol  | C → ... → ↓   | abd[0] → C |      |         |         |        |       |       |      | x     |       |      | x    |      |        |
| ror  | ↓ → ... → C   | msb → C |        |         |         |        | x     |       |      | x     |       |      |      |      |        |
| roxl | X → ... → C   | abd[0] → C |      |         |         |        |       |       |      | x     |       |      | x    |      |        |
| roxr | ↓ → ... → x   | msb → C |        |         |         |        | x     |       |      | x     |       |      |      |      |        |

ALU FUNCTION AND CONDITION CODE TABLE

| | 1 | 2 | 3 | 4 | 5 | INSTRUCTION(S) |
|---|---|---|---|---|---|---|
| 1 | AND KNZ00 | SUB KNZ0$\bar{C}$ | SUBX | SLAA$_X$ | EXT | DIVS, DIVU |
| 2 | AND KNZ00 1 KNZKK | ADD CNZVC | ADDX CNZVC | ASR ANZ0A | EXT | ADD, ADDI, ADDQ, DCNT, ASR, LDQ, MOVE |
| 3 | AND KNZ00 1 KNZKK | ADDX CDDDD | ADD C*DZD$\bar{C}$* | ASL ANZV'A | EXT | ABCD, ASL |
| 4 | AND KNZ00 1 KNZKK | AND KNZ00 | AND KNZ00 | LSL ANZ0A | EXT | AND, ANDI, CLR, LSL |
| 5 | AND KNZ00 1 KNZKK | SUB $\bar{C}$NZV$\bar{C}$ | SUBX $\bar{C}$NZV$\bar{C}$ | LSR ANZ0A | EXT | SUB, SUBI, NEG, SUBQ, LSR, MOVB |
| 6 | AND KNZ00 | SUB KNZVC | SUBX KNZVC | | EXT | CMP, CMPM, CMPI, CHK |
| 7 | AND KNZ00 | SUB KNZVC | ADD KNZVC | | EXT | MULS, MULU |
| 8 | AND KNZ00 1 KNZKK | EXT KNZ00 | | ROXR KNZ0A | EXT | ROXR, EXT |
| 9 | AND KNZ00 1 KNZKK | SUBX $\bar{C}$NZV$\bar{C}$ | ADD1 $\bar{C}$* DZD$\bar{C}$* | RDL KNZ0A | EXT | ROL, SBCD, NBCD, SWAP |
| 10 | AND KNZ00 1 KNZKK | SUBX $\bar{C}$NZV$\bar{C}$ | SUBX $\bar{C}$NZV$\bar{C}$ | RDR KNZ0A | EXT | ROR, SUBX, NEG, X |
| 11 | AND KNZ00 1 KNZKK | SUB0 KNZV$\bar{C}$ | SUB0 KNZV$\bar{C}$ | ROXL ANZ0A | EXT | NOT, ROXL |
| 12 | AND | ADDX CNZVC | ADDX CNZVC | | EXT | ADDX |
| 13 | AND KKZKK | EOR KNZ00 | EOR KNZ00 | | EXT | EOR, EDRI, BCHG, BTST |
| 14 | AND KKZKK | OR KNZ00 | OR KNZ00 | EOR | EXT | OR, ORI, BCLR, BSET |
| 15 | AND KNZ00 | OR | | | | TAS, TST, SCC, MOVB |

K: NO CHANGE
D: DON'T CARE
A: SPECIAL CHARACTER
ORDER: XNZVC
C*: $C_{PSW}$ V $C_{INF}$

FIG. 17

ALU FUNCTION CONTROL AND CONDITION CODE DECODER

| # | i | Instruction Decode | Instruction | Row inhibits |
|---|---|---|---|---|
| 0 |   | 15' 14 13' 12'  7 | long shift | 1   3 4 5 6 7 8 9 10 11    13 14 15 |
| 1 |   | 15' 14 13' 12'  7  6 | word shift | 2   3 5   13 14 15 |
| 2 |   | 15' 14 13' 12   6' | byte shift | 2   3 5 |
| 3 |   | 15' 14 13' 12  7' 6' |  |  |
| 4 |   | 15' 13' 12' 8 | addx,subx |  |
| 5 | i | 15' 13' 12' 8 | addx,subx |  |
| 6 | i | 15' 13' 12  8 | add,sub |  |
| (4) |   | 15 14' 13' 12' 8 7' 5' |  | 1  3 4 5 6 7 8 9 10     12 |
| (5) |   | 15 14' 13' 12' 8 7' 5' |  | 2   10 |
| 7 |   | 15' 13' 12  8 7' 6 |  |  |
| 8 |   | 15' 13' 12' 7 6' 5' | mul,div | 1 1  3 4   6 7 8 9 10 11 12 13 14 15 |
| 9 |   | 15' 13' 12' 8 7' 6' 5' | abcd, sbcd | 1   3 4    7 |
| 10 |   | 15' 13' 12  7 6  | and,or | 1   3     7 |
| 11 |   | 15' 13' 12  8 7' 6' 5' |  |  |
| (9) |   | 15 14' 13' 12' |  | 1 2 3 4 5 6 7 8 9 10 11 12 13 14 15 |
| (10) |   | 15 14' 13  12' |  | 1   3 4 5 6 7 8 9 10 11 12 13 14 15 |
| 12 |   | 15' 13  12' | ldq,dcnt,movw,movl,bcc | 1 2 3 4 5 6 7 8 9 10 11 12 13 14 15 |
| 13 |   | 15' 14' 13  12  7 | scc,movb | 2 3 4 5 6 7 8 9 10 11 12 13 14 15 |
| 14 |   | 15' 13  12  7 | subq,movb | 1 2 3 4 5 6 7 8 9 10 11 12 13 14 15 |
| 15 |   | 15' 14' 13  12' 8 | addq,movb | 1   3 4 5 6 7 8 9 10 11 12 13 14 15 |
| (14) | i | 15' 14' 13  12' |  |  |
| 16 | i | 15' 14' 13  12  7 |  |  |
| (14) |   | 15 14' 13  12  11 10 9 |  | 1   3   7 8 9 10 11 12 13 |
| 17 |   | 15' 14' 13' 12  11 10' 9' 8' 7 | bclr,bset | 2   4 5 6   10   13 14 |
| 18 |   | 15' 14' 13' 12  11 10' 9' 8' 7' | bchg,btst | 2   4 5 6   10   13 14 |
| 19 |   | 15' 14' 13' 12  11 10' 9  8' | cmpi | 2   4 5 |
| 20 |   | 15' 14' 13' 12  11 10  9  8' | bclr,bset,ext | 2   4 5 6    9 10 11    13 14 |
| 21 |   | 15' 14' 13' 12' 8  7 | ori,tas,tst | 2   4 5 6   8 9 10 11    13 14 |
| 22 |   | 15' 14' 13' 12' 8' 7 |  |  |

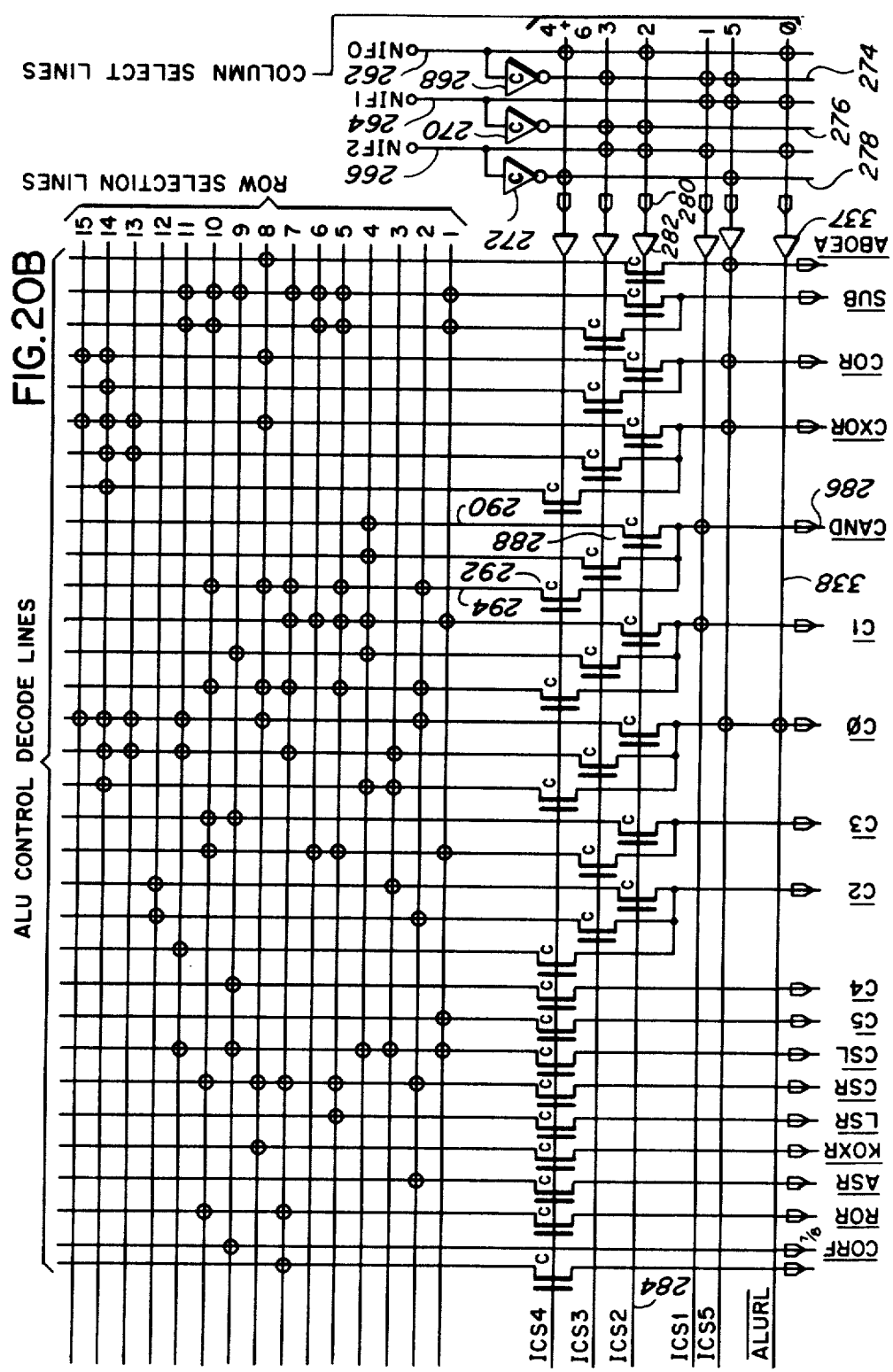

FIG. 21A

IMMEDIATE LINE: 0000   BTST, BCHG, BSET, BCLR, ORI, ANDI, SUBI, ADDI, EORI, CMPI

| | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED IR[11:6] |
|---|---|---|---|---|---|---|---|---|---|---|---|---|---|
| A1 | O#W1 ROAW1 | TRAP1 | O#W1 ADRW1 MORW1 | O#W1 PINW1 MORW1 | O#W1 PDCW1 MORW1 | O#W1 ADSW1 MORW1 | O#W1 AIXW0 MORW1 | O#W1 ABWW1 MORW1 | O#W1 ABNW1 MORW1 | TRAP1 | TRAP1 | O#W1 STIW1 | TRAP1 | X01000 00X000 BYTE ANDI,EORI,ORI |
| A2 |  |  |  |  |  |  |  |  |  |  |  |  |  |  |
| A3 |  |  |  |  |  |  |  |  |  |  |  |  |  |  |
| A1 | O#W1 ROAW1 | TRAP1 | O#W1 ADRW1 MORL1 | O#W1 PINW1 MORL1 | O#W1 PCDW1 MORL1 | O#W1 APSW1 MORL1 | O#W1 A1XW0 MORL1 | O#W1 ABWW1 MORL1 | O#W1 ABLW1 MORL1 | TRAP1 | TRAP1 | O#W1 STIW1 | TRAP1 | X01001 00X001 WORD ANDI,EORI,ORI |
| A2 |  |  |  |  |  |  |  |  |  |  |  |  |  |  |
| A3 |  |  |  |  |  |  |  |  |  |  |  |  |  |  |
| A1 | O#L1 ROAL1 | TRAP1 | O#L1 ADRL1 MORL1 | O#L1 PINL1 MORL1 | O#L1 PDCL1 MORL1 | O#L1 ADSL1 MORL1 | O#L1 AIXL0 MORL1 | O#L1 RBWL1 MORL1 | O#L1 ABLL1 MORL1 | TRAP1 | TRAP1 | TRAP1 | TRAP1 | X01010 00X010 LONG ANDI,EORI,ORI |
| A2 |  |  |  |  |  |  |  |  |  |  |  |  |  |  |
| A3 |  |  |  |  |  |  |  |  |  |  |  |  |  |  |
| A1 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | XX1011 0XX011 X1X011 1110XX |
| A2 |  |  |  |  |  |  |  |  |  |  |  |  |  |  |
| A3 |  |  |  |  |  |  |  |  |  |  |  |  |  |  |
| A1 | O#W1 ROAW1 | TRAP1 | O#W1 ADRW1 MORW1 | O#W1 PINW1 MORW1 | O#W1 PDCW1 MORW1 | O#W1 ADSW1 MORW1 | O#W1 AIXW0 MORW1 | O#W1 ABWW1 MORW1 | O#W1 ABLW1 MORW1 | TRAP1 | TRAP1 | TRAP1 | TRAP1 | 01X000 BYTE ADDI,SUBI |
| A2 |  |  |  |  |  |  |  |  |  |  |  |  |  |  |
| A3 |  |  |  |  |  |  |  |  |  |  |  |  |  |  |
| A1 | O#W1 ROAW1 | TRAP1 | O#W1 ADRW1 MORW1 | O#W1 PINW1 MORW1 | O#W1 PDCW1 MORW1 | O#W1 ADSW1 MORW1 | O#W1 AIXW0 MORW1 | O#W1 ABWW1 MORW1 | O#W1 ABLW1 MORW1 | TRAP1 | TRAP1 | TRAP1 | TRAP1 | 01X001 WORD ADDI,SUBI |
| A2 |  |  |  |  |  |  |  |  |  |  |  |  |  |  |
| A3 |  |  |  |  |  |  |  |  |  |  |  |  |  |  |
| A1 | O#L1 ROAL1 | TRAP1 | O#L1 ADRL1 MORL1 | O#L1 PINL1 MORL1 | O#L1 PDCL1 MORL1 | O#L1 ADSL1 MORL1 | O#L1 AIXL0 MORL1 | O#L1 ABWL1 MORL1 | O#L1 ABLL1 MORL1 | TRAP1 | TRAP1 | TRAP1 | TRAP1 | 01X010 LONG ADDI,SUBI |
| A2 |  |  |  |  |  |  |  |  |  |  |  |  |  |  |
| A3 |  |  |  |  |  |  |  |  |  |  |  |  |  |  |
| A1 |  |  |  |  |  |  |  |  |  |  |  |  |  |  |
| A2 |  |  |  |  |  |  |  |  |  |  |  |  |  |  |
| A3 |  |  |  |  |  |  |  |  |  |  |  |  |  |  |

IR[5:0]  000XXX 001XXX 010XXX 011XXX 100XXX 101XXX 110XXX 111000 111001 111010 111011 111100 111101 1111X

IMMEDIATE LINE  0000   ANDI, EORI, ORI, ADDI, SUBI

IMMEDIATE LINE: 0000  BTST, BCHG, BSET, BCLR, ORI, ANDI, SUBI, ADDI, EORI, CMPI

| | RYD | RYA | (RYA) | (RYA)+ | -(RYA) | (RYA)<br>+d₁₆ | (RYA)<br>+(X)<br>+d₈ | ABSW | ABSL | (PC)<br>+d₁₆ | (PC)<br>+(X)<br>+d₈ | # | UNUSED IR[11:6] | |
|---|---|---|---|---|---|---|---|---|---|---|---|---|---|---|
| A1<br>A2<br>A3 | BTSR1 | MPIW1 | ADRW1<br><br>BTSM1 | PINWL<br><br>BTSM1 | PDCW1<br><br>BTSM1 | ADSW1<br><br>BTSM1 | AIXW1<br><br>BTSM1 | ABWW1<br><br>BTSM1 | ABLW1<br><br>BTSM1 | ADSW1<br><br>BTSM1 | AIXW1<br><br>BTSM1 | E#W1<br><br>BTSI1 | TRAP1 | XXX100<br>DYNAMIC BTST |
| A1<br>A2<br>A3 | BCSR1 | MPIL1 | ADRW1<br><br>BCSM1 | PINW1<br><br>BCSM1 | PDCW1<br><br>BCSM1 | ADSW1<br><br>BCSM1 | AIXW0<br><br>BCSM1 | ABWW1<br><br>BCSM1 | ABLW1<br><br>BCSM1 | TRAP1 | TRAP1 | TRAP1 | TRAP1 | XXX101<br>DYNAMIC BCHG |
| A1<br>A2<br>A3 | BCSR1 | MPOL1 | ADRW1<br><br>BCSM1 | PINW1<br><br>BCSM1 | PDCW1<br><br>BCSM1 | ADSW1<br><br>BCSM1 | AIXW1<br><br>BCSM1 | ABWW1<br><br>BCSM1 | ABLW1<br><br>BCSM1 | TRAP1 | TRAP1 | TRAP1 | TRAP1 | XXX111<br>DYNAMIC BSET |
| A1<br>A2<br>A3 | BCLR1 | MPOW1 | ADRW1<br><br>BCLM1 | PINW1<br><br>BCLM1 | PDCW1<br><br>BCLM1 | ADSW1<br><br>BCLM1 | AIXW1<br><br>BCLM1 | ABWW1<br><br>BCLM1 | HBLW1<br><br>BCLM1 | TRAP1 | TRAP1 | TRAP1 | TRAP1 | XXX110<br>DYNAMIC BCLR |
| A1<br>A2<br>A3 | 0#W1<br>BTSR1 | TRAP1 | 0#W1<br>ADRW1<br>BTSM1 | 0#W1<br>PINW1<br>BTSM1 | 0#W1<br>PDCW1<br>BTSM1 | 0#W1<br>ADSW1<br>BTSM1 | 0#W1<br>AIXW0<br>BTSM1 | 0#W1<br>ABWW1<br>BTSM1 | 0#W1<br>ABLW1<br>BTSM1 | 0#W1<br>ADSW1<br>BTSM1 | 0#W1<br>AIXW0<br>BTSM1 | TRAP1 | TRAP1 | 100000<br>STATIC BTST |
| A1<br>A2<br>A3 | 0#W1<br>BCSR1 | TRAP1 | 0#W1<br>ADRW1<br>BCSM1 | 0#W1<br>PINW1<br>BCSM1 | 0#W1<br>PDCW1<br>BCSM1 | 0#W1<br>ADSW1<br>BCSM1 | 0#W1<br>AIXW0<br>BCSM1 | 0#W1<br>ABWW1<br>BCSM1 | 0#W1<br>ABLW1<br>BCSM1 | TRAP1 | TRAP1 | TRAP1 | TRAP1 | 100001<br>STATIC BCHG |
| A1<br>A2<br>A3 | 0#W1<br>BCSR1 | TRAP1 | 0#W1<br>ADRW1<br>BCSM1 | 0#W1<br>PINW1<br>BCSM1 | 0#W1<br>PDCW1<br>BCSM1 | 0#W1<br>ADSW1<br>BCSM1 | 0#W1<br>AIXW0<br>BCSM1 | 0#W1<br>ABWW1<br>BCSM1 | 0#W1<br>ABLW1<br>BCSM1 | TRAP1 | TRAP1 | TRAP1 | TRAP1 | 100011<br>STATIC BSET |
| A1<br>A2<br>A3 | 0#W1<br>BCLR1 | TRAP1 | 0#W1<br>ADRW1<br>BCLM1 | 0#W1<br>PINW1<br>BCLM1 | 0#W1<br>PDCW1<br>BCLM1 | 0#W1<br>ADSW1<br>BCLM1 | 0#W1<br>AIXW0<br>BCLM1 | 0#W1<br>ABWW1<br>BCLM1 | 0#W1<br>ABLW1<br>BCLM1 | TRAP1 | TRAP1 | TRAP1 | TRAP1 | 100010<br>STATIC BCLR |

IR[5:0]  000XXX 001XXX 010XXX 011XXX 100XXX 101XXX 110XXX 111000 111001 111010 111011 111100 111101<br>1111X

IMMEDIATE LINE  0000  BTST, BCHG, BSET, BCLR

FIG. 21B

IMMEDIATE LINE: 0000  BTST, BCHG, BSET, BCLR, ORI, ANDI, SUBI, ADDI, EORI, CMPI

| IR[5:0] | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED IR[11:6] |
|---|---|---|---|---|---|---|---|---|---|---|---|---|---|
| A1 | O#W1<br>RCAW1 | TRAP1 | O#W1<br>ADRW1<br>CPDW1 | O#W1<br>PINW1<br>CPDW1 | O#W1<br>PDCW1<br>CPDW1 | O#W1<br>ADSW1<br>CPDW1 | O#W1<br>A12W0<br>CPDW1 | O#W1<br>ABWW1<br>CPDW1 | O#W1<br>ABLW1<br>CPDW1 | TRAP1 | TRAP1 | TRAP1 | TRAP1 | 110000 BYTE CMPI |
| A2 |  |  |  |  |  |  |  |  |  |  |  |  |  |
| A3 |  |  |  |  |  |  |  |  |  |  |  |  |  |
| A1 | O#W1<br>RCAL1 | TRAP1 | O#W1<br>ADRW1<br>CPDW1 | O#W1<br>PINW1<br>CPDW1 | O#W1<br>PDCW1<br>CPDW1 | O#W1<br>ADSW1<br>CPDW1 | O#W1<br>AIXW0<br>CPDW1 | O#W1<br>ABWW1<br>CPDW1 | O#W1<br>ABLW1<br>CPDW1 | TRAP1 | TRAP1 | TRAP1 | TRAP1 | 110001 WORD CMPI |
| A2 |  |  |  |  |  |  |  |  |  |  |  |  |  |
| A3 |  |  |  |  |  |  |  |  |  |  |  |  |  |
| A1 | O#L1<br>RCAL1 | TRAP1 | O#L1<br>ADRL1<br>CPDL1 | O#L1<br>PINL1<br>CPDL1 | O#L1<br>PDCL1<br>CPDL1 | O#L1<br>ADSL1<br>CPDL1 | O#L1<br>AIXL0<br>CPDL1 | O#L1<br>ABWL1<br>CPDL1 | O#L1<br>ABLL1<br>CPDL1 | TRAP1 | TRAP1 | TRAP1 | TRAP1 | 110010 LONG CMPI |
| A2 |  |  |  |  |  |  |  |  |  |  |  |  |  |
| A3 |  |  |  |  |  |  |  |  |  |  |  |  |  |
| A1 |  |  |  |  |  |  |  |  |  |  |  |  |  |  |
| A2 |  |  |  |  |  |  |  |  |  |  |  |  |  |  |
| A3 |  |  |  |  |  |  |  |  |  |  |  |  |  |  |
| A1 |  |  |  |  |  |  |  |  |  |  |  |  |  |  |
| A2 |  |  |  |  |  |  |  |  |  |  |  |  |  |  |
| A3 |  |  |  |  |  |  |  |  |  |  |  |  |  |  |
| A1 |  |  |  |  |  |  |  |  |  |  |  |  |  |  |
| A2 |  |  |  |  |  |  |  |  |  |  |  |  |  |  |
| A3 |  |  |  |  |  |  |  |  |  |  |  |  |  |  |
|  | 000XXX | 001XXX | 010XXX | 011XXX | 100XXX | 101XXX | 110XXX | 111000 | 111001 | 111010 | 111011 | 111100 | 111101<br>11111X |

IMMEDIATE LINE  0000  CMPI

FIG. 2IC

MOVE BYTE

| | | | | SOURCE | | | | | | | | | DESTINATION | |
|---|---|---|---|---|---|---|---|---|---|---|---|---|---|---|
| | RYD | RYA | (RYA) | (RYA)+ | -(RYA) | (RYA)+d16 | (RYA)+(X)+d8 | ABSW | ABSL | (PC)+d16 | (PC)+(X)+d8 | # | UNUSED | IR[11:6] |
| A1 | RRGW1 | TRAP1 | ADRW1 | PINW1 | PDCW1 | ADSW1 | AIXW0 | ABWW1 | ABLW1 | ADSW1 | AIXW0 | E#W1 | TRAP1 | RYD XXX000 |
| A2 | | | MRGW1 | MRGW1 | MRGW1 | MRGW1 | MRGW1 | MRGW1 | MRGW1 | MRGW1 | MRGW1 | RRGW1 | | RYA XXX001 |
| A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | |
| A1 | RMRW1 | TRAP1 | ADRW1 | PNWL | PDCW1 | ADSW1 | AIXW0 | ABWW1 | ABLW1 | ADSW1 | AIXW0 | E#W1 | TRAP1 | (RYA) XXX010 |
| A2 | | | MMRW1 | MMRW1 | MMRW1 | MMRW1 | MMRW1 | MMRW1 | MMRW1 | MMRW1 | MMRW1 | RMRW1 | | |
| A3 | | | | | | | | | | | | | | |
| A1 | RMIW1 | TRAP1 | ADRW1 | PINW1 | PDCW1 | ADSW1 | AIXW0 | ABWW1 | ABLW1 | ADSW1 | IXW01 | E#W1 | TRAP1 | (RYA)+ XXX100 |
| A2 | | | MMIW1 | MMIW1 | MMIW1 | MMIW1 | MMIW1 | MMIW1 | MMIW1 | MMIW1 | MMIW1 | RMIW1 | | |
| A3 | | | | | | | | | | | | | | |
| A1 | RMMW1 | TRAP1 | ADRW1 | PINW1 | PDCW1 | ADSW1 | AIXW0 | ABWW1 | ABLW1 | ADSW1 | AIXW0 | E#W1 | TRAP1 | -(RYA) XXX100 |
| A2 | | | MMMW1 | MMMW1 | MMMW1 | MMMW1 | MMMW1 | MMMW1 | MMMW1 | MMMW1 | MMMW1 | RMMW1 | | |
| A3 | | | | | | | | | | | | | | |
| A1 | RMDW1 | TRAP1 | ADRW1 | PINW1 | PDCW1 | ADSW1 | AIXW0 | ABWW1 | ABLW1 | ADSW1 | AIXW0 | E#W1 | TRAP1 | (RYA)+d16 XXX101 |
| A2 | | | MMDW1 | MMDW1 | MMDW1 | MMDW1 | MMDW1 | MMDW1 | MMDW1 | MMDW1 | MMDW1 | RMDW1 | | |
| A3 | | | | | | | | | | | | | | |
| A1 | RMXW0 | TRAP1 | ADRW1 | PINW1 | PDCW1 | ADSW1 | AIXW0 | ABWW1 | ABLW1 | ADSW1 | AIXW0 | E#W1 | TRAP1 | (RYA)+(X)+d8 XXX110 |
| A2 | | | MMXW0 | MMXW0 | MMXW0 | MMXW0 | MMXW0 | MMXW0 | MMXW0 | MMXW0 | MMXW0 | RMXW0 | | |
| A3 | | | | | | | | | | | | | | |
| A1 | RAWW1 | TRAP1 | ADRW1 | PINW1 | PDCW1 | APSW1 | AIXW0 | ABWW1 | ABLW1 | ADSW1 | AIXW0 | E#W1 | TRAP1 | ABSW 000111 |
| A2 | | | MAWW1 | MAWW1 | MAWW1 | MAWW1 | MAWW1 | MAWW1 | MAWW1 | MAWW1 | MAWW1 | RAWW1 | | |
| A3 | | | | | | | | | | | | | | |
| A1 | RALW1 | TRAP1 | ADRW1 | PINW1 | PDCW1 | ADSW1 | AIXW0 | ABWW1 | ABLW1 | ADSW1 | AIXW0 | E#W1 | TRAP1 | ABSL 001111 |
| A2 | | | MALW1 | MALW1 | MALW1 | MALW1 | MALW1 | MALW1 | MALW1 | MALW1 | MALW1 | RALW1 | | |
| A3 | | | | | | | | | | | | | | |
| A1 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | UNUSED X1X111 1XX111 |
| A2 | | | | | | | | | | | | | | |
| A3 | | | | | | | | | | | | | | |

IR[5:0]   000XXX 001XXX 010XXX 011XXX 100XXX 101XXX 110XXX 111000 111001 111010 111011 111100 111101 1111X

MOVE BYTE 0001

MISCELLANEOUS LINE 0100

| | RYD | RYA | (RYA) | (RYA)+ | -(RYA) | (RYA)<br>+d₁₆ | (RYA)<br>+(X)<br>+d₈ | ABSW | ABSL | (PC)<br>+d₁₆ | (PC)<br>+(X)<br>+d₈ | # | UNUSED | IR[11:6] |
|---|---|---|---|---|---|---|---|---|---|---|---|---|---|---|
| A1<br>A2<br>A3 | NNRW1 | TRAP1 | ADRW1<br><br>NNMW1 | PINW1<br><br>NNMW1 | PDCW1<br><br>NNMW1 | ADSW1<br><br>NNMW1 | AIXW0<br><br>NNMW1 | ABWW1<br>NNMW1 | ABLW1<br>NNMW1 | TRAP1 | TRAP1 | TRAP1 | TRAP1 | 0XX000 BYTE<br>CLR NEG<br>NEGX NOT |
| A1<br>A2<br>A3 | NNRW1 | TRAP1 | ADRW1<br><br>NNMW1 | PINW1<br><br>NNMW1 | PDCW1<br><br>NNMW1 | ADSW1<br><br>NNMW1 | AIXW0<br><br>NNMW1 | ABWW1<br>NNMW1 | ABLW1<br>NNMW1 | TRAP1 | TRAP1 | TRAP1 | TRAP1 | 0XX001 WORD<br>CLR NEG<br>NEGX NOT |
| A1<br>A2<br>A3 | NNRL1 | TRAP1 | ADRL1<br><br>NNML1 | PINL1<br><br>NNML1 | PDCL1<br><br>NNML1 | ADSL1<br><br>NNML1 | AIXL0<br><br>NNML1 | ABWL1<br>NNML1 | ABLL1<br>NNML1 | TRAP1 | TRAP1 | TRAP1 | TRAP1 | 0XX010 LONG<br>CLR NEG<br>NEGX NOT |
| A1<br>A2<br>A3 | STRW1 | TRAP1 | ADRW1<br><br>STMW1 | PINW1<br><br>STMW1 | PDCW1<br><br>STMW1 | ADSW1<br><br>STMW1 | AIXW0<br><br>STMW1 | ABWW1<br>STMW1 | ABLW1<br>STMW1 | TRAP1 | TRAP1 | TRAP1 | TRAP1 | 000011<br>MFST |
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | 001011<br>11X000<br>11000X |
| A1<br>A2<br>A3 | RSTW1 | TRAP1 | ADRW1<br><br>MSTW1 | PINW1<br><br>MSTW1 | PDCW1<br><br>MSTW1 | ADSW1<br><br>MSTW1 | AIXW0<br><br>MSTW1 | ABWW1<br>MSTW1 | ABLW1<br>MSTW1 | ADSW1<br>MSTW1 | AIXW0<br>MSTW1 | E#W1<br>RSTW1 | TRAP1 | 010011<br>MTCC |
| A1<br>A2<br>A3 | RSTW1 | TRAP1 | ADRW1<br><br>MSTW1 | PINW1<br><br>MSTW1 | PDCW1<br><br>MSTW1 | ADSW1<br><br>MSTW1 | AIXW0<br><br>MSTW1 | ABWW1<br>MSTW1 | ABLW1<br>MSTW1 | ADSW1<br>MSTW1 | AIXW0<br>MSTW1 | E#W1<br>RSTW1 | TRAP1 | 011011<br>MTST |
| A1<br>A2<br>A3 | NBCR1 | TRAP1 | ADRW1<br><br>NBCM1 | PINW1<br><br>NBCM1 | PDCW1<br><br>NBCM1 | APSW1<br><br>NBCM1 | AIXW0<br><br>NBCM1 | ABWW1<br>NBCM1 | ABLW1<br>NBCM1 | TRAP1 | TRAP1 | TRAP1 | TRAP1 | 100 000 BYTE<br>NBCD |

IR[5:0]   000XXX 001XXX 010XXX 011XXX 100XXX 101XXX 110XXX 111000 111001 111010 111011 111100 111101
                                                                                                111111X

MISCELLANEOUS LINE 0100   CLR NEG NEGX NOT MFST MTCC MTST NBCD

MISCELLANEOUS LINE 0100

| | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED | IR[11:6] |
|---|---|---|---|---|---|---|---|---|---|---|---|---|---|---|
| A1 | SWAP1 | TRAP1 | PEAA1 | TRAP1 | TRAP1 | PEAD1 | PEAX0 | PAAW1 | PAAL1 | PEAD1 | PEAX0 | TRAP1 | TRAP1 | 100 001 SWAP PEA |
| A2 | | | | | | | | | | | | | | |
| A3 | | | | | | | | | | | | | | |
| A1 | NNRW1 | TRAP1 | STMR1 | TRAP1 | PUSH1 | STMD1 | STMX1 | SMAW1 | SMAL1 | TRAP1 | TRAP1 | TRAP1 | TRAP1 | 100 010 EXTW STM16 |
| A2 | | | | | | | | | | | | | | |
| A3 | | | | | | | | | | | | | | |
| A1 | EXTR1 | TRAP1 | STMR1 | TRAP1 | PUSH1 | STMD1 | STMX1 | SMAW1 | SMAL1 | TRAP1 | TRAP1 | TRAP1 | TRAP1 | 100 011 EXTL STM32 |
| A2 | | | | | | | | | | | | | | |
| A3 | | | | | | | | | | | | | | |
| A1 | TSRW1 | TRAP1 | ADRW1 | PINW1 | PDCW1 | ADSW1 | AIXW0 | ABWW1 | ABLW1 | TRAP1 | TRAP1 | TRAP1 | TRAP1 | 101 000 BYTE TST |
| A2 | | | TSML1 | TSML1 | TSML1 | TSML1 | TSML1 | TSML1 | TSML1 | | | | | |
| A3 | | | | | | | | | | | | | | |
| A1 | TSRW1 | TRAP1 | ADRW1 | PINW1 | PDCW1 | ADSW1 | AIXW0 | ABWW1 | ABLW1 | TRAP1 | TRAP1 | TRAP1 | TRAP1 | 101 001 WORD TST |
| A2 | | | TSML1 | TSML1 | TSML1 | TSML1 | TSML1 | TSML1 | TSML1 | | | | | |
| A3 | | | | | | | | | | | | | | |
| A1 | TSRL1 | TRAP1 | ADRL1 | PINL1 | PDCL1 | ADSL1 | AIXL0 | ABWL1 | ABLL1 | TRAP1 | TRAP1 | TRAP1 | TRAP1 | 101 010 LONG TST |
| A2 | | | TSML1 | TSML1 | TSML1 | TSML1 | TSML1 | TSML1 | TSML1 | | | | | |
| A3 | | | | | | | | | | | | | | |
| A1 | TASR1 | TRAP1 | ADRW1 | PINW1 | PDCW1 | ADSW1 | AIXW0 | ABWW1 | ABLW1 | TRAP1 | TRAP1 | TRAP1 | TRAP1 | 101 011 TAS |
| A2 | | | TASM1 | TASM1 | TASM1 | TASM1 | TASM1 | TASM1 | TASM1 | | | | | |
| A3 | | | | | | | | | | | | | | |
| A1 | TRAP1 | TRAP1 | LDMP1 | POPM1 | TRAP1 | LDMD1 | LDMX0 | LMAW1 | LMAL1 | LDMD1 | LDMX0 | TRAP1 | TRAP1 | 110 01X LDM16 LDM32 |
| A2 | | | | | | | | | | | | | | |
| A3 | | | | | | | | | | | | | | |

IR[5:0] 000XXX 001XXX 010XXX 011XXX 100XXX 101XXX 110XXX 111000 111001 111010 111011 111100 111101 111111X

MISCELLANEOUS LINE 0100 SWAP, PEA, EXT, STM, TST, TAS, LDM

Bcc LINE 0110 Bcc, BRA, BSR

| IR[5:0] | | RYD | RYA | (RYA) | (RYA)+ | -(RYA) | (RYA)+d16 | (RYA)+(X)+d8 | ABSW | ABSL | (PC)+d16 | (PC)+(X)+d8 | # | UNUSED | IR[11:6] |
|---|---|---|---|---|---|---|---|---|---|---|---|---|---|---|---|
| 000000 001XXX | A1 | BBCWI | BBCI1 | BBCI1 | BBCI1 | BBCI1 | BBCI1 | BBCI1 | BBCI1 | BBCI1 | BBCI1 | BBCI1 | BBCI1 | BBCI1 | XXX000 1XXX00 X1XX00 XX1X00 |
|  | A2 |  |  |  |  |  |  |  |  |  |  |  |  |  |  |
|  | A3 |  |  |  |  |  |  |  |  |  |  |  |  |  |  |
| 0001XX | A1 | BBCI1 | BBCI1 | BBCI1 | BBCI1 | BBCI1 | BBCI1 | BBCI1 | BBCI1 | BBCI1 | BBCI1 | BBCI1 | BBCI1 | BBCI1 | XXX01X XXX0X1 |
|  | A2 |  |  |  |  |  |  |  |  |  |  |  |  |  |  |
|  | A3 |  |  |  |  |  |  |  |  |  |  |  |  |  |  |
| 000X1X | A1 | BSRWI | BSRI1 | BSRI1 | BSRI1 | BSRI1 | BSRI1 | BSRI1 | BSRI1 | BSRI1 | BSRI1 | BSRI1 | BSRI1 | BSRI1 | 000100 |
|  | A2 |  |  |  |  |  |  |  |  |  |  |  |  |  |  |
|  | A3 |  |  |  |  |  |  |  |  |  |  |  |  |  |  |
| 111XX1 | A1 | BSRI1 | BSRI1 | BSRI1 | BSRI1 | BSRI1 | BSRI1 | BSRI1 | BSRI1 | BSRI1 | BSRI1 | BSRI1 | BSRI1 | BSRI1 | 00011X 0001X1 |
|  | A2 |  |  |  |  |  |  |  |  |  |  |  |  |  |  |
|  | A3 |  |  |  |  |  |  |  |  |  |  |  |  |  |  |
|  | A1 |  |  |  |  |  |  |  |  |  |  |  |  |  |  |  |
|  | A2 |  |  |  |  |  |  |  |  |  |  |  |  |  |  |  |
|  | A3 |  |  |  |  |  |  |  |  |  |  |  |  |  |  |  |
|  | A1 |  |  |  |  |  |  |  |  |  |  |  |  |  |  |  |
|  | A2 |  |  |  |  |  |  |  |  |  |  |  |  |  |  |  |
|  | A3 |  |  |  |  |  |  |  |  |  |  |  |  |  |  |  |
|  | A1 |  |  |  |  |  |  |  |  |  |  |  |  |  |  |  |
|  | A2 |  |  |  |  |  |  |  |  |  |  |  |  |  |  |  |
|  | A3 |  |  |  |  |  |  |  |  |  |  |  |  |  |  |  |

IR[5:0]: 000000 001XXX 010XXX 011XXX 100XXX 101XXX 110XXX 111000 111001 111010 111011 111100 111101 111110 111111

Bcc LINE 0110 Bcc, BRA, BSR

FIG. 21L

LDQ LINE 0111 LDQ & DCNT

| | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED | IR[11:6] |
|---|---|---|---|---|---|---|---|---|---|---|---|---|---|---|
| A1 | RLQL1 | RLQL1 | RLQL1 | RLQL1 | RLQL1 | RLQL1 | RLQL1 | RLQL1 | RLQL1 | RLQL1 | RLQL1 | RLQL1 | RLQL1 | XXX0XX |
| A2 | DCNT1 | DCNT1 | DCNT1 | DCNT1 | DCNT1 | DCNT1 | DCNT1 | DCNT1 | DCNT1 | DCNT1 | DCNT1 | DCNT1 | DCNT1 | XXX1XX |
| A3 | | | | | | | | | | | | | | |
| A1 | | | | | | | | | | | | | | |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| IR[5:0] | 000XXX | 001XXX | 010XXX | 011XXX | 100XXX | 101XXX | 110XXX | 111000 | 111001 | 111010 | 111011 | 111100 | 111101 11111X | |

LDQ LINE 0111 LDQ & DCNT

OR LINE 1000 OR, DIVU, DIVS, SBCD

| | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED | IR[11:9]=XXX IR[8:6] |
|---|---|---|---|---|---|---|---|---|---|---|---|---|---|---|
| A1 | RORW1 | TRAP1 | ADRW1 | PINW1 | PDCW1 | ADSW1 | AIXW0 | ABWW1 | ABLW1 | ADSW1 | AIXW0 | E#W1 | TRAP1 | BYTE 000 (RXD)+(EA)→RXD |
| A2 | | | | | | | | | | | | RORW1 | | |
| A3 | | | ROMW1 | ROMW1 | ROMW1 | ROMW1 | ROMW1 | ROMW1 | ROMW1 | ROMW1 | ROMW1 | | | |
| A1 | RORW1 | TRAP1 | ADRW1 | PINW1 | PDCW1 | ADSW1 | AIXW0 | ABWW1 | ABLW1 | ADSW1 | AIXW0 | E#W1 | TRAP1 | WORD 001 (RXD)+(EA)→RXD |
| A2 | | | | | | | | | | | | RORW1 | | |
| A3 | | | ROMW1 | ROMW1 | ROMW1 | ROMW1 | ROMW1 | ROMW1 | ROMW1 | ROMW1 | ROMW1 | | | |
| A1 | RORL1 | TRAP1 | ADRL1 | PINL1 | PDCL1 | ADSL1 | AIXL0 | ABWL1 | ABLL1 | ADSL1 | AIXL0 | E#L1 | TRAP1 | LONG 010 (RXD)+(EA)→RXD |
| A2 | | | | | | | | | | | | RORL1 | | |
| A3 | | | ROML1 | ROML1 | ROML1 | ROML1 | ROML1 | ROML1 | ROML1 | ROML1 | ROML1 | | | |
| A1 | DVUR1 | TRAP1 | ADRW1 | PINW1 | PDCW1 | ADSW1 | AIXW0 | ABWW1 | ABLW1 | ADSW1 | AIXW0 | E#W1 | TRAP1 | 011 |
| A2 | | | | | | | | | | | | DVUR1 | | |
| A3 | | | DVUM1 | DVUM1 | DVUM1 | DVUM1 | DVUM1 | DVUM1 | DVUM1 | DVUM1 | DVUM1 | | | |
| A1 | RBRB1 | ASBB1 | ADRW1 | PINW1 | PDCW1 | ADSW1 | AIXW0 | ABWW1 | ABLW1 | ABLW1 | TRAP1 | TRAP1 | TRAP1 | BYTE 100 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | TRAP1 | TRAP1 | ADRW1 | PINW1 | PDCW1 | ADSW1 | AIXW0 | ABWW1 | ABLW1 | TRAP1 | TRAP1 | TRAP1 | TRAP1 | WORD 101 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | TRAP1 | TRAP1 | ADRL1 | PINL1 | PDCL1 | ADSL1 | AIXL0 | ABWL1 | ABLL1 | TRAP1 | TRAP1 | TRAP1 | TRAP1 | LONG 110 (EA)+(RXD)→EA |
| A2 | | | | | | | | | | | | | | |
| A3 | | | MORL1 | MORL1 | MORL1 | MORL1 | MORL1 | MORL1 | MORL1 | | | | | |
| A1 | DVS02 | TRAP1 | ADRW1 | PINW1 | PDCW1 | ADSW1 | AIXW0 | ABWW1 | ABLW1 | ADSW1 | AIXW0 | E#W1 | TRAP1 | 111 |
| A2 | | | | | | | | | | | | DVS02 | | |
| A3 | | | DVS01 | DVS01 | DVS01 | DVS01 | DVS01 | DVS01 | DVS01 | DVS01 | DVS01 | | | |

IR[5:0]  000XXX 001XXX 010XXX 011XXX 100XXX 101XXX 110XXX 111000 111001 111010 111011 111100 111101 111110/111111X

OR LINE 1000 OR, DIVU, DIVS, SBCD

RESERVED LINE 1010

| | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED IR[11:6] |
|---|---|---|---|---|---|---|---|---|---|---|---|---|---|
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 |
| A1<br>A2<br>A3 | | | | | | | | | | | | | |
| A1<br>A2<br>A3 | | | | | | | | | | | | | |
| A1<br>A2<br>A3 | | | | | | | | | | | | | |
| A1<br>A2<br>A3 | | | | | | | | | | | | | |
| A1<br>A2<br>A3 | | | | | | | | | | | | | |
| A1<br>A2<br>A3 | | | | | | | | | | | | | |
| A1<br>A2<br>A3 | | | | | | | | | | | | | |
| | 000XXX | 001XXX | 010XXX | 011XXX | 100XXX | 101XXX | 110XXX | 111000 | 111001 | 111010 | 111011 | 111100 111101 | 111110 11111X |

RESERVED LINE 1010

CMP LINE 1011 CMP, EOR, CMPM, CMPA

| | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED | IR[11:9]=XXX IR[8:6] |
|---|---|---|---|---|---|---|---|---|---|---|---|---|---|---|
| A1 | CPRW1 | TRAP1 | ADRW1 | PINW1 | PDCW1 | ADSW1 | AIXW0 | ABWW1 | ABLW1 | ADSW1 | AIXW0 | E#W1 CPRW1 | TRAP1 | BYTE 000 (RXD)+(EA)→RXD |
| A2 | | | | | | | | | | | | | | |
| A3 | | | CPMW1 | CPMW1 | CPMW1 | CPMW1 | CPMW1 | CPMW1 | CPMW1 | CPMW1 | CPMW1 | | | |
| A1 | CPRW1 | CPRW1 | ADRW1 | PINW1 | PDCW1 | ADSW1 | AIXW0 | ABWW1 | ABLW1 | ADSW1 | AIXW0 | E#W1 CPRW1 | TRAP1 | WORD 001 (RXD)+(EA)→RXD |
| A2 | | | | | | | | | | | | | | |
| A3 | | | CPMW1 | CPMW1 | CPMW1 | CPMW1 | CPMW1 | CPMW1 | CPMW1 | CPMW1 | CPMW1 | | | |
| A1 | CPRL1 | CPRL1 | ADRL1 | PINL1 | PDCL1 | ADSL1 | AIXL0 | ABWL1 | ABLL1 | ADSL1 | AIXL0 | E#L1 CPRL1 | TRAP1 | LONG 010 (RXD)+(EA)→RXD |
| A2 | | | | | | | | | | | | | | |
| A3 | | | CPML1 | CPML1 | CPML1 | CPML1 | CPML1 | CPML1 | CPML1 | CPML1 | CPML1 | | | |
| A1 | CPRM1 | CPRM1 | ADRW1 | PINW1 | PDCW1 | ADSW1 | AIXW0 | ABWW1 | ABLW1 | ADSW1 | AIXW0 | E#W1 CPRW1 | TRAP1 | WORD 011 (RXA)+(EA)→RXA |
| A2 | | | | | | | | | | | | | | |
| A3 | | | CPMM1 | CPMM1 | CPMM1 | CPMM1 | CPMM1 | CPMM1 | CPMM1 | CPMM1 | CPMM1 | | | |
| A1 | ROAW1 | CMMW1 | ADRW1 | PINW1 | PDCW1 | ADSW1 | AIXW0 | ABWW1 | ABLW1 | TRAP1 | TRAP1 | TRAP1 | TRAP1 | BYTE 100 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | ROAW1 | CMMW1 | ADRW1 | PINW1 | PDCW1 | ADSW1 | AIXW0 | ABWW1 | ABLW1 | TRAP1 | TRAP1 | TRAP1 | TRAP1 | WORD 101 (EA)+(RXD)→EA |
| A2 | | | | | | | | | | | | | | |
| A3 | | | MORW1 | MORW1 | MORW1 | MORW1 | MORW1 | MORW1 | MORW1 | | | | | |
| A1 | ROAL1 | CMML1 | ADRL1 | PINL1 | PDCL1 | ADSL1 | AIXL0 | ABWL1 | ABLL1 | TRAP1 | TRAP1 | TRAP1 | TRAP1 | LONG 110 (EA)+(RXD)→EA |
| A2 | | | | | | | | | | | | | | |
| A3 | | | MORL1 | MORL1 | MORL1 | MORL1 | MORL1 | MORL1 | MORL1 | | | | | |
| A1 | CPRL1 | CPRL1 | ADRL1 | PINL1 | PDCL1 | ADSL1 | AIXL0 | ABWL1 | ABLL1 | ADSL1 | AIXL0 | E#L1 CPRL1 | TRAP1 | LONG 111 (RXA)+(EA)→RXA |
| A2 | | | | | | | | | | | | | | |
| A3 | | | CPML1 | CPML1 | CPML1 | CPML1 | CPML1 | CPML1 | CPML1 | CPML1 | CPML1 | | | |
| IR[5:0] | 000XXX | 001XXX | 010XXX | 011XXX | 100XXX | 101XXX | 110XXX | 111000 | 111001 | 111010 | 111011 | 111100 | 111101 111111X | |

CMP LINE 1011 CMP, EOR, CMPM, CMPA

FIG. 21R

ADD LINE 1100 AND, MULU, ABCD, EXGD, EXGM, EXGA, MULS

IR[11:9]=XXX

| IR[8:6] | | |
|---|---|---|
| BYTE 000 | (RXD)+(EA) → RXD | |
| WORD 001 | (RXD)+(EA) → RXD | |
| LONG 010 | (RXD)+(EA) → RXD | |
| 011 | | |
| BYTE 100 | (EA)+(RXD) → EA | |
| WORD 101 | (EA)+(RXD) → EA | |
| LONG 110 | (EA)+(RXD) → EA | |
| 111 | | |

| | RYD | RYA | (RYA) | (RYA)+ | -(RYA) | (RYA)+d₁₆ | (RYA)+(X)+d₈ | ABSW | ABSL | (PC)+d₁₆ | (PC)+(X)+d₈ | # | UNUSED |
|---|---|---|---|---|---|---|---|---|---|---|---|---|---|
| A1 | RORW1 | TRAP1 | ADRW1 | PINW1 | PDCW1 | ADSW1 | AIXW0 | ABWW1 | ABLW1 | ADSW1 | AIXW0 | E#W1 RORW1 | TRAP1 |
| A2 | | | | | | | | | | | | | |
| A3 | | | ROMW1 | ROMW1 | ROMW1 | ROMW1 | ROMW1 | ROMW1 | ROMW1 | ROMW1 | ROMW1 | | |
| A1 | RORW1 | TRAP1 | ADRW1 | PINW1 | PDCW1 | ADSW1 | AIXW0 | ABWW1 | ABLW1 | ADSW1 | AIXW0 | E#W1 RORW1 | TRAP1 |
| A2 | | | | | | | | | | | | | |
| A3 | | | ROMW1 | ROMW1 | ROMW1 | ROMW1 | ROMW1 | ROMW1 | ROMW1 | ROMW1 | ROMW1 | | |
| A1 | RORL1 | TRAP1 | ADRL1 | PINL1 | PDCL1 | ADSL1 | AIXL0 | ABWL1 | ABLL1 | ADSL1 | AIXL0 | E#L1 RORL1 | TRAP1 |
| A2 | | | | | | | | | | | | | |
| A3 | | | ROML1 | ROML1 | ROML1 | ROML1 | ROML1 | ROML1 | ROML1 | ROML1 | ROML1 | | |
| A1 | MULR1 | TRAP1 | ADRW1 | PINW1 | PDCW1 | ADSW1 | AIXW0 | ABWW1 | ABLW1 | ADSW1 | AIXW0 | E#W1 MULR1 | TRAP1 |
| A2 | | | | | | | | | | | | | |
| A3 | | | MULM1 | MULM1 | MULM1 | MULM1 | MULM1 | MULM1 | MULM1 | MULM1 | MULM1 | | |
| A1 | RBRB1 | ASBB1 | ADRW1 | PINW1 | PDCW1 | ADSW1 | AIXW0 | ABWW1 | ABLW1 | ADSW1 | AIXW0 | E#W1 MULR1 | TRAP1 |
| A2 | | | | | | | | | | | | | |
| A3 | | | MORW1 | MORW1 | MORW1 | MORW1 | MORW1 | MORW1 | MORW1 | TRAP1 | TRAP1 | TRAP1 | |
| A1 | EXGE1 | EXGE1 | ADRW1 | PINW1 | PDCW1 | ADSW1 | AIXW0 | ABWW1 | ABLW1 | TRAP1 | TRAP1 | TRAP1 | TRAP1 |
| A2 | | | | | | | | | | | | | |
| A3 | | | MORW1 | MORW1 | MORW1 | MORW1 | MORW1 | MORW1 | MORW1 | | | | |
| A1 | TRAP1 | EXGE1 | ADRL1 | PINL1 | PDCL1 | ADSL1 | AIXL0 | ABWL1 | ABLL1 | TRAP1 | TRAP1 | TRAP1 | TRAP1 |
| A2 | | | | | | | | | | | | | |
| A3 | | | MORL1 | MORL1 | MORL1 | MORL1 | MORL1 | MORL1 | MORL1 | | | | |
| A1 | MULR1 | TRAP1 | ADRW1 | PINW1 | PDCW1 | ADSW1 | AIXW0 | ABWW1 | ABLW1 | ADSW1 | AIXW0 | E#W1 MULR1 | TRAP1 |
| A2 | | | | | | | | | | | | | |
| A3 | | | MULM1 | MULM1 | MULM1 | MULM1 | MULM1 | MULM1 | MULM1 | MULM1 | MULM1 | | |

IR[5:0]  000XXX 001XXX 010XXX 011XXX 100XXX 101XXX 110XXX 111000 111001 111010 111011 111100 111101 11111X

AND LINE 1100 AND, MULU, ABCD, EXGD, EXGM, EXGA, MULS

FIG. 21S

ADD LINE 1101 ADD & ADDX

| | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED | IR[11:9]=XXX IR[8:6] |
|---|---|---|---|---|---|---|---|---|---|---|---|---|---|---|
| A1 | RORW1 | TRAP1 | ADRW1 | PINW1 | PDCW1 | ADSW1 | AIXW0 | ABWW1 | ABLW1 | ADSW1 | AIXW0 | E#W1 | TRAP1 | BYTE 000 |
| A2 | | | ROMW1 | ROMW1 | ROMW1 | ROMW1 | ROMW1 | ROMW1 | ROMW1 | ROMW1 | ROMW1 | RORW1 | | (RXD)+(EA)→RXD |
| A3 | | | | | | | | | | | | | | |
| A1 | RORW1 | RORW1 | ADRW1 | PINW1 | PDCW1 | ADSW1 | AIXW0 | ABWW1 | ABLW1 | ADSW1 | AIXW0 | E#W1 | TRAP1 | WORD 001 |
| A2 | | | ROMW1 | ROMW1 | ROMW1 | ROMW1 | ROMW1 | ROMW1 | ROMW1 | ROMW1 | ROMW1 | RORW1 | | (RXD)+(EA)→RXD |
| A3 | | | | | | | | | | | | | | |
| A1 | RORL1 | RORL1 | ADRL1 | PINL1 | PDCL1 | ADSL1 | AIXL0 | ABWL1 | ABLL1 | ADSL1 | AIXL0 | E#L1 | TRAP1 | LONG 010 |
| A2 | | | ROML1 | ROML1 | ROML1 | ROML1 | ROML1 | ROML1 | ROML1 | ROML1 | ROML1 | RORL1 | | (RXD)+(EA)→RXD |
| A3 | | | | | | | | | | | | | | |
| A1 | RORM1 | RORM1 | ADRW1 | PINW1 | PDCW1 | ADSW1 | AIXW0 | ABWW1 | ABLW1 | ADSW1 | AIXW0 | E#W1 | TRAP1 | WORD 011 |
| A2 | | | ROMM1 | ROMM1 | ROMM1 | ROMM1 | ROMM1 | ROMM1 | ROMM1 | ROMM1 | ROMM1 | RORM1 | | (RXA)+(EA)→RXA |
| A3 | | | | | | | | | | | | | | |
| A1 | RORW1 | ASXW1 | ADRW1 | PINW1 | PDCW1 | ADSW1 | AIXW0 | ABWW1 | ABLW1 | TRAP1 | TRAP1 | TRAP1 | TRAP1 | BYTE 100 |
| A2 | | | MORW1 | MORW1 | MORW1 | MORW1 | MORW1 | MORW1 | MORW1 | | | | | (EA)+(RXD)→EA |
| A3 | | | | | | | | | | | | | | |
| A1 | RORW1 | ASXW1 | ADRW1 | PINW1 | PDCW1 | ADSW1 | AIXW0 | ABWW1 | ABLW1 | TRAP1 | TRAP1 | TRAP1 | TRAP1 | WORD 101 |
| A2 | | | MORW1 | MORW1 | MORW1 | MORW1 | MORW1 | MORW1 | MORW1 | | | | | (EA)+(RXD)→EA |
| A3 | | | | | | | | | | | | | | |
| A1 | RORL1 | ASXL1 | ADRL1 | PINL1 | PDCL1 | ADSL1 | AIXL0 | ABWL1 | ABLL1 | TRAP1 | TRAP1 | TRAP1 | TRAP1 | LONG 110 |
| A2 | | | MORL1 | MORL1 | MORL1 | MORL1 | MORL1 | MORL1 | MORL1 | | | | | (EA)+(RXD)→EA |
| A3 | | | | | | | | | | | | | | |
| A1 | RORL1 | RORL1 | ADRL1 | PINL1 | PDCL1 | ADSL1 | AIXL0 | ABWL1 | ABLL1 | ADSL1 | AIXL0 | E#L1 | TRAP1 | LONG 111 |
| A2 | | | ROML1 | ROML1 | ROML1 | ROML1 | ROML1 | ROML1 | ROML1 | ROML1 | ROML1 | RORL1 | | (RXA)+(EA)→RXA |
| A3 | | | | | | | | | | | | | | |

IR[5:0]  000XXX 001XXX 010XXX 011XXX 100XXX 101XXX 110XXX 111000 111001 111010 111011 111100 111101 111111X

ADD LINE 1101 ADD & ADDX

FIG. 21T

SHIFT LINE 1110 ASL, ASR, LSL, LSR, ROL, ROR, ROXL, ROXR, REGISTER & MEMORY SHIFTS.

| IR[5:0] | | RYD | RYA | (RYA) | (RYA)+ | -(RYA) | (RYA)+d$_{16}$ | (RYA)+(X)+d$_8$ | ABSW | ABSL | (PC)+d$_{16}$ | (PC)+(X)+d$_8$ | # | UNUSED IR[11:6] | |
|---|---|---|---|---|---|---|---|---|---|---|---|---|---|---|---|
| 000XXX | A1 | TRAP1 | TRAP1 | ADRW1 | PINW1 | PDCW1 | ADSW1 | AIXW0 | ABWW1 | ABLW1 | TRAP1 | TRAP1 | TRAP1 | TRAP1 | 0XXX11 WORD MEMORY SHIFTS |
|  | A2 |  |  | SFTM1 | SFTM1 | SFTM1 | SFTM1 | SFTM1 | SFTM1 | SFTM1 |  |  |  |  |  |
|  | A3 |  |  |  |  |  |  |  |  |  |  |  |  |  |  |
| 001XXX | A1 | SRIW1 | SRIW1 | SRIW1 | SRIW1 | SRIW1 | SRIW1 | SRIW1 | SRRW1 | SRRW1 | SRRW1 | SRRW1 | SRRW1 | SRRW1 | XXXX00 BYTE REGISTER-SHIFTS |
| 010XXX | A2 |  |  |  |  |  |  |  |  |  |  |  |  |  |  |
| 011XXX | A3 |  |  |  |  |  |  |  |  |  |  |  |  |  |  |
| 100XXX | A1 | SRIW1 | SRIW1 | SRIW1 | SRIW1 | SRIW1 | SRIW1 | SRIW1 | SRRW1 | SRRW1 | SRRW1 | SRRW1 | SRRW1 | SRRW1 | XXXX01 WORD REGISTER-SHIFTS |
| 101XXX | A2 |  |  |  |  |  |  |  |  |  |  |  |  |  |  |
|  | A3 |  |  |  |  |  |  |  |  |  |  |  |  |  |  |
| 110XXX | A1 | SRIL1 | SRIL1 | SRIL1 | SRIL1 | SRIL1 | SRIL1 | SRIL1 | SRRL1 | SRRL1 | SRRL1 | SRRL1 | SRRL1 | SRRL1 | XXXX10 LONG REGISTER-SHIFTS |
|  | A2 |  |  |  |  |  |  |  |  |  |  |  |  |  |  |
|  | A3 |  |  |  |  |  |  |  |  |  |  |  |  |  |  |
| 111000 | A1 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | 1XXX11 |
| 111001 | A2 |  |  |  |  |  |  |  |  |  |  |  |  |  |  |
| 111010 | A3 |  |  |  |  |  |  |  |  |  |  |  |  |  |  |
| 111011 | A1 |  |  |  |  |  |  |  |  |  |  |  |  |  |  |  |
| 111100 | A2 |  |  |  |  |  |  |  |  |  |  |  |  |  |  |  |
| 111101 | A3 |  |  |  |  |  |  |  |  |  |  |  |  |  |  |  |
| 11111X | A1 |  |  |  |  |  |  |  |  |  |  |  |  |  |  |  |
|  | A2 |  |  |  |  |  |  |  |  |  |  |  |  |  |  |  |
|  | A3 |  |  |  |  |  |  |  |  |  |  |  |  |  |  |  |

SHIFT LINE 1110 ASx, LSx, ROx, ROXx

FIG. 2IU

INSTRUCTION REGISTER SEQUENCE DECODER FOR MICROPROGRAMMED DATA PROCESSOR AND METHOD

TABLE OF CONTENTS

Subject

Cross Reference to Related Applications
Technical Field
Background Art
Brief Summary of the Invention
Brief Description of the Drawings
Detailed Description of a Preferred Embodiment
Structural Overview of Preferred Embodiment
Instruction Register Sequence Decoder
Two-level Microprogrammed Control Unit
Conditional Branch Logic
ALU and Condition Code Control Unit
Claims
List of Microwords: Appendix A
Abbreviations: Appendix B
Conditional Branch Choices: Appendix C
Abbreviations: Appendix D
Abbreviations: Appendix E
Instructions: Appendix F
Word Formats: Appendix G
Microword Sequences: Appendix H

CROSS-REFERENCE TO RELATED APPLICATIONS

1. "Microprogrammed Control Apparatus Having a Two-Level Control Store For Data Processor", invented by Tredennick et al, bearing Ser. No. 961,796, filed Nov. 17, 1978, now U.S. Pat. No. 4,307,445, and assigned to the assignee of the present invention.

2. "Execution Unit For Data Processor Using Segmented Bus Structure" invented by Gunter et al, bearing Ser. No. 961,798, filed Nov. 17, 1978, now U.S. Pat. No. 4,296,469, and assigned to the assignee of the present invention.

3. "Two-Level Control Store For Microprogrammed Data Processor" invented by Gunter et al, bearing Ser. No. 041,135, filed concurrently herewith and assigned to the assignee of the present invention.

4. "Conditional Branch Unit For Microprogrammed Data Processor" invented by Tredennick et al, bearing Ser. No. 041,201, filed concurrently herewith and assigned to the assignee of the present invention.

5. "ALU And Condition Code Control Unit For Data Processor" invented by Gunter et al, bearing Ser. No. 041,203, now U.S. Pat. No. 4,312,034, filed concurrently herewith and assigned to the assignee of the present invention.

TECHNICAL FIELD

This invention relates generally to data processors and more particularly to a data processor having a control store containing a plurality of microinstruction routines for implementing instructions received by the data processor.

BACKGROUND ART

Recent improvements in MOS semiconductor technology have resulted in advancement in large scale integrated circuit microprocessors. The latest generation of LSI microprocessors is an order of magnitude more powerful than the previous generation of microprocessors introduced 3 or 4 years ago. The latest generation of microprocessors, has 16-bit data paths and 16-bit arithmetic capability, and they directly address mulitple-megabyte memories. In terms of functional capability and speed, such microprocessors will outperform all but the high end models of current 16-bit mini computers.

LSI microprocessor design is now at the stage where better implementation techniques are required in order to control complexity and meet tight design schedules. One technique for achieving these goals is to use microprogramming for controlling the processor. Most of the traditionally claimed benefits of microprogramming, for example, regularity (to decrease complexity), flexibility (to ease design changes), and reduced design costs, apply to the implementation problems for current LSI microprocessor design.

Generally, a data processor performs a series of operations upon digital information in an execution unit according to a stored program of instructions. These instructions are often termed "macroinstructions" in order to avoid confusion with the microinstructions contained in the control store of the data processor. Each of the macroinstructions indicates to the data processor a particular operation to be performed. In addition, most macroinstructions specify the address of one or more operands upon which the operation will be performed. There are several ways in which these operands may be specified. In some cases, the operand is already contained by a register within the data processor execution unit. In other cases, however, the operand is stored in memory external to the data processor. Occasionally, the operand is located in a memory location immediately following the memory location from which the current macroinstruction was obtained (so called immediate addressing). In other cases, the operand is stored at a location in memory which is referenced by one of the data processor registers (so called effective addressing).

Thus, in order to execute a macroinstruction, the data processor must typically perform a series of microinstructions for computing the address and acquiring each of the operands and perform another series of microinstructions for performing the operation specified by the macroinstruction upon the acquired operands.

Data processors are usually adapted to perform many different types of operations. However, the various macroinstructions often use common addressing modes for specifying the operands associated with the particular instruction. Where a group of different macroinstructions use the same addressing mode, the size of the micro control store can be reduced by allowing this group of macroinstructions to share a single series of microinstructions for obtaining the operand rather than repeating this series of microinstructions for each of the several macroinstructions. Known data processors which provide such a microinstruction routine sharing capability generally include an instruction decoder which provides a starting address or pointer into a particular microinstruction routine corresponding to the particular macroinstruction. The particular microinstruction routine then branches to the shared microinstruction routine for computing the address of the operand and acquiring the operand. After the operand is acquired, control is returned to the particular microinstruction routine for performing the desired operation. The particular microinstruction routine may be considered analogous to a main program, while the shared microinstruction routine is analogous to a subroutine which is called by the main program.

The major disadvantage of this approach is the extra time which is required to effect the calls to and returns from the microinstruction addressing mode subroutines. Each time a subroutine is called, a return address must be saved so that control can be returned to the main program at the completion of the subroutine. Saving the return address requires extra time. It should be appreciated by those skilled in the art that a data processor which allows a series of microinstructions to be shared among many data processor operations while eliminating time delays typically associated with subroutine calls and returns is a significant improvement over the prior art.

A data processor must also respond to special circumstances which may arise during program execution. The special circumstances may be apparent from the macroinstruction itself, e.g. an illegal macroinstruction. Alternatively, a special circumstance may arise independently from the macroinstruction program, e.g., an interrupt from a peripheral device. In either case, the data processor must alter the normal flow of microinstructions in order to deal with the special circumstance.

BRIEF SUMMARY OF THE INVENTION

It is an object of the present invention to provide a data processor which employs a plurality of internally stored microinstruction routines for executing a plurality of macroinstructions received by the data processor such that one or more generalized microinstruction routines may be used by the data processor in order to execute a plurality of macroinstructions.

It is also an object of the present invention to reduce the time required by a data processor when branching from one microinstruction routine to another microinstruction routine in order to execute a macroinstruction received by the data processor.

It is a further object of the present invention to provide a data processor having a control structure which may be microprogrammed and which is suitable for responding to special conditions by specifying special microinstruction routines.

These and other objects of the present invention are accomplished by providing a data processor which includes an instruction register for storing the macroinstruction to be executed, a decoder responsive to the stored macroinstruction for generating two or more starting addresses, and a selector which receives the starting addresses generated by the decoder and which selects one of the starting addresses as a next address in response to one or more selection signals. The data processor also includes a control structure which receives the next address chosen by the selector and which, in response to the next address, provides an output control word for controlling execution of the stored macroinstruction. Also in response to the next address, the control structure derives the selection signals to which the selector will respond in order to select a subsequent next address. The decoder and selector may be adapted such that an additional starting address is provided to the selector such that the selector chooses this additional starting address regardless of the condition of the one or more selection signals generated by the control structure. The control structure may be implemented with a microprogrammed control store containing a plurality of microinstruction routines each having a corresponding starting address such that the starting addresses generated by the decoder correspond to various microinstruction routines contained in the microprogrammed control store.

BRIEF DESCRIPTION OF THE DRAWINGS

FIG. 3 is a simplified block diagram of the execution unit used within the data processor for executing macroinstructions.

FIGS. 7A-7D illustrate the concept of functional branching within the micro control store implemented through the use of the instruction register sequence decoder.

FIG. 8 illustrates first and second formats for microwords contained by the micro control store, the first format corresponding to direct branch type micro words and the second format corresponding to conditional branch type microwords.

FIGS. 10A-10D illustrate the locations of the various microwords within the micro control store.

FIGS. 11A-11F illustrate the control store addresses to which each of the nanowords in the nano control store is responsive.

FIG. 16 is an ALU control table which illustrates the operations which can be performed by the ALU within the execution unit.

FIG. 17 illustrates an ALU Function And Condition Code table having 15 rows and 5 columns which specify the ALU function and the manner in which the condition codes are to be controlled for various macroinstructions.

FIG. 18 is an ALU Function Control And Condition Code Decoder table which illustrates the relationship between the opcodes for various macroinstructions and the rows in the table shown in FIG. 18.

FIGS. 20A-20B illustrate circuitry for implementing the 15-row by 5-column table shown in FIG. 18 for generating the control signals used to specify the ALU function and to control setting of the condition codes.

FIGS. 21A-21N and 21P-21U are tables which illustrate the $A_1$, $A_2$, and $A_3$ starting addresses generated by the instruction register sequence decoder for each of the macroinstructions.

DETAILED DESCRIPTION OF A PREFERRED EMBODIMENT

Figure 1:
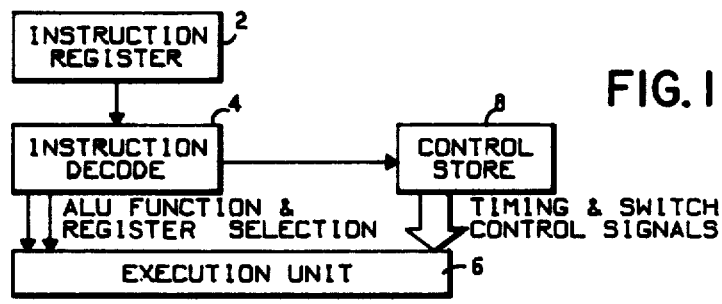
FIG. 1 is a simplified block diagram of a data processor employing a microprogrammed control store.

In FIG. 1, a simplified block diagram of a data processor is shown which employs a microprogrammed control structure to effect execution of macroinstructions received by the data processor. Instruction register 2 stores a macroinstruction received from a program memory. The stored macroinstruction is output by instruction register 2 to instruction decode block 4. Instruction decode block 4 derives information from the instruction such as a function to be performed by an arithmetic-logic unit (ALU) within execution unit block 6, as well as the registers which will provide data to the ALU and the registers which will store the result formed by the ALU. Instruction decode block 4 is also coupled to a control store block 8 which provides timing and control signals to execution unit 6.

The execution of a particular macroinstruction may require several execution unit time periods, or microcycles, such that various transfers and functions are performed by execution unit 6 during each of the execution unit time periods. The timing and control signals provided by control store block 8 insure that the proper transfers and operations occur during each of the execution unit time periods.

STRUCTURAL OVERVIEW OF PREFERRED EMBODIMENT

Figure 2:
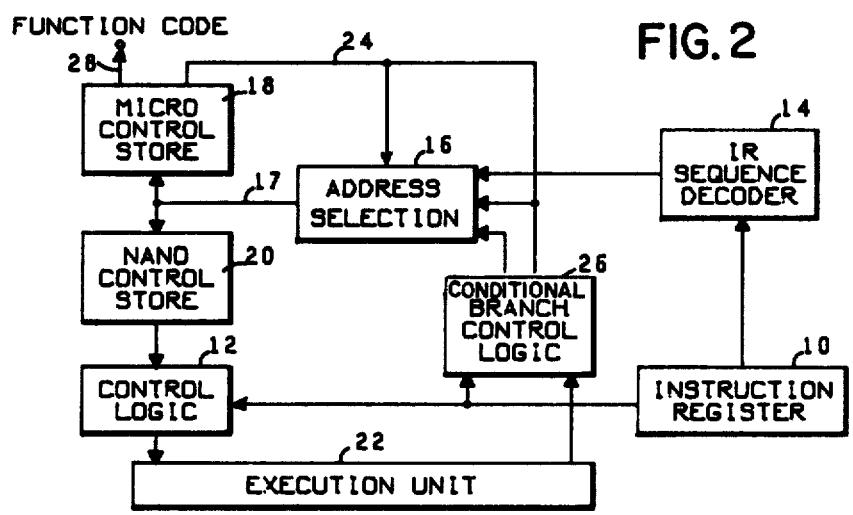
FIG. 2 is a more detailed block diagram of a data processor of the type shown in FIG. 1 according to a preferred embodiment of the invention.

In FIG. 2, a more detailed block diagram is shown which illustrates a preferred embodiment of the present invention. Instruction register 10 receives a macroinstruction from a program memory and stores this instruction. Instruction register 10 is coupled to control logic block 12 which extracts from the stored macroinstruction information which is static over the time period during which the stored macroinstruction is executed. Examples of macroinstruction static information are source and destination registers, ALU operation (addition, subtraction, multiplication, exclusive-OR), and immediate values contained within the instruction word such as address displacements and data constants.

Instruction register 10 is also coupled to instruction register sequence decoder block 14. In response to the macroinstruction stored by instruction register 10, instruction register sequence decoder 14 generates one or more starting addresses. Instruction register sequence decoder 14 is coupled to address selection block 16 for providing the one or more starting addresses. Line 17 couples the output of address selection block 16 to a control store which includes micro control store 18 and nano control store 20. In response to the address selected onto line 17, nano control store 20 selects a nanoword which contains field-encoded control words for directing action in the execution unit. Nano control store 20 is coupled to control logic 12 which decodes the various fields in the nano control word in combination with the macroinstruction static information received directly from instruction register 10. The output of control logic 12 is coupled to execution unit 22 for controlling the various operations and data transfers which may be performed within execution unit 22.

Micro control store 18 is responsive to the selected address on line 17 for selecting a microword. Line 24 couples an output of micro control store 18 to address selection block 16 and to conditional branch control logic block 26. The selected microword contains information which generally determines the source of the next micro instruction address to be selected. The selected microword may also provide the address of the next micro instruction.

Execution unit 22 stores various condition code flags which are set or reset depending upon the status of ALU operations such as positive/negative result, zero result, overflow, and carry-out. In the event that the selection of the next micro instruction address is dependent upon one or more of these condition code flags, the microword provided by micro control store 18 also includes information provided to conditional branch control logic 26 for specifying which of the condition code flags will be used to determine the selection of the next micro instruction. In some cases, the macroinstruction itself specifies the condition code flags which are to be used to select the next micro instruction (for example, a conditional branch macroinstruction such as branch on zero). For this reason, instruction register 10 is also coupled to conditional branch control logic 26. Execution unit 22 is coupled to conditional branch control logic 26 for providing the various condition code flags. Conditional branch control logic 26 is coupled to address selection block 16 for specifying a portion of the next micro instruction address.

Micro control store 18 has a second output which is coupled to line 28. The selected microword includes a function code field which specifies the function of the current micro instruction. Line 28 provides the function code field to peripheral devices external to the data processor for communicating information about the current micro instruction.

In general, instruction register sequence decoder 14 provides a starting address for micro control store 18 which then produces a sequence of addresses for the nano control store 20. The associated nanowords are decoded by the control logic 12 and mixed with timing information. The resulting signals generated by control logic 12 are used to drive control points in execution unit 22.

In FIG. 3, a simplified block diagram of execution unit 22 (in FIG. 2) is shown. The execution unit is a segmented two-bus structure divided into three sections by bidirectional bus couplers. The left-most segment contains the high order word for the address and data registers and a simple 16-bit arithmetic unit. The middle segment contains the low order word for the address registers and a simple 16-bit arithmetic unit. The right-most segment contains the low order word for the data registers and an arithmetic and logic unit. The execution unit also contains an address temporary register and a data temporary register, each of which is 32 bits wide. In addition there are also several other temporary registers and special function units which are not visible to a programmer.

With reference to FIG. 3, a first digital bus 10' and a second digital bus 12' have been labeled ADDRESS BUS DATA and DATA BUS DATA, respectively. A group of 16-bit data registers, illustrated by block 14', is coupled to digital buses 10' and 12' such that block 14' can provide a 16-bit data word to either digital bus 10' or digital bus 12'. Similarly block 14' may receive from either bus 10' or bus 12' a 16-bit data word which is to be stored in one of the registers. It is to be understood that each of the digital buses 10' and 12' is adapted for transmitting 16 bits of digital information. The 16-bit registers contained by block 14' comprise the least significant 16 bits of a corresponding plurality of 32-bit data registers.

Blocks 16' and 18' are also coupled to digital buses 10' and 12'. Block 16' contains special function units not directly available to the programmer. Among the special function units are a priority encoder, used to load and store multiple registers, and a decoder, used to perform bit manipulation. Block 18' contains an arithmetic and logic unit which receives a first 16-bit input from bus 10' and a second 16-bit input from bus 12' and generates a 16-bit result. The 16-bit result may then be transferred onto either bus 10' or bus 12'.

Also shown in FIG. 3 is a third digital bus 20' and a fourth digital bus 22'. Bus 20' and bus 22' have been labeled ADDRESS BUS LOW and DATA BUS LOW, respectively. Block 24' is coupled to both bus 20' and bus 22' and contains a plurality of 16-bit address registers. These registers comprise the least significant 16 bits of a corresponding plurality of 32-bit address registers. Block 24' can provide a 16-bit address word to either bus 20' or 22'. Similarly block 24' can receive a 16-bit address word from either bus 20' or bus 22' for storage in one of the 16-bit address registers.

Block 26' is also coupled to bus 20' and bus 22' and contains an arithmetic unit for performing computations. Block 26' can receive a first 16-bit input from bus 20' and a second 16-bit input from bus 22' and generates a 16-bit result. The 16-bit result produced by ARITHMETIC UNIT LOW 26' may be transferred onto bus 20' or onto bus 22'. ARITHMETIC UNIT LOW 26' also produces a carry-out signal (not shown) which may be used in computations involving the most significant 16 bits of a 32-bit address word. Although not shown in FIG. 3, a field translate unit (ftu) is also coupled to bus 20' and bus 22' and may be used to transfer digital information between the execution unit and other sections of the data processor. First and second bidirectional bus switches 28' and 30' are shown coupled between bus 10' and bus 20' and between bus 12' and bus 22', respectively.

Also shown in FIG. 3 is a fifth digital bus 32' and a sixth digital bus 34'. Bus 32' and bus 34' have been labeled ADDRESS BUS HIGH and DATA BUS HIGH, respectively. Block 36' is coupled to both bus 32' and bus 34' and contains a plurality of 16-bit address registers and another plurality of 16-bit data registers. The address registers within block 36' comprise the most significant 16 bits of the 32-bit address registers formed in conjunction with the registers contained by block 24'. The 16-bit data registers within block 36' comprise the most significant 16 bits of a plurality of 32-bit data registers formed in conjunction with the data registers contained by block 14'.

Block 38' is also coupled to bus 32' and bus 34' and contains an arithmetic unit for performing computations upon the most significant 16 bits of either address or data words. Block 38' receives a first 16-bit input from bus 32' and a second 16-bit input from bus 34' and generates a 16-bit result. The 16-bit result produced by ARITHMETIC UNIT HIGH 38' may be transferred onto bus 32' or bus 34'. As previously mentioned, ARITHMETIC UNIT HIGH 38' can be responsive to a carry out produced by block 26' such that a carry out from the least significant 16 bits is considered a carry in to the most significant 16 bits. Third and fourth bidirectional bus switches 40' and 42' are shown coupled between bus 32' and bus 20' and between bus 34' and bus 22', respectively.

Thus it may be seen that the register file for the data processor is divided into three sections. Two general buses (ADDRESS BUS, DATA BUS) connect all of the words in the register file. The register file sections (HIGH, LOW, DATA) are either isolated or concatenated using the bidirectional bus switches. This permits general register transfer operations across register sections. A limited arithmetic unit is located in the HIGH and LOW sections, and a general capability arithmetic and logical unit is located in the DATA section. This allows address and data calculations to occur simultaneously. For example, it is possible to do a register-to-register word addition concurrently with a program counter increment (the program counter is located adjacent to the address register words, and carry out from the ARITHMETIC UNIT LOW 26' is provided as carry in to ARITHMETIC UNIT HIGH 38'). Further details of the execution unit are set forth in co-pending application "Execution Unit For Data Processor Using Segmented Bus Structure" bearing Ser. No. 961,798, filed Nov. 17, 1978, invented by Gunter et al and assigned to the assignee of the present invention, which is hereby incorporated by reference.

Figure 4:
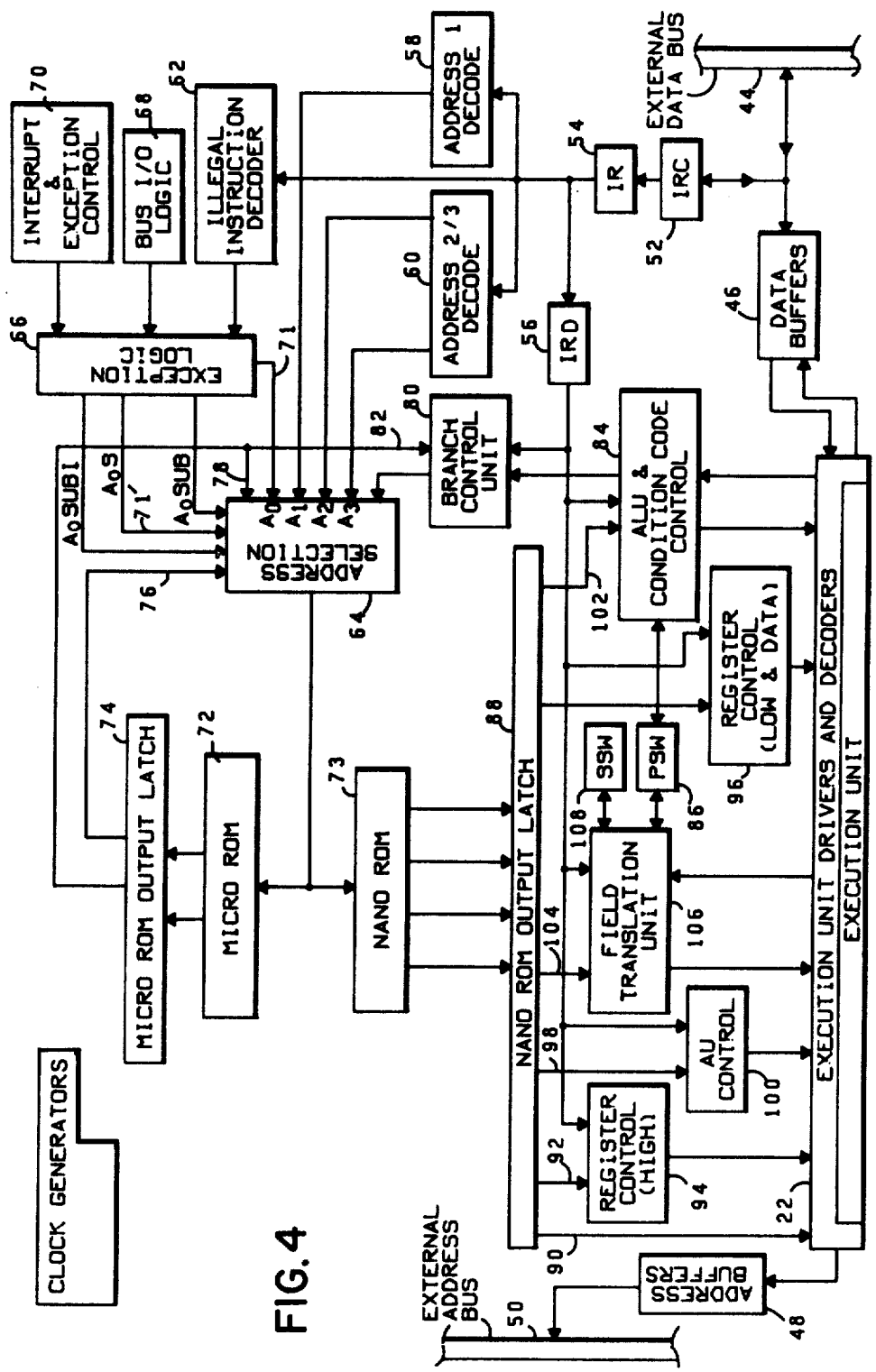
FIG. 4 is a block diagram which illustrates the data processor shown in FIG. 2 in further detail.

In FIG. 4, a detailed block diagram is shown of the data processor generally illustrated in FIG. 2. A bidirectional external data bus 44 is a 16-bit bus to which the data processor is coupled for transmitting data to and receiving data from peripheral devices. The data processor includes data buffers 46 coupled between external data bus 44 and execution unit 22 for transferring data between the execution unit and the external data bus. Execution unit 22 includes drivers and decoders which are shown generally along the periphery of execution unit 22. Execution unit 22 is also coupled to address buffers 48 which are in turn coupled to external address bus 50. An address provided by execution unit 22 to external address bus 50 typically specifies the location from which the data on bus 44 was read or the location to which the data on bus 44 is to be written. In the preferred embodiment, external address bus 50 is 24-bits wide such that a memory addressing range of more than 16 mega-bytes is provided.

External data bus 44 is also coupled to the input of 16-bit IRC register 52. The output of IRC register 52 is coupled to the input of 16-bit IR register 54. The output of IR register 54 is coupled to the input of 16-bit IRD register 56. Also coupled to the output of IR register 54 are the inputs to block 58 (ADDRESS I DECODER) and block 60 (ADDRESS § DECODER) as well as the input to block 62 (ILLEGAL INSTRUCTION DECODER). The use of IRC register 52, IR register 54, and IRD register 56 allows the data processor to operate in a pipelined manner; IRC register 52 stores the next macroinstruction, and IR register 54 stores the macroinstruction currently being decoded, while IRD register 56 stores the macroinstruction currently being executed. The output of block 58 is coupled to the $A_1$ input of address selector 64. A first output of block 60 is coupled to the $A_2$ input of address selector 64 and a second output of block 60 is coupled to the $A_3$ input of address selector 64. The output signals provided by block 58 and block 60 are microroutine starting addresses associated with a macroinstruction stored by IR register 54 as will be later explained in further detail.

The output of Illegal Instruction Decoder 62 is coupled to exception logic block 66. Also coupled to block 66 are block 68 (BUS I/O LOGIC) and block 70, (INTERRUPT AND EXCEPTION CONTROL). A first output of exception logic block 66 is coupled by line 71 to the $A_0$ input of address selector 64 for providing a special microroutine starting address. A second output of exception block 66 is coupled by line 71' ($A_0S$) to another input of address selector 64 for providing a second special microroutine starting address. Two additional outputs of exception logic block 66, $A_0SUB$ and $A_0SUBI$, respectively, are also coupled to address selector 64.

The output of address selector 64 is coupled to the input of micro ROM 72 and the input of nano ROM 73 for providing a selected address. The output of micro ROM 72 is coupled to micro ROM output latch 74 which stores the microword selected by micro ROM 72 in response to the address selected by address selector 64. The output of micro ROM output latch 74 is coupled to address selector 64 by lines 76 and 78 and to branch control unit 80 by line 82. While the output of latch 74 is shown as a single line, it is understood that several lines may be present, each terminating at the block indicated above. Line 76 can provide a direct branch address as an input to address selector 64 while line 78 can specify to address selector 64 the source of the next address to be selected. In the event of a conditional branch, line 82 specifies the manner in which branch control unit 80 is to operate. Branch control unit 80 is also coupled to address selector 64 in order to modify the selection of the next micro/nano store address in order to accomplish conditional branching in a microroutine, as will be further explained hereinafter.

IRD register 56 has an output coupled to branch control unit 80 for supplying branch control information directly from a macroinstruction word. Branch control unit 80 is also coupled to an output of ALU AND CONDITION CODE CONTROL block 84 for receiving various condition code flags. PSW register 86 is coupled to block 84 and stores several of the condition code flags. Execution unit 22 is also coupled to block 84 for supplying other condition code flags.

Still referring to FIG. 4, nano ROM 73 is coupled to nano ROM output latch 88 for supplying a nanoword associated with the address selected by address selector 64. Various bit fields of the nanoword stored by latch 88 are used to control various portions of execution unit 22. Line 90 is coupled directly from latch 88 to execution unit 22 for controlling such functions as transferring data and addresses between the execution unit 22 and external buses 44 and 50. Line 92 is coupled from latch 88 to register control block 94. IRD register 56 is also coupled to register control block 94. Bit fields within IRD register 56 specify one or more registers (source, destination) which are to be used in order to implement the current macroinstruction. On the other hand, bit fields derived from latch 88 and supplied by line 92 specify the proper micro cycle during which source and destination registers are to be enabled. The output of block 94 is coupled to execution unit 22 for controlling the registers located in the HIGH section of the execution unit (block 36' in FIG. 3). In a similar manner, register control block 96 also has inputs coupled to latch 88 and IRD register 56 and is coupled to execution unit 22 for controlling the registers located in the LOW and DATA sections of the execution unit.

Line 98 couples latch 88 to AU control block 100 for supplying a bit field extracted from the nano word. Block 100 is also coupled to IRD register 56. Bit fields in the macroinstruction stored by IRD register 56 specify an operation to be performed by the ARITHMETIC UNIT HIGH and ARITHMETIC UNIT LOW in execution unit 22 (block 38' in FIG. 3). Information supplied by line 98 specifies the proper micro cycle during which the inputs and outputs of the ARITHMETIC UNIT HIGH and ARITHMETIC UNIT LOW are enabled. The output of AU control block 100 is coupled to execution unit 22 for controlling the arithmetic units in the HIGH and LOW sections.

Line 102 couples latch 88 to ALU AND CONDITION CODE CONTROL block 84. IRD register 56 is also coupled to block 84. Bit fields derived from the macroinstruction stored in IRD register 56 indicate the type of operation to be performed by the ALU in execution unit 22. Bit fields derived from the nanoword stored in latch 88 specify the proper micro cycles during which the input and outputs of the ALU are to be enabled. An output of block 84 is coupled to execution unit 22 for controlling the ALU. Block 84 also provides an output to PSW register 86 for controlling the condition code flags stored therein.

Line 104 couples latch 88 to FIELD TRANSLATION UNIT 106. IRD register 56 is also coupled to FIELD TRANSLATION UNIT 106. Also coupled to FIELD TRANSLATION UNIT 106 are PSW register 86 and special status word (SSW) register 108. PSW register 86 stores information such as the current priority level of the data processor for determining which interrupts will be acknowledged. PSW register 86 also specifies whether or not the processor is in the TRACE mode of operation and whether the processor is currently in a supervisor or user mode. SSW register 108 is used to monitor the status of the data processor and is useful for recovering from error conditions. FIELD TRANSLATION UNIT 106 can extract a bit field from the macroinstruction stored in IRD register 56 for use by the execution unit such as supplying an offset which is to be combined with an index register. FTU 106 can also supply bit fields extracted from PSW register 86 and SSW register 108 to the execution unit 22. FTU 106 can also be used to transfer a result from execution unit 22 into PSW register 86.

INSTRUCTION REGISTER SEQUENCE DECODER

Figure 5:
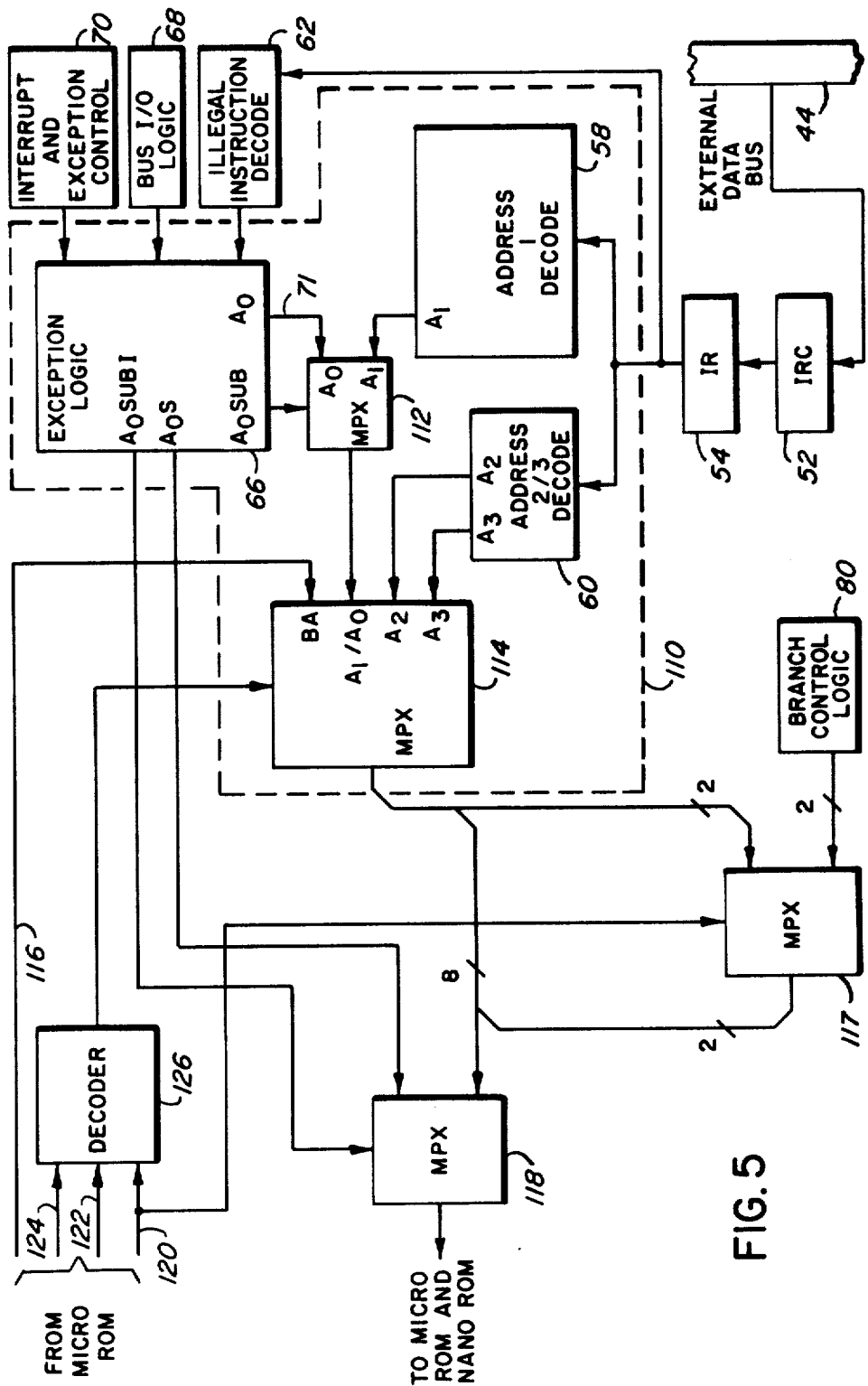
FIG. 5 is an expansion of a portion of the block diagram shown in FIG. 4 and illustrates an instruction register sequence decoder within the data processor.

In FIG. 5, a portion of FIG. 4 which includes an Instruction Register Sequence Decoder has been expanded in greater detail. Blocks in FIG. 5 which correspond to those already shown in FIG. 4 have been identified with identical reference numerals. Blocks 58, 60, and 66 are included within dashed block 110 which forms the Instruction Register Sequence Decoder. Instruction Register 54 (IR) receives a macroinstruction from a program memory via bus 44 and IRC register 52 and stores this instruction. The output of IR register 54 is coupled to illegal instruction decoder 62 which detects invalid macroinstruction formats. The output of IR register 54 is also coupled to an ADDRESS 1 DECODER 58 and ADDRESS 1 DECODER 60. Decoders 58 and 60 are programmed logic array (PLA) structures in the preferred embodiment. PLA structures are well known by those skilled in the art. For example, see "PLAs Enhance Digital Processor Speed and Cut Component Count", by George Reyling, *Electronics,* Aug. 8, 1974, p. 109. In response to the macro instruction stored by register 54, decoder 58 provides a first starting address at an output $A_1$ which is coupled to multiplexer 112.

Exception logic block 66 is coupled to the output of illegal instruction decoder 62, the output of BUS I/O logic block 68 and the output of interrupt and exception block 70. Bus I/O logic block 68 is used to detect bus and address errors. A bus error may indicate to the data processor that a peripheral device (e.g., a memory) addressed by the data processor has not responded within an allowable period of time. An address error may indicate that an illegal address has been placed on the external address bus.

Interrupt and exception block 70 indicates such things as the occurrence of interrupts, the occurrence of a reset condition, and a trace mode of operation. An interrupt condition may occur when a peripheral device indicates that it is ready to transmit data to the data processor. The reset condition may indicate that the power supply to the data processor has just been activated such that internal registers must be reset or that a reset button has been depressed in order to recover from a system failure. A trace mode of operation may indicate that a tracing routine is to be performed after the execution of each macroinstruction in order to facilitate instruction-by-instruction tracing of a program being debugged.

Illegal instruction decode block 62 indicates illegal macroinstruction formats as well as privilege violations. An illegal instruction format is one to which the data processor is not designed to respond. The privilege violation condition refers to a feature of the data processor which allows operation in supervisor and user modes. Certain instructions may be executed only when the data processor is in a supervisor mode, and the privilege violation condition arises upon the attempted execution of one of these special instructions while in the user mode of operation.

All of the above mentioned special conditions require that the data processor temporarily stop executing macroinstructions in order to execute special microinstruction routines for dealing with the occurrence of the particular special condition. If some of the special conditions (e.g., interrupt, trace) arise, the data processor proceeds normally until it reaches the next instruction boundary, i.e., the processor completes the execution of the current macroinstruction prior to branching to the special microinstruction routine. However, when other special conditions (e.g., address error, bus error, reset) arise, the data processor immediately branches to one of the special microinstruction routines without completing the current macroinstruction, since the occurrence of the special condition may prevent successful execution of the current macroinstruction.

Still referring to FIG. 5, exception logic block 66 includes an output $A_0$ which is coupled over line 71 to multiplexer 112 for supplying a special microroutine starting address. Exception logic block 66 also includes output $A_0SUB$ which is coupled to multiplexer 112 for determining whether starting address $A_0$ or starting address $A_1$ is to be selected as the output of multiplexer 112. Starting address $A_0$ is selected upon the occurrence of special conditions of the type which await the completion of the execution of the current macroinstruction before causing control to be transferred to the special microinstruction routine.

The output of multiplexer 112 is coupled to the $A_1/A_0$ input of multiplexer 114. Decoder 60, in response to the macroinstruction stored by register 54, provides second and third starting addresses at output $A_2$ and $A_3$ which are coupled to the $A_2$ and $A_3$ imputs of multiplexer 114, respectively. Multiplexer 114 also includes a BA input which is coupled to line 116 for receiving a branch address from the micro ROM. Each of the addresses received by multiplexer 114 is 10-bits wide.

The output of multiplexer 114 provides a selected address having 10-bits and is coupled to a first input of multiplexer 117 for supplying two of the ten output bits. The output of multiplexer 114 is also coupled to a first input of multiplexer 118 for supplying the other eight bits of the selected address directly to multiplexer 118. Branch control logic 80 is coupled to a second input of multiplexer 117 for supplying two branch bits. The output of multiplexer 117 is coupled to multiplexer 118 for supplying two selected bits to be used in conjunction with the eight bits supplied directly from multiplexer 114, thereby allowing for a four-way branch.

Exception logic 66 includes an output $A_0S$ which is coupled to a second input of multiplexer 118 for supplying a second special microroutine starting address. Exception logic 66 also includes an output $A_0SUBI$ which is coupled to the control input of multiplexer 118 and which causes special address $A_0S$ to be selected at the output of multiplexer 118 in the event that an address error, bus error, or reset condition has been detected. In the absence of such a condition, multiplexer 118 provides at its output the address selected by multiplexer 114 in combination with multiplexer 117. The output of multiplexer 118 is coupled to the address intput ports of the micro ROM and nano ROM (72, 73 in FIG. 4).

FIG. 5 also includes three conductors 120, 122, and 124 which are coupled to the output of the micro ROM latch (latch 74 in FIG. 4), each of the conductors receiving a bit in the selected micro word. Conductor 120 is coupled to a control input of multiplexer 117 for indicating a conditional branch point in the micro instruction routine. Conductors 120, 122, and 124 are coupled to decoder 126, and the output of decoder 126 is coupled to a control input of multiplexer 114 for causing the proper address to be selected at the output of multiplexer 114. The relationship between the microword bits conducted by conductors 120, 122, and 124 and the address selected by multiplexers 114 and 117 will be described in further detail hereinafter. It will be sufficient to realize at this point that the signals conducted by conductors 120, 122, and 124, and the address conducted by line 116 are all derived from the microword addressed during the previous micro cycle.

Figure 6:
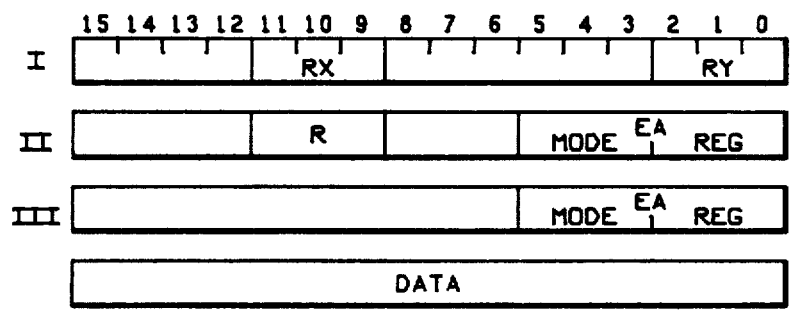
FIG. 6 illustrates several formats for macroinstructions which are processed by the data processor.

In order to understand the advantages provided by the instruction register sequence decoder, it will be helpful to described the various types of macroinstructions which can be executed by the data processor illustrated in FIG. 2. In FIG. 6, three different types of macroinstruction formats are illustrated (I, II, III). Instruction 1 is a register-to-register type instruction in which bits 0.1, and 2 specify a source register (R y) and bits 9, 10, and 11 specify a destination register (Rx). The remainder of the bits in the 16-bit instruction word identify the type of operation to be performed (add, substract, etc.) and identify this instruction as one which uses register-to-register type addressing.

In instruction format II, bits 0 through 5 are an effective address field or simply an effective address (EA). The EA is composed of two 3-bit subfields which are the mode specification field and the register specification field. In general, the register specification field selects a particular register; the mode specification field determines whether the selected register is an address register or a data register and also specifies the manner in which the address of the desired operand is to be computed based upon the specified register. For a typical type II instruction, the EA field specifies the source operand, while bits 9, 10, and 11 specify one of the internal registers as the destination operand. The remainder of the bits in the 16-bit instruction specify the type of operation to be performed and indicate that this instruction is a type II instruction.

In type III instructions, the instruction may be composed of two or more 16-bit words wherein bits 0 through 5 of the first 16-bit word specify the effective address of a destination operand as previously described for type II instructions. However, the remainder of the bits in the first word of type III instructions indicate that the instruction includes a second 16-bit word which contains the data to be used in conjunction with the destination operand in order to perform the operation. Type III instructions use effective addressing to obtain the destination operand and so-called "immediate addressing" to obtain a second operand which is stored in a memory location immediately following the memory location from which the first word of the instruction was obtained.

In order to execute type I instructions, the data processor can immediately begin performing a microinstruction routine specifically designed to execute the type of operation indicated by the instruction word, since the operands are already contained by internal registers of the data processor. For type II instructions, however, a generalized effective address microinstruction routine must be performed in order to access the operand referenced by the EA field prior to executing a specific microinstruction routine used to perform the operation indicated by the macroinstruction. For immediate-type instructions, a pre-fetch operation results in the immediate operand being stored in both IRC register 52 and in a data bus input latch located within DATA BUFFERS block 46 (see FIG. 4). Thus, in type III instructions, a first generalized microinstruction routine must be performed in order to transfer the immediate operand from the data bus input latch to a temporary register in the execution unit and in order to repeat the pre-fetch operation such that the next macroinstruction is loaded into IRC register 52. Then, the generalized routine described with regard to type II instructions must be performed in order to obtain the operand referenced by the EA field. Finally, after the EA microinstruction routine has been completed, a specific microinstruction routine must be executed in order to perform the operation indicated by the first word of the instruction. The effective address microinstruction routines can be generalized because all type II and type III instructions use the same EA format. Similarly, the immediate addressing microinstruction routine can be generalized because all type III instructions access immediate operands in the same manner.

With reference to FIG. 5, the operation of decoders 58 and 60 and exception logic 66 within the instruction register sequence decoder 110 will be described by referring to FIGS. 7A, 7B, 7C, and 7D. In normal operation, multiplexer 114 chooses starting address $A_1/A_0$ to point to the first microinstruction routine required to execute the macroinstruction presently stored in IR register 54. Starting address $A_1/A_0$ is selected at instruction boundaries because the very last microinstruction performed during the execution of the previous macroinstruction indicates, by way of decoder 126, that $A_1$ should be selected as the next starting address.

In the event that a special condition arises during the execution of a macroinstruction, exception logic 66 enables the $A_0$SUB output such that the multiplexer 112 will substitute starting address $A_0$ in place of starting address $A_1$ when execution of the current macroinstruction is completed. Some of the special conditions require initiation of a special microinstruction routine without waiting for the execution of the previous macroinstruction to be completed. In this case, exception logic 66 enables the $A_0$SUBI output which immediately causes starting address $A_0$S on line 71' to be selected by multiplexer 118 as the next address for the micro control store in order to cause a branch to a special microroutine.

As shown in FIG. 7A, starting addresses $A_0$ and $A_0$S reference one of several special microinstruction routines in order to deal with the specific special condition that has arisen. A common feature of each of the special microroutines is that the last microword in each routine causes the signals conducted by conductors 120, 122, and 124 in FIG. 5 to specify to multiplexer 114 that starting address $A_1$ is the next address to be input to the micro control store.

As is shown in FIG. 7B, starting address $A_1$ may reference a generalized immediate routine, a generalized effective address routine, or a specific operation routine depending upon the type of instruction presently stored in the instruction register. Each of these routines accomplishes a separate function, and the transfer of control from one routine to another may be referred to as functional branching. For example, starting address $A_1$ will reference a specific operation routine if the instruction register has stored a type I instruction (see FIG. 6). In this event, the $A_2$ and $A_3$ addresses output by $A_2/A_3$ decoder 60 in FIG. 5 are "don't care" conditions, which simplifies the PLA structure used to implement the decoder. Starting address $A_1$ will reference an effective address routine or an immediate routine if the instruction stored by the instruction register is a type II instruction or a type III instruction, respectively. In addition to preforming the desired operation, each of the specific operation routines is effective to transfer a prefetched macroinstruction word from IRC register 52 to IR register 54 and to fetch a subsequent macroinstruction word and store it in IRC register 52. The macroinstruction word is prefetched far enough in advance to ensure that the starting addresses output from $A_1$ and $A_2/A_3$ decoders 58 and 60 are valid at the appropriate time. In addition, the last microword in each of the specific operation routines specifies that starting address $A_1$ is to be selected as the next address input to the micro control store. Each of the effective address routines concludes with a microword which specifies that starting address $A_3$ is to be selected as the next address. Starting address $A_3$ always points to a specific operation routine, as is shown in FIG. 7D. The last microword in all immediate routines causes starting address $A_2$ to be selected as the next address.

As is shown in FIG. 7C, starting address $A_2$ may reference either an effective address routine or a specific operation routine. A type III instruction (see FIG. 6) would result in starting address $A_2$ causing a branch to an effective address routine. Although not shown in FIG. 6, another type of instruction may require immediate addressing without also including an effective address field. For this type of instruction, starting address $A_2$ would reference a specific operation routine.

Thus, in order to execute a type III instruction, starting address $A_1$ is selected first which initiates a generalized microinstruction routine for processing an immediate operand. The last microword in the immediate microroutine selects $A_2$ as the next starting address which causes a direct branch to an effective address microroutine for acquiring a second operand. At the completion of the effective address routine, starting address $A_3$ is selected which causes a direct branch to a microinstruction routine for performing the desired operation and for transferring the next macroinstruction into the instruction register. At the completion of the specific operation routine, starting address $A_1$ is selected in order to begin execution of the next macroinstruction.

In Appendix F, all of the macroinstructions which are performed by the preferred embodiment of the data processor are described. In Appendix G, a breakdown of the op-codes is listed for all of the macroinstructions listed in Appendix F. FIGS. 22A-22N and 22P-22U tabulate the starting addresses A1, A2, and A3 for each macroinstruction op-code. The starting addresses tabulated in FIGS. 22A-22U are given in terms of the label of the microword addressed. The microword labels are tubulated in Appendix A. In FIGS. 22A-22U, the 4-bit code in the upper left corner corresponds to bits 15-12 of the macroinstruction. The 6-bit code to the right of each row corresponds to bits 11-6 of the macroinstruction. The 6-bit code at the bottom of each column corresponds to bits 5-0 of the macroinstruction. The columns generally correspond to the various addressing modes for each macroinstruction. RYD and RYA indicate that the operand is the contents of the designated address or data register. (RYA) indicates that the address of the operand is in the designated address register. (RYA)+ and −(RYA) indicate a post-increment and pre-decrement mode wherein the designated address register is either incremented after or decremented before the operand address is used. (RYA)+d$_{16}$ and (RYA)+(X)+d$_8$ refer to adding a 16-bit displacement to the designated address register in order to specify the operand address or adding an index register and an 8-bit displacement to the designated address register in order to specify the operand address. ABSW and ABSL indicate that the operand address is either the 16-bit word of 32-bit double-word which follows the first word of the macroinstruction in the program memory. (PC)+d$_{16}$ and (PC)+(X)+d$_8$ indicate that the operand address is either the contents of the program counter plus a 16-bit displacement or the contents of the program counter plus an index register plus an 8-bit displacement. The column labeled "TM" specifies that the operand is an immediate value which may be a 16-bit word or a 32-bit double-word which follows the first word of the macroinstruction in the program memory.

TWO-LEVEL MICROPROGRAMMED CONTROL UNIT

In FIG. 4, a two-level microprogrammed control unit is illustrated which includes micro ROM 72 and nano ROM 73. The micro ROM is used to direct sequencing in the control unit. Micro ROM 72 in FIG. 4 contains 544 microwords each having 17 bits. The micro ROM is addressed by the 10-bit output of address selection block 64 such that up to 1024 microwords could be addressed. However, the preferred embodiment of the data processor requires only 544 microwords. The microwords are arranged in either of two formats which are illustrated in FIG. 8. Format I in FIG. 8 is the format for all types of microwords other than those which allow conditional branching, while format II is the format for microwords which provide conditional branching. In format I, bit 1 is a "0", while in format II, bit 1 is a "1" such that bit 1 distinguishes the two possible formats. For conditional branch type microwords (format II), bits 2 thru 6 comprise a conditional branch choice field (CBC) and specify one of 32 possible branch conditions. Also in conditional branch type microwords, bits 7 thru 14 comprise a next micro ROM base address (NMBA) for the micro and nano control stores. As will be explained hereinafter, the 8-bit NMBA field is augmented by 2 additional bits supplied by branch control logic in order to specify the next address for the control stores.

For microwords having format I, bits 2 and 3 comprise a type field (TY) which specifies the source of the next address for the control stores. The address is selected either from one of the 3 possible addresses provided by the instruction register sequence decoder or from a direct branch address provided by bits 5 thru 14 of the microword which comprise a 10-bit next micro ROM address field (NMA). Referring briefly to FIG. 5, the NMA and NMBA bit fields are supplied by line 116 to the BA input of multiplexer 114. Conductors 120, 122 and 124 couple bits 1, 2, and 3, respectively, to decoder 126 such that the proper source is selected by multiplexer 114 as the next address. The selection of the source of the next address is determined by the TY field according to the table shown below.

| TY (type) | bit 3 | bit 2 | abbrev | source |
|---|---|---|---|---|
| | 0 | 0 | db | NMA |
| | 0 | 1 | a1 | Address 1 |
| | 1 | 0 | a2 | Address 2 |
| | 1 | 1 | a3 | Address 3 |

Fields common to both microword formats are the function code field (FC), comprised by bits 15 and 16, and the load instruction field (I), corresponding to bit 0. The FC field specifies the function of the current microinstruction for peripheral devices external to the data processor. The significance of the FC field is indicated in the table below.

| FC (function code) | bit 16 | bit 15 | abbrev | operation |
|---|---|---|---|---|
| | 0 | 0 | n | No Access |
| | 0 | 0 | u | Unknown Access Type |
| | 0 | 1 | d | Data Access |
| | 1 | 0 | i | Instruction Access |
| | 1 | 1 | a | Interrupt Acknowledge |

The I field (bit 0) is used to specify the micro cycle during which the instruction register is to be updated. When bit 0 is a "1", then the output of IRC register 52 is enabled into IR register 54 (see FIG. 4). Generally, this transfer is not made until the execution of the macroinstruction has proceeded into an operation type microroutine (FIGS. 7a-7d) such that the instruction register sequence decoder can begin to generate starting addresses for the next macroinstruction to be executed.

For microwords of the type having format II, bit 4 is included in the CBC field for selecting the appropriate branch condition. However, for microwords of the type having format I, bit 4 is not included in any of the previously described bit fields. In the preferred embodiment of the data processor, bit 4 is used in conjunction with bit 0 to control not only the loading of the instruction register but also the updating of a trap vector number (TVN) encoder. Referring briefly to FIG. 5, exception logic block 66 includes a series of latches for storing the status of the various special conditions such as interrupt pending, trace pending, address error, etc. The outputs of these latches are coupled to a decoder which generates the $A_0$ and $A_0S$ starting addresses. Two different latch enable signals are provided for independently latching two groups of these latches. The first group of latches monitors the special conditions which do not await an instruction boundary before diverting control in the micro ROM. The second group of latches monitors the remainder of the special conditions. To update the TVN encoder, both groups of latches are clocked such that the output of each of these latches corresponds to the signals presented to the inputs of these latches. To partially update the TVN encoder, only one of the two clock enable signals is pulsed such that only those latches coupled to this clock enable signal are allowed to take note of signals currently presented to their inputs. For microwords of the type having format I, the loading of the instruction register and the updating of the TVN encoder are specified according to the table shown below.

| C,I | bit 4 | bit 0 | abrev | result |
|---|---|---|---|---|
| | 0 | 0 | db | update neither IR nor TVN |
| | 0 | 1 | dbi | IRC to IR, update TVN |
| | 1 | 0 | dbc | IRC to IR, don't update TVN |
| | 1 | 1 | dbl | IRC to IR, partially update TVN |

The 544 microwords stored in the micro ROM are tabulated in appendix A which follows the detailed description of the invention. The table in appendix A lists for each micro word a LABEL, the corresponding function code (FC), the associated next micro control store address (NMA) for direct branch type microwords, a TYPE for selecting the source of the next address, and a conditional branch choice (CBC) for conditional branch type microwords. Also indicated in this table under the column entitled ORIGIN are instances where a microword is associated with the same nanoword in the nano control store as is a previously listed microword. The table further includes a column entitled ROW which indicates these microwords which are destinations of conditional branch type microwords. The placement of these microwords, which serve as destinations for conditional branches, is restricted since the branch address is comprised of an 8-bit base address plus a 2-bit branch field generated by branch control logic. Thus, two microwords which serve as alternate destinations for a particular conditional branch type microword must be placed in the same logical row of the micro ROM. The table also includes a column entitled DESTINATIONS which lists the microwords which are potential destinations for each of the conditional branch type microwords.

As is shown in FIG. 4, the nano control store, or nano ROM, is addressed by the same address which is used to address the micro control store, or micro ROM. Access in the nano control store is either to a single word or a logical row of words (with subsequent conditional selection of a single word in that row). Access to the nano control store is concurrent with access to the micro control store. However, while there is a one-to-one mapping in the micro control store between addresses and unique microwords, there is a many-to-one mapping of control store addresses to unique nanowords. It is possible therefore for several unique microwords to share the same nanoword.

A nanoword consists of fields of functionally encoded control signals which are decoded by the control logic (block 12 in FIG. 2) to drive the control points in the execution unit for operation of bus switches, sources, source and destination registers, temporary locations, special function units, and input/output devices. In the data processor constructed according to the preferred embodiment of the invention, each nanoword is 68 bits wide and is decoded to drive approximately 180 control points within the execution unit. The number of unique nanowords in the nano control store is 336, while the number of unique microwords in the micro control store is 544.

Since each nanoword is uniquely specified by its address, it would be possible to directly decode addresses to the nano control store in order to generate control words. This would eliminate the need for the nano control store but would greatly increase the amount of decoding logic in control block 12 of FIG. 2. At the other extreme, each control point could have an associated bit in the nanoword and no decoding of the nanoword would be necessary at all. In practice, some chip area between the control store and the execution unit must be allocated to combine timing information and to align control word outputs with associated control points within the execution unit. It is possible to provide about three gate levels of decoding in this chip area at very little cost. The control word in the preferred embodiment of the data processor is field-encoded in a manner which permits functional definition of fields and relatively simple decoding.

Minimization of the number of unique control words, or nano words, is facilitated by moving operands and addresses into temporary locations early in the instruction routine. This tends to make later cycles in different instructions look more alike. Instruction set design and programming of the control unit also influence the number of nanowords. Additionally, there is a trade-off between execution efficiency and the number of unique nanowords required. The more time allowed for execution, the better the chance of making various instructions look alike.

Figure 9:
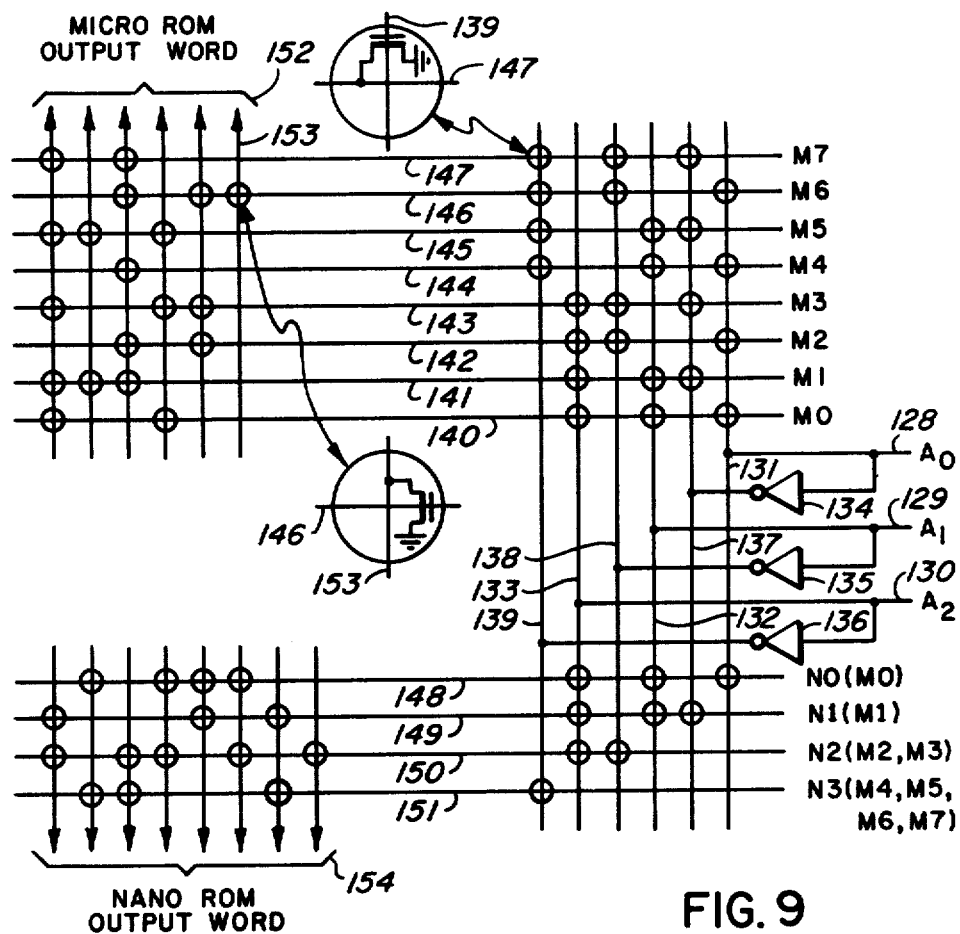
FIG. 9 illustrates a simplified programmed logic array (PLA) structure which can be used to implement the micro control store and nano control store for the data processor.

In FIG. 9, circuitry is illustrated for constructing a control store having a micro ROM and a nano ROM which are addressed simultaneously by the same address. For the purpose of simplifying the illustration, the control store in FIG. 9 receives a 3-bit address which accesses a 6-bit microword in the micro ROM and an 8-bit nanoword in the nano ROM. Three address bits ($A_0$, $A_1$, $A_2$) are received by conductors 128, 129, and 130 which are coupled to address conductors 131, 132, and 133, respectively. Conductors 128, 129, and 130 are also coupled to the inputs of inverters 134, 135, and 136, respectively. The output of inverter 134, the output of inverter 135, and the output of inverter 136 is each coupled to address conductor 137, 138, and 139, respectively. The micro ROM includes eight word lines (140-147) which are labeled M0 thru M7 in FIG. 9.

Similarly, the nano ROM includes 4 word lines (148-151) which are labeled N0 thru N3. A micro ROM word line decoder is formed at the intersection of address conductors 131-133 and 137-139 and micro ROM word lines 140-147. At particular intersections of an address conductor and a word line, a bubble is illustrated such as that shown at the intersection of address conductor 139 and word line 147. The expanded drawing of the bubble at this intersection shown in FIG. 9 illustrates that a MOSFET is coupled between the word line and ground such that the word line is grounded when the address conductor is enabled. A plurality of microword columns designated generally at 152, and including column 153, intersects the micro ROM word lines 140-147 for generating a micro ROM output word. At particular intersections of the microword columns and word lines, a bubble is indicated such as that shown at the intersection of word line 146 and column 153. The expanded drawing of the bubble corresponding to this intersection illustrated in FIG. 9 indicates that a MOSFET is coupled between column 153 and ground for causing the column to be grounded when the word line is selected.

Similarly, in the nano ROM, the intersection of address conductors 131-133 and 137-139 with nano ROM word lines 148-151 forms a nano ROM word line decoder. A plurality of columns designated generally 154 intersects the nano ROM word lines for generating a nano ROM output word.

The micro ROM and nano ROM word line decoders in FIG. 9 are constructed such that the selection of word line 140 (M0) in the micro ROM also causes the selection of word line 148 (N$_0$) in the nano ROM. Similarly, the selection of word line 141 (M1) causes the selection of word line 149 (N1). However, the selection of either word line 142 or word line 143 (M2, M3) in the micro ROM will cause word line 150 (N2) to be selected in the nano ROM. Also, the selection of any of word lines 144, 145, 146, and 147 (M4-M7) in the micro ROM will cause word line 151 (N3) to be selected in the nano ROM.

To summarize the operation of the circuitry in FIG. 9, the same address is presented to the decoders of both the micro ROM and the nano ROM. For any input address, there will be no more than one word line in each ROM which remains high. The line which remains high will cause the appropriate output value to be generated as the micro ROM output word and the nano ROM output word according to the coding at the intersection of the selected word line and the output columns. Each word line in the micro ROM is represented by only one input address. Each word line in the nano ROM however may represent one, two, or four possible different input addresses. In the preferred embodiment of the data processor, a word line in the nano ROM may represent as many as eight different input addresses. Each of the word lines in the micro ROM has a corresponding word line in the nano ROM. However, the number of bits in the microword generated by the micro ROM is completely independent from the number bits in the nanoword generated by the nano ROM. It is this feature which results in an overall reduction in the size of the control store.

In FIGS. 10A-10D, the location of each microword within the micro ROM is illustrated. Each of the microword labels listed in Appendix A is shown at a particular address within FIGS 10A-10D. Slightly fewer than half of the locations are blank since only 544 of the possible 1,024 locations are used in the preferred embodiment.

In FIGS. 11A-11F, the location of each of the nanowords within the nano ROM is illustrated. The label used for each of the nanowords is the same as the label associated with a microword at a corresponding address within the micro ROM. As an example, assume that the current micro control store address (A9-A0) is the 10-bit code 01 11 10 00 10. This address references the location labeled ablw1 in the micro ROM as is shown in FIG. 10B. This same address references the location labeled ablw1 in the nano ROM as shown in FIG. 11D. As is indicated in the column labeled ORIGIN in Appendix A, other microwords which refer to the same nanoword location include abll1, ralw1, rall1, jsal1, jmal1, paal1, and unlk2.

Figure 12:
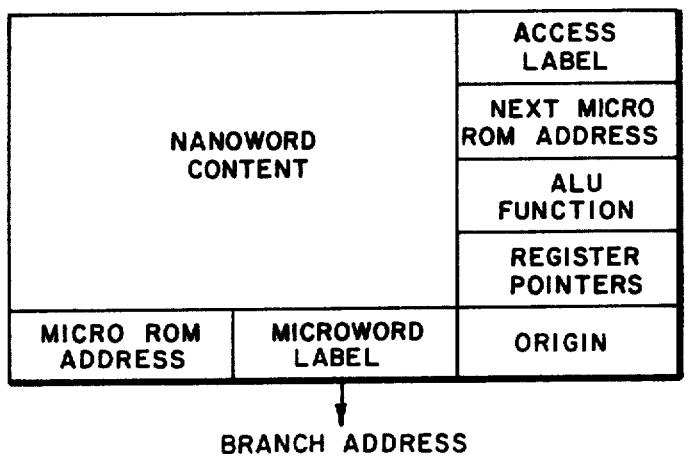
FIG. 12 is a key block which explains the microword blocks illustrated in FIGS. 13A-13CN.

In FIG. 12, a block is illustrated which may serve as a key for interpreting the microword blocks illustrated in FIGS. 13A-13CN. The portion of the key block labeled MICROROM ADDRESS in FIG. 12 is a hexadecimal number corresponding to the 10-bit address in the micro ROM where the particular microword is located. The portions of the key block labeled MICRO WORD LABEL and ORIGIN correspond to the identification of each microword used in Appendix A. The portion of the key block labeled NEXT MICROROM ADDRESS specifies how the next micro control store address is to be selected, whether a branch will be direct or conditional, and whether the instruction register and trap vector number (TVN) encoder will be updated. The key to the coding used in this portion of the key block is given below.

| NEXT MICROROM ADDRESS | |
|---|---|
| Key | Meaning |
| a1 | starting address A$_1$ |
| a2 | starting address A$_2$ |
| a3 | starting address A$_3$ |
| bc | conditional branch |
| bci | conditional branch, (IRC) IR |
| db | direct branch |
| dbc | direct branch, (IRC)→IR, update TVN |
| dbi | direct branch, (IRC)→IR |
| dbl | direct branch, (IRC)→IR, partially update TVN |

The portion of the key block labeled ACCESS LABEL is used to convey information about the access class, access mode, and access type for each microword block. The first character in the access label can be one of four types as explained in the table below.

| ACCESS CLASS | |
|---|---|
| character | meaning |
| i | initiate |
| f | finish |
| n | no access |
| t | total |

Initiate indicates that the data processor has begun an external access operation during the current microcycle but that the data processor need not wait for the external access operation to be completed before proceeding to the next microword block. Finish indicates that an access was initiated on a previous microcycle and that the external access operation must be completed during the current microcycle. No access indicates that an access operation is not pending during the current microcycle. Total indicates that the data processor must both initiate and finish an access to an external device during the current microcycle. The data processor includes circuitry (not shown) for interfacing the data processor to external devices. This circuitry is designed to transmit and receive handshake signals which allow the data processor to recognize the completion of an access operation. This circuitry inhibits the data processor from proceeding to the next microcycle for the finish and total access classes until the access operation has been successfully completed.

The second character in the access label can be one of three characters shown below.

| ACCESS MODE | |
|---|---|
| character | meaning |
| p | process only |
| r | read |
| w | write |

Process only indicates that no access is pending during the current microcycle. Read and write indicate whether the data processor is to receive or transmit information during the external access operation.

The remaining two characters of the access label correspond to the access type according to the table below.

| ACCESS TYPE | |
|---|---|
| characters | meaning |
| ak | interrupt acknowledge |
| im | immediate |
| in | instruction |
| ix | immediate or instruction |
| op | operand |
| uk | unknown |

Interrupt acknowledge indicates that the current external access operation is to obtain a vector number from an external peripheral device which has interrupted the data processor. Immediate and instruction indicate that the external access operation pending during the current microcycle is to obtain an immediate word or instruction word, respectively. The "ix" designation indicates that the word being accessed during the current microcycle is either an immediate word or an instruction word since the particular microword block may be encountered in either of these circumstances. Operand indicates that the pending external access operation involves data being read by or written from the data processor. The designation unknown indicates that it can not be determined whether the pending external access operation involves an immediate word, an instruction word, or an operand word. It should be realized by those skilled in the art that from the information contained within the access label, the function code (FC) field, shown as bits 15 and 16 in FIG. 8, is determined.

The portion of the key block in FIG. 12 labeled REGISTER POINTERS is a 4-character key which specifies the destination and source registers in the execution unit which are enabled during the current microcycle. The first two characters are one of the six possibilities listed below.

| DESTINATION REGISTER DECODE | |
|---|---|
| characters | meaning |
| dt | data temporary register |
| dx | don't care |
| rx | Rx field in macroinstruction |
| sp | user or supervisor stack pointer |
| uk | unknown |
| us | user stack pointer |

Similarly, the third and fourth characters in the REGISTER POINTERS key designate the source register which can be one of the six possibilities listed below.

| SOURCE REGISTER DECODE | |
|---|---|
| characters | meaning |
| dt | data temporary register |
| dy | don't care |
| pc | program counter |
| ry | Ry field in macroinstruction |
| py | program counter or Ry field |
| uk | unknown |

The significance of the portion of the key block in FIG. 12 labeled ALU FUNCTION will be explained hereinafter. The largest portion of the key block is labeled NANOWORD CONTENT which indicates the transfers of information which are enabled within the execution unit during each microcycle. For those microword blocks in which the microword label is not the same as the origin, the execution unit transfers enabled by the nanoword will be the same as those listed for the microword block which is deemed to be the origin. The abbreviations used within the nanoword content portion of each microword block are explained in Appendix B which follows the detailed description.

Appendix H illustrates the operations performed by each of the microwords. Each of the microword blocks is interpreted according to the key block shown in FIG. 12.

Use of temporary storage and routine sharing are the two basic techniques used to facilitate microroutine minimization. Temporary storage can be used to advantage if operands and addresses are moved into temporary locations early in the instruction microroutine. This makes later control words in the routine more homogenous and often permits routines to join, which can save considerable space in the control store. Routine sharing is facilitated by the following:

1. Incomplete translation of macroinstruction words by the control store allows extracted fields in the macroinstruction words to specify ALU functions and register selection. Instructions for various functions which require similar computational operations share the same microroutine. 2. During execution of immediate type macroinstructions, the immediate value is fetched and placed in a data temporary register, thereby allowing macroinstructions involving immediate values to share the register-to-memory and register-to-register microroutines already available.

3. The functional branching concept already described allows the various addressing modes to be shared by most single and dual operand macroinstructions which require an operand not already contained within the data processor.

The general micro and nano control store concept allows different microroutine sequences (made up of relatively short control words) to share many of the same nano control words (which are much wider). Each macroinstruction received by the instruction register is emulated by a sequence of microwords. Only one copy of each unique nanoword need be stored in the nano control store, no matter how many times it is referred to by various microroutines.

CONDITIONAL BRANCH LOGIC

Two distinct types of conditional branches are implemented in the control unit of the data processor. One type of conditional branch is that which is implicit in an instruction and which must be specified uniquely by a microword. Examples of this first type of conditional branch are iterative routines such as multiply and divide operations which require several different conditional branches during execution of the macroinstruction although the macroinstruction does not specify these branches directly. The second type of conditional branch is that which is explicit to the macroinstruction. Set conditionally ($S_{CC}$) and branch on condition ($B_{CC}$) are examples of the second type of macroinstruction.

Figure 13:
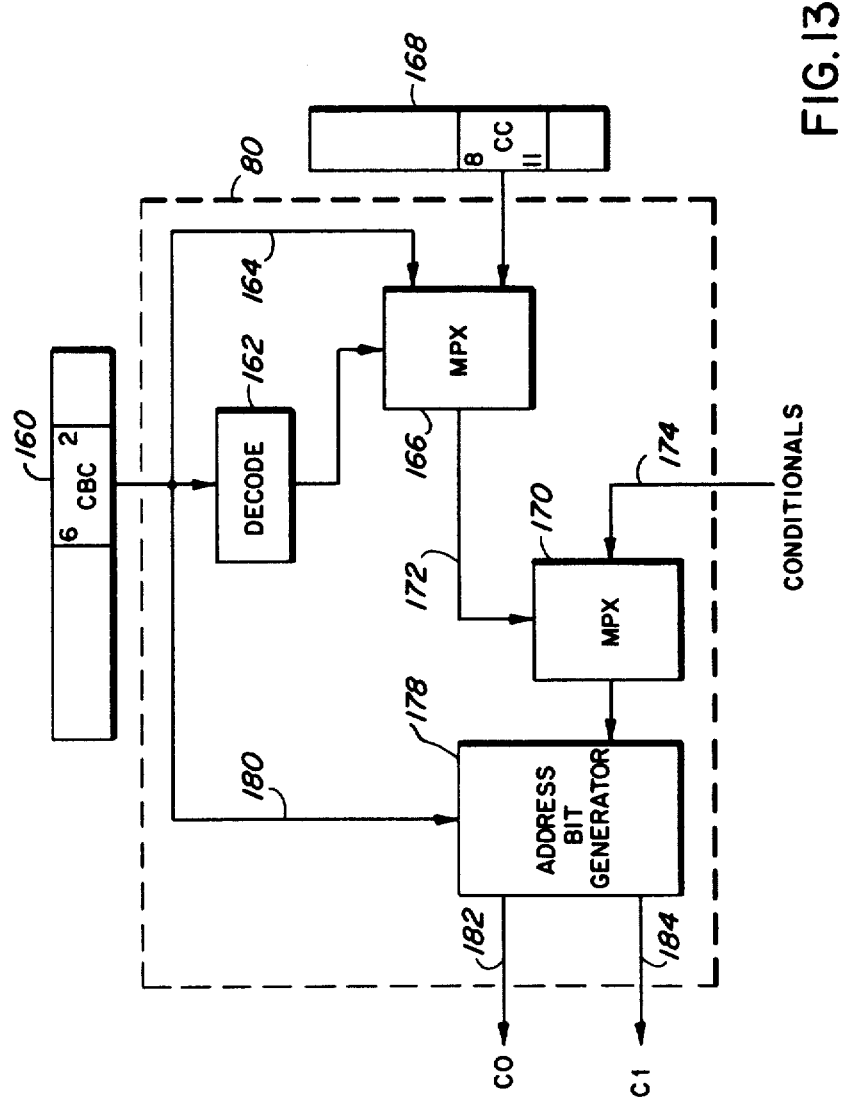
FIG. 13 is a block diagram which illustrates the conditional branch logic unit used within the data processor for controlling conditional branches within the control store.

In FIG. 13, a block diagram is shown which illustrates the overall function of a conditional branch control network. Block 160, which corresponds to the micro ROM output latch 74 in FIG. 4, stores a microword which includes a 5-bit CBC field (bits 6-2) for controlling a conditional branch operation, as was explained with regard to FIG. 8, format II. The portion of block 160 which contains the CBC field is coupled to a decoder 162 which determines whether the branch condition is implicit in the macroinstruction or is explicit in the macroinstruction. The portion of block 160 which contains the CBC field is also coupled by line 164 to a first input of multiplexer 166. The second input of multiplexer 166 is coupled to block 168, which corresponds to IRD register 56 in FIG. 4. The 4-bit CC field (bits 11-8) in block 168 correspond to the macroinstruction bit field which specifies the conditions to be tested when executing the set conditionally $S_{CC}$ and branch on condition $B_{CC}$ macroinstructions. The output of decoder 162 is coupled to a selection input of multiplexer 166 for selecting either the CBC field in the microword or the CC field in the macroinstruction as the output of multiplexer 166. By allowing the CBC field to defer the selection of conditions to the macroinstruction word itself, a single routine in the macro control store can be used to execute all of the explicit conditional branch type macroinstructions.

The output of multiplexer 166 is coupled to a selection input of multiplexer 170 by line 172. Multiplexer 170 is also coupled to line 174 for receiving conditional signals from various portions of the data processor. Multiplexer 170 selects the appropriate conditional signals for transmission to address bit generator 178. The portion of block 160 which contains the CBC field is also coupled to a control input of address bit generator 178 by line 180. Address bit generator 178 provides a 2-bit output (C0, C1) on lines 182 and 184. Output lines 182 and 184 are coupled from branch control logic 80 to multiplexer 116, as shown in FIG. 5. In response to the signal coupled to the control input by line 180, the address bit generator selects one of two possible output combinations for C0 and C1 associated with the conditional signals selected by multiplexer 170.

Conditional branches present a problem because the accesses to the micro and nano control store for the next control word are overlapped with execution of the current control word. To compensate for the time delay, a cycle is allowed in programming the microroutines. In addition, the microroutines are programmed to make the most likely path the most efficient. For example, decrement and branch if not zero instruction is assumed to heavily favor the branch situation, so the microroutine computes the destination address and initiates a fetch during the execution of the decrement, test, and replace computation.

Conditional branch delays are further reduced by providing a base address in the microword (NMBA in FIG. 8, format II) which can be used to initiate access to a logical row of control words. Subsequent selection of the appropriate word within the row is specified by the C0 and C1 bits output from conditional branch logic 80 in FIG. 13. In the preferred embodiment, a logical row includes four control words, one of which is selected by C0 and C1. This allows single level implementation of four-way branches. In the preferred implementation of the data processor, no macroinstruction requires more than a four-way branch at any point in the microroutine. Since a logical row is accessed for conditional branches, all of the destination control words must be on the same logical row, which somewhat restricts the location of words within the micro and nano control stores.

Figure 10A:
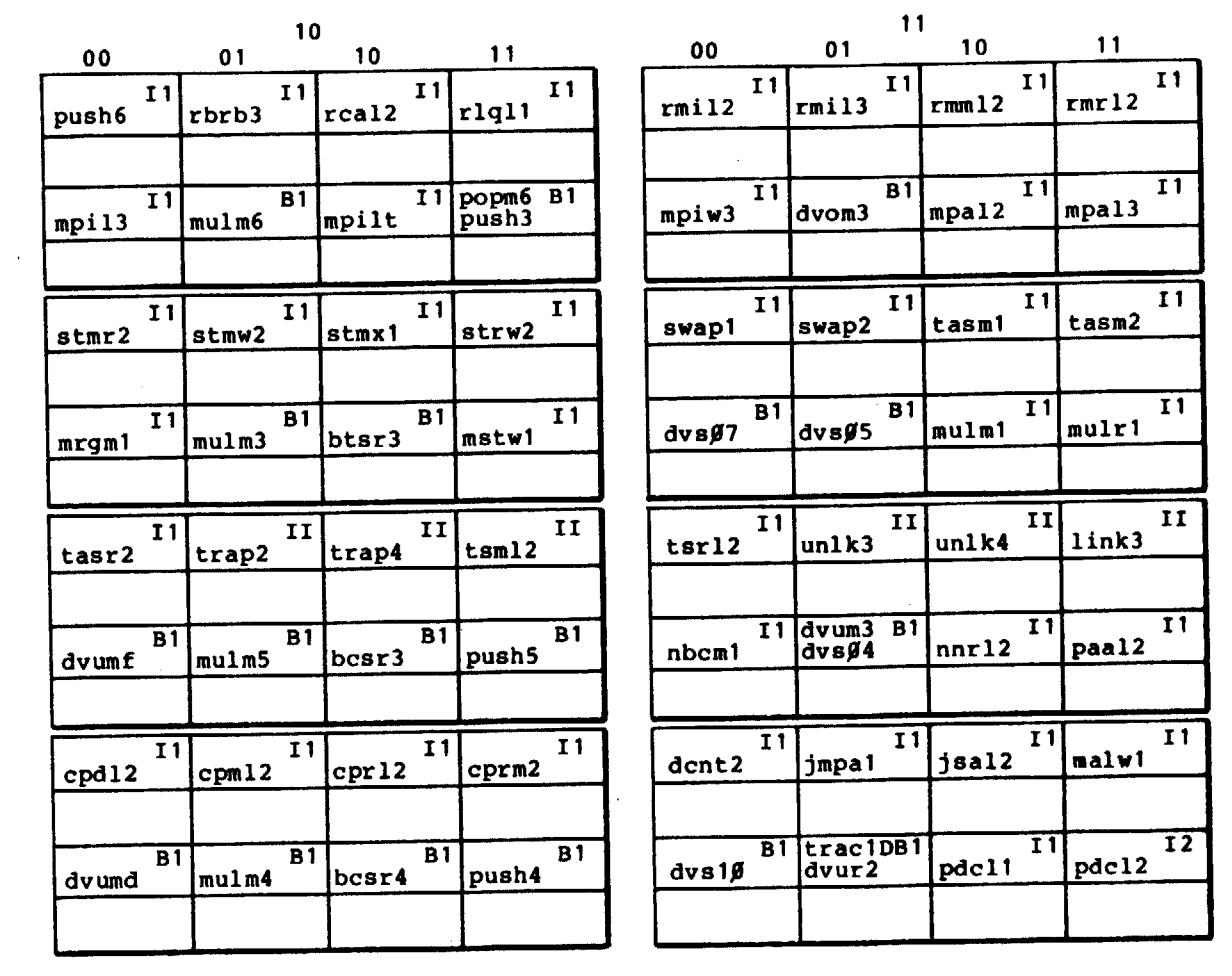
Figure 10C:
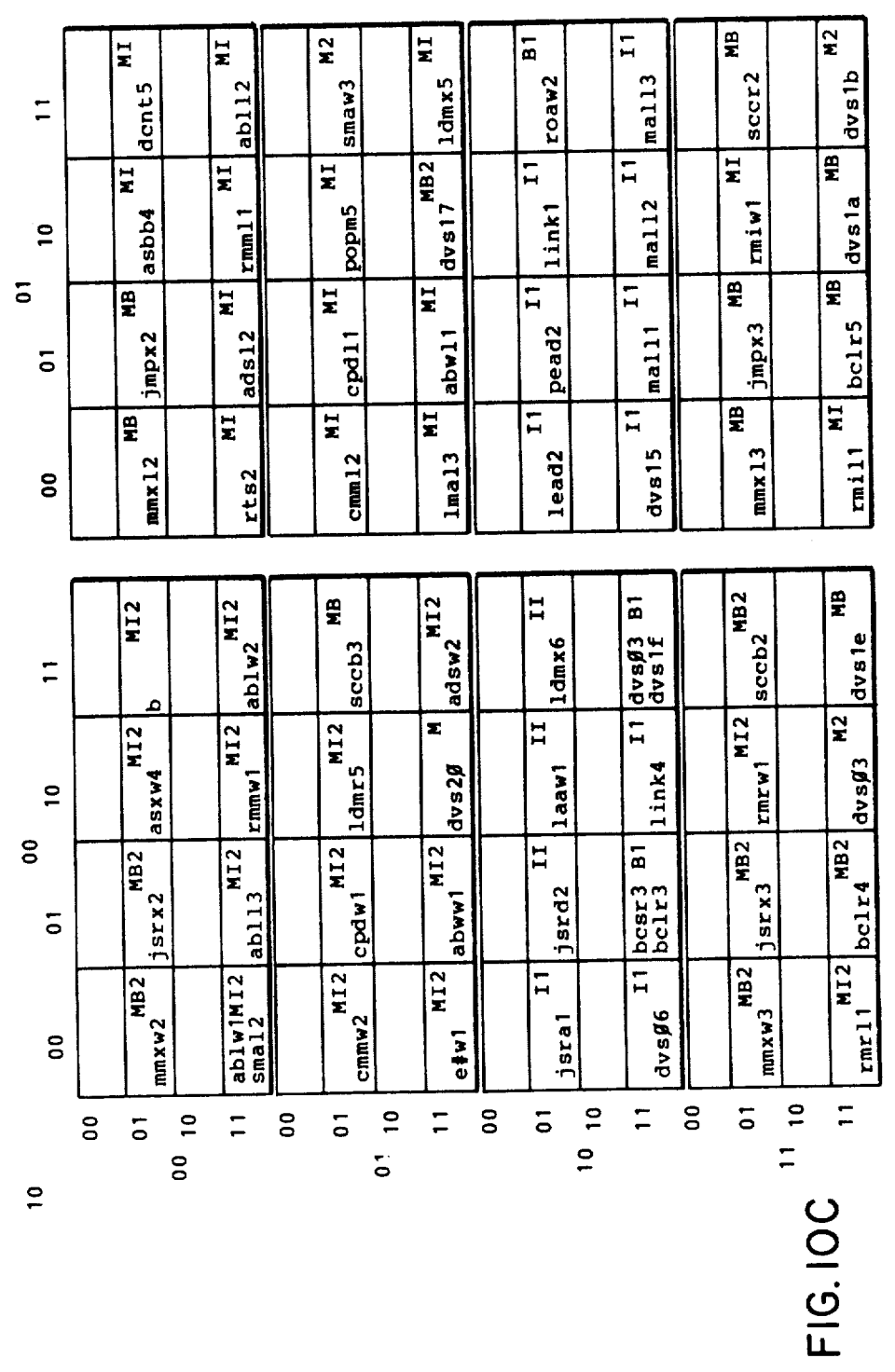
Figure 10D:
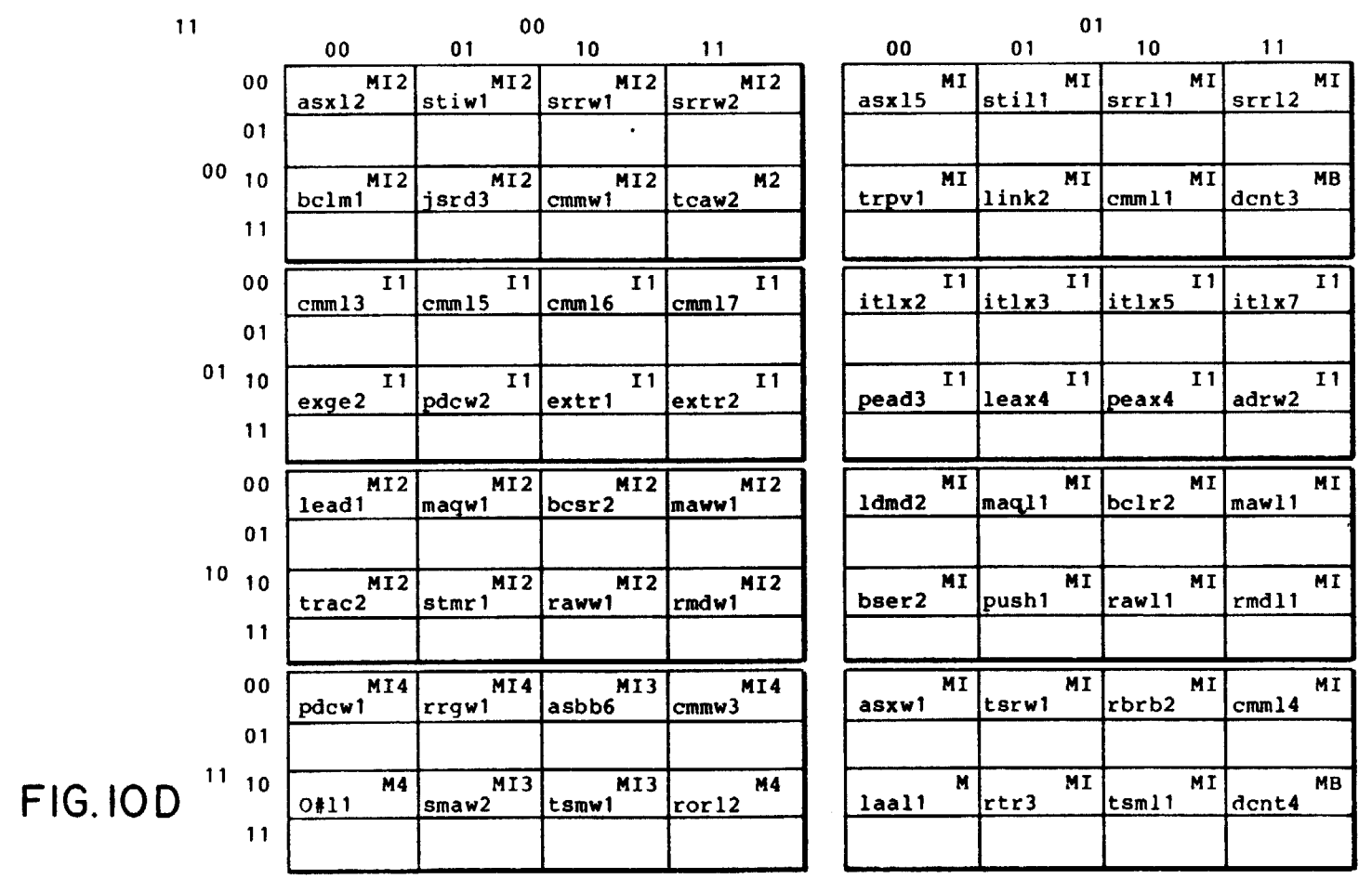

An illustration of a four-way conditional branch is associated with the microword labeled mulm4 in Appendix A. For the microword labeled mulm4, the column entitled DESTINATIONS includes mulm6, mulm4, mulm3, and mulm5 as potential branch destinations. Referring briefly to FIG. 10A, it will be seen that each of the four potential destinations has an address which corresponds to 00 XX 10 10 01 (A9-A0). The address for each of the destinations is the same except for bit 7 and bit 6. Thus, these four microwords are located within one logical row of the micro control store and one microword within the row is selected by bits 6 and 7 of the control store address. Similarly, in the nano control store, the nanowords corresponding to the four potential destinations comprise one logical row within the nano control store. Thus, the C0 and C1 bits provided by address bit generator 178 in FIG. 13 ultimately become bit 7 and bit 6 of the micro control store address.

In Appendix C which follows the detailed description, a table lists the various conditional branch choices used by the microwords in the preferred embodiment of the data processor. The column labeled CBC contains the hexadecimal code for the CBC bit field (bits 6-2 of the microword). The column entitled VARIABLE specifies the conditional signal or signals upon which the branch is dependent. The column entitled SOURCE specifies the physical location from which the conditional signal or signals are derived. In Appendix D, the abbreviations used in the VARIABLE and SOURCE columns are further explained. The column entitled VALUES shows the possible logical states of the variables upon which the branch is conditioned. The columns entitled C1 and C0 show the logical values output on conductors 184 and 182 (see FIG. 13) for each of the values or combination of values. In the column entitled REMARKS, information is given for those variables which are comprised of more than one basic conditional signal. In these instances, the order in which the basic conditional signals are listed in the REMARKS column corresponds to the order in which the bits are arranged in the VALUES column. For example, the variable nz1 is a combination of the basic conditional signals n and z such that C1 equals "0" and C0 equals "1" when n equals "1" and z equals "0".

In Appendix E a table of variables is listed which corresponds to the various branch tests which can be specified by bits 11-8 of the conditional branch ($B_{CC}$) and set conditionally ($S_{CC}$) macroinstructions. The cc column gives the hexadecimal equivalent of the four-bit field in the macroinstruction. The "abbreviation" and "meaning" columns specify the desired branch condition while the column entitled CONDITION indicates the logical combination of basic condition code signals required to implement the desired branch condition.

Figure 14A:
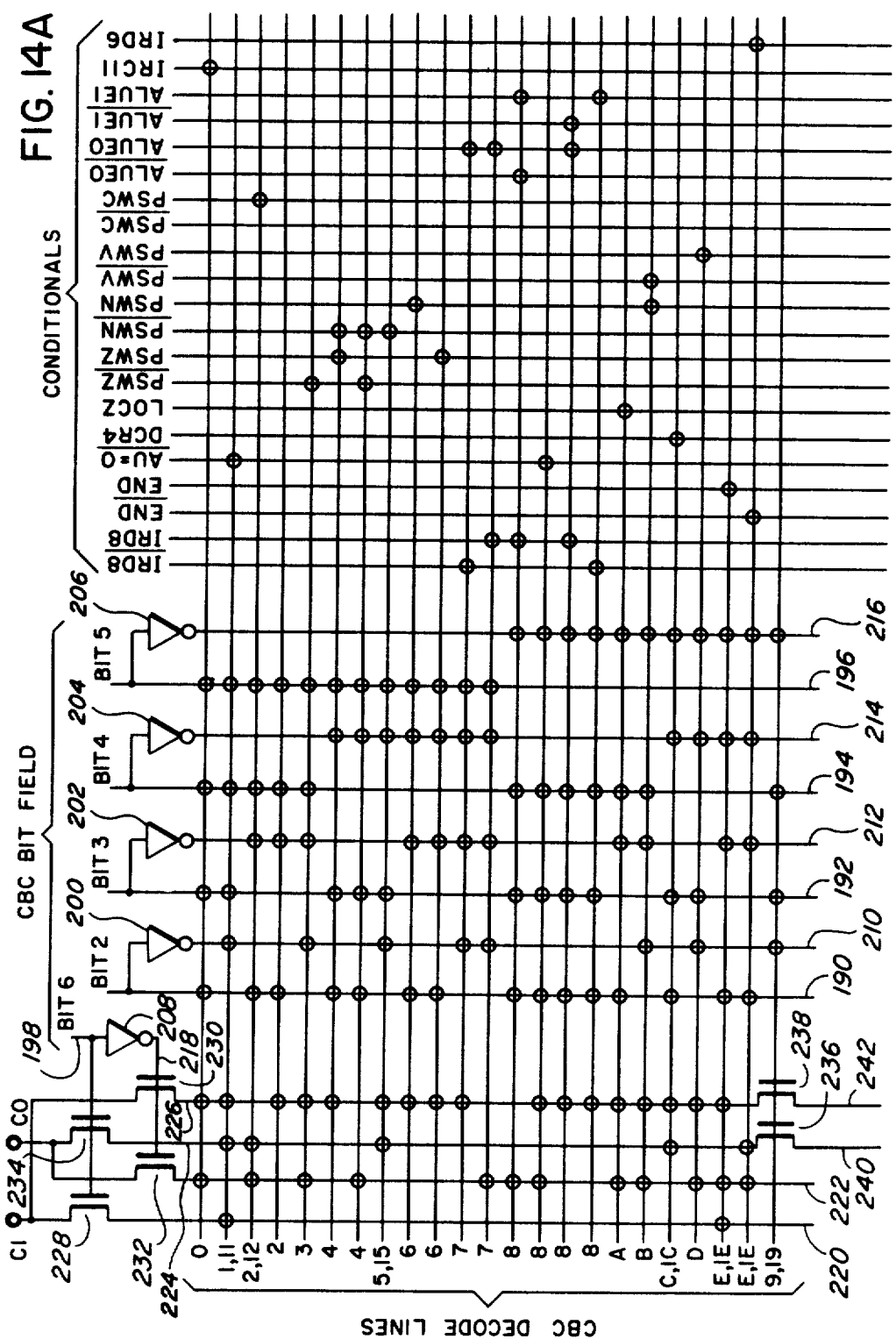
FIGS. 14A-14B illustrate circuitry for implementing the conditional branch logic unit shown in FIG. 14.
Figure 14B:
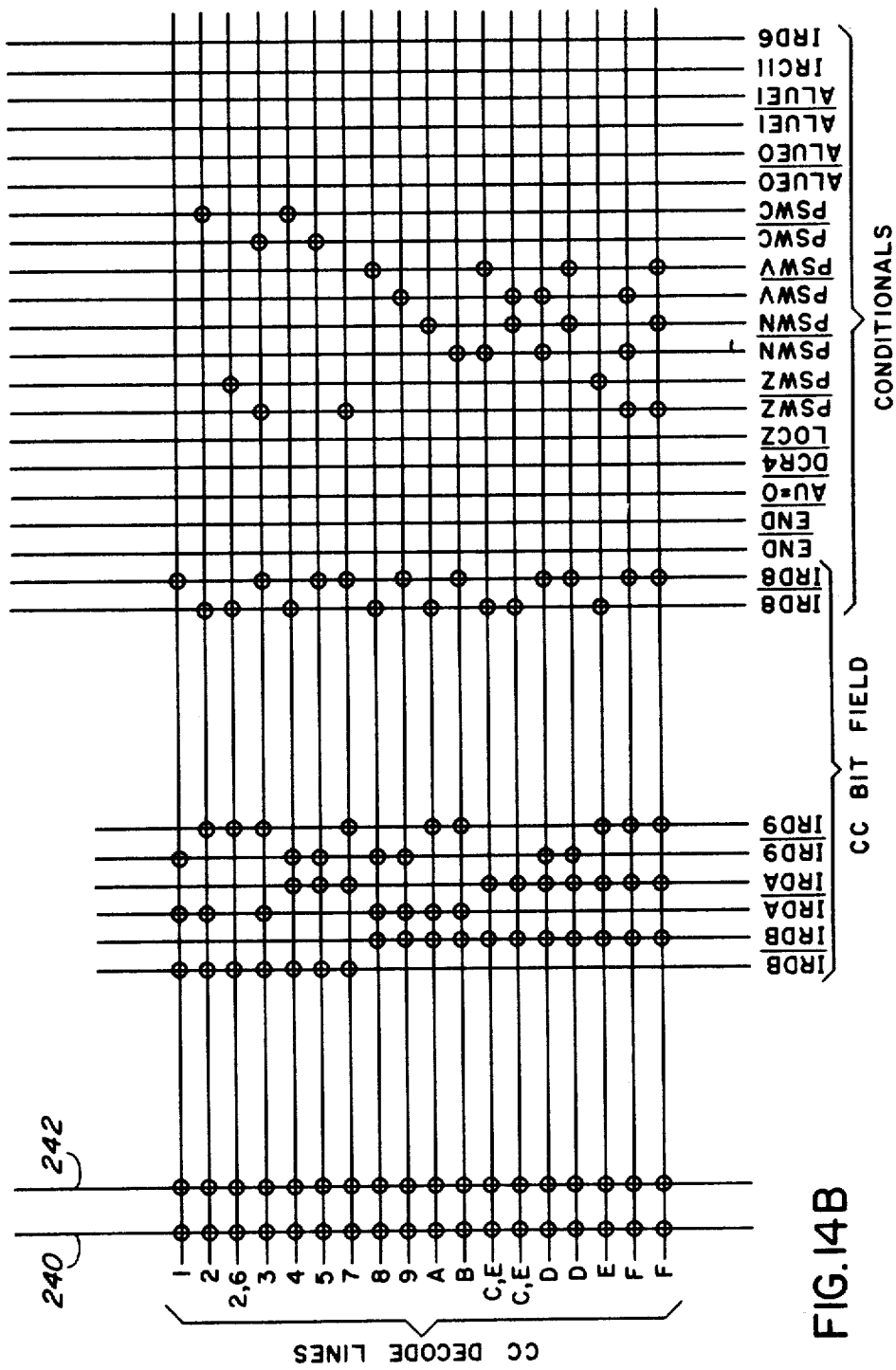

In FIGS. 14A-14B, a circuit drawing is shown which implements the branch control logic within dashed block 80 of FIG. 13. Bits 2-6 of the microword (CBC FIELD) are received by conductors 190, 192, 194, 196 and 198. Conductors 190-198 are coupled to inverters 200, 204, 206, and 208 for providing the complement of each of the bits in the CBC field on conductors 210, 212, 214, 216, and 218. Conductors 190, 192, 194 and 196 and complement conductors 210-216, corresponding to the four lesser significant bits of the CBC field, are decoded in a PLA structure similar to the one described in FIG. 9. These conductors are intersected by conductors which have been generally designated CBC decode lines which are labeled at the left-most portion of FIG. 14A. The label associated with each CBC decode line is the hexadecimal equivalent of the CBC bit field which enables that particular decode line. Some of the decode lines are labeled with two numbers such as "1, 11" indicating that the decode line is enabled regardless of the logic state of bit 6 in the CBC field. In other instances, two or more of the decode lines may have the same label, indicating that all such decode lines may be enabled simultaneously.

Also intersecting the CBC decode lines are a plurality of conductors designated generally CONDITIONALS, including IRD8, IRD8 and END through IRD6. The conditional signals conducted by these lines are provided by various portions of the data processor as explained in Appendix D. The intersection of the conditionals conductors with the CBC decode lines allows the logic state of the one or more decode lines selected by CBC bits 2-5 to be determined by the conditional signals.

Also intersecting the CBC decode line are conductors 220, 222, 224 and 226. Each of these conductors will be pulled to ground level if any of the CBC decode lines with which it intersects (where an intersection is designated by a bubble) is at a high level. Conductor 220 is coupled to output terminal C1 by MOSFET 228 which is enabled when CBC bit 6 is a logic "1". Similarly, conductor 226 is coupled to output terminal C1 by MOSFET 230 which has its gate coupled to the output of inverter 208 and is enabled when CBC bit 6 is a logic "0". Conductors 222 and 224 are coupled to output terminal C0 by MOSFETS 232 and 234, respectively, which have their gate terminals coupled to conductors 218 and 198, respectively. MOSFET 232 is enabled when CBC bit 6 is a logic "0", and MOSFET 234 is enabled when CBC bit 6 is a logic "1". The logic values output on terminals C1 and C0 correspond to those listed in Appendix C.

The CBC decode line labeled "9, 19" in FIG. 14A corresponds to the rows labeled 9 and 19 in Appendix C where the conditional branch is determined by the cc field of the macroinstruction. CBC decode line "9, 19" is coupled to the gate terminals of MOSFETS 236 and 238 which are enabled whenever CBC decode line "9, 19" is enabled. MOSFETS 236 and 238 couple conductors 224 and 226 to conductors 240 and 242, respectively. Conductors 240 and 242 are intersected by conductors designated generally cc decode lines in FIG. 14B. The cc decode lines are intersected by a group of lines designated generally CC BIT FIELD which conduct signals provided by bit 11 through bit 8 of the IRD register and signals which are the complement of these bits. These bits of the IRD register correspond to the cc field in $B_{CC}$ and $S_{CC}$ macroinstructions. The lines designated CC BIT FIELD and the lines previously designated CONDITIONALS overlap in that the IRD8 and IRD8 lines serve as conditional signals for the CBC decode lines. The cc decode lines are intersected by a subset (PSWZ, PSWN, PSWV, PSWC and their complements) of the conditionals conductors which intersected the CBC decode lines. Each of the cc decode lines is labeled at the left-most portion of FIG. 14B such that the labels are the hexadecimal equivalent of the 4-bit cc field which selects that particular cc decode line. A cc decode line is at a high level only if it is selected by the cc bit field and the logic expression in Appendix E for the associated cc field is true. When a cc decode line is at a high level, conductors 240 and 242 are pulled to ground such that conductors 224 and 226 are also grounded provided that CBC decode line 9,19 is enabled.

Thus the conditional branch choice specified by output terminals C1 and C0 may be determined by the CBC field in the microword or directly by the cc field in the macroinstruction. Also, by deferring the final selection of the C1 and C0 output signals to CBC bit 6, the structure allows two different conditional branch microinstructions to share a single common destination. An example of this latter feature is illustrated by the microword blocks labeled bbci1 and bbcw1 in Appendix H, Page BH. The branch destination for both of these microword blocks is microword block bbci3 if the condition specified by the cc field is TRUE. However, the branch destination from bbci1 is bbci2 if the condition is FALSE while the branch destination from bbcw1 is bbcw3 if the condition is FALSE. In the example, the CBC field of one of the microwords bbci1 and bbcw1 would be 9 (hex) while the CBC field of the other microword would be 19 (hex). Thus, bits 2 through 5 of the CBC field select a condition to be tested while bit 6 of the CBC field selects one of a set of possible output states associated with the selected condition for transmission to the C1 and C0 output terminals.

ALU AND CONDITION CODE CONTROL UNIT

Figure 15:
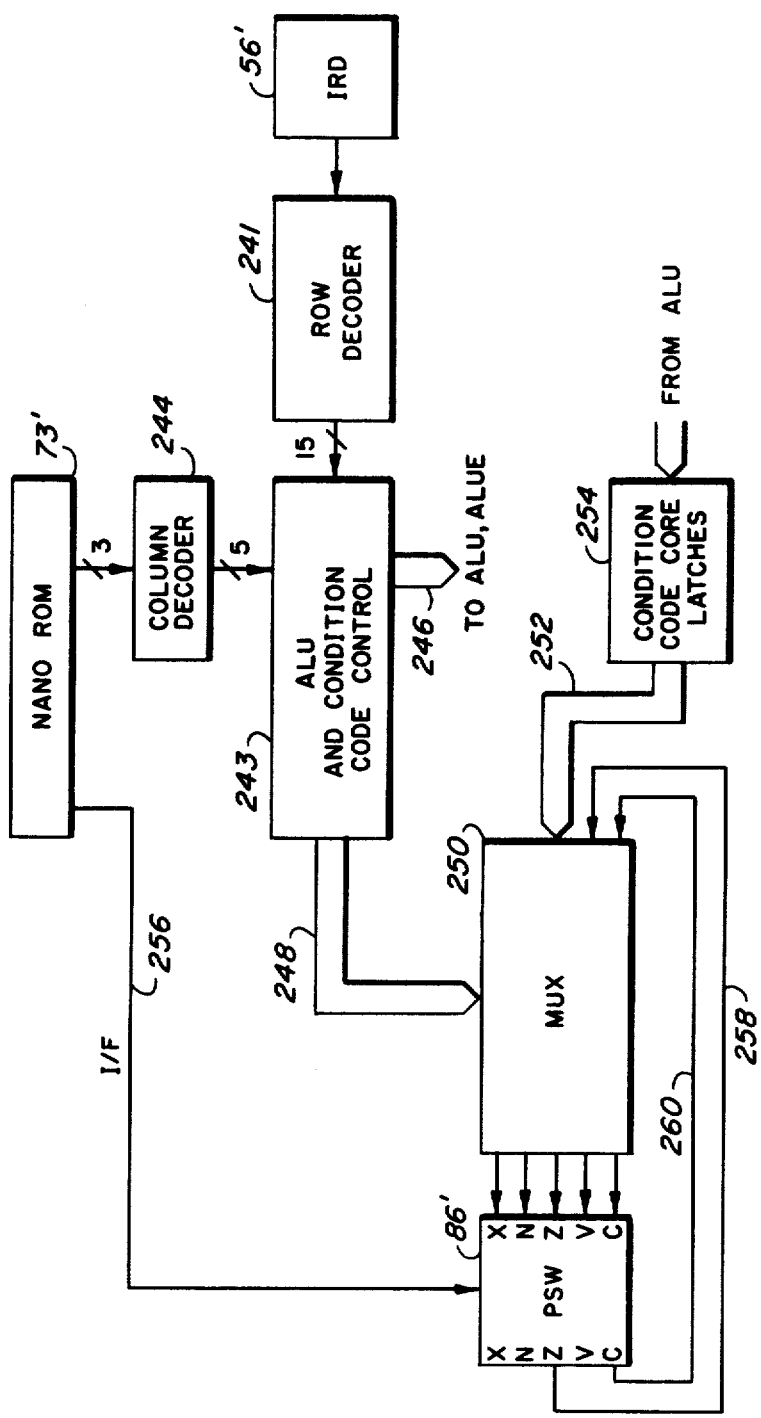
FIG. 15 is a block diagram illustrating the function of an ALU and Condition Code Control unit employed by the data processor for controlling the function of the ALU and controlling the setting of the condition codes.

FIG. 15 is a block diagram of an ALU and condition code control unit which may be used with a microprogrammed data processor. IRD register 56' corresponds to IRD register 56 in FIG. 4 and stores a macroinstruction. Row decoder 241 is coupled to the output of IRD register 56', and the output of row decoder 241 is coupled to ALU and condition code control block 243 by 15 row selection lines. Row decoder 241 is responsive to the macroinstruction stored by IRD register 56' in order to enable one of the 15 row selection lines. ALU and condition code control block 243 is arranged as a matrix of 15 rows and 5 columns, and row decoder 241 selects one of the 15 rows within block 243.

Nano ROM 73' corresponds to nano ROM 73 shown in FIG. 4. Three bits of the output of nano ROM 73' are coupled to column decoder 244. The output of column decoder 244 is coupled to ALU and condition control blocks 243 by five column selection lines which select one of the five columns within the row selected by row decoder 241.

Generally, macroinstructions are executed by performing a sequence of operations in the execution unit. The particular set of operations required to perform a macroinstruction is macroinstruction-static, that is, it remains fixed during the execution of the macroinstruction and is specified by decoding the instruction type from the IRD register 56'. The set of operations to be performed by the ALU for any particular macroinstruction is stored within one of the 15 rows within block 243. Each operation in the row defines both the ALU activity and the loading of the condition codes. Nano Rom 73' provides state information for the proper sequencing of the operations within the selected row. During each microcycle, column decoder 244 selects the column within the selected row which contains the operation next to be performed in the sequence of operations. Thus ALU and condition code control block 243 combines the state information of the nano control store with the function information extracted from the instruction register in order to execute each macroinstruction. Block 243 provides timing and control to the ALU, ALU extender (ALUE) and to the condition code registers within the program status word (PSW). If the sets of operations for the various macroinstructions are properly ordered in the array contained by block 243, then the execution of most classes of macroinstruction can utilize the same nano control store sequences. For the same effective address and data types, the ADD, SUBTRACT, AND, OR, and EXCLUSIVE OR macroinstructions share the identical control store sequences.

Still referring to FIG. 15, ALU and condition code control block 243 has a first set of output lines designated 246 which are coupled to the ALU and ALUE within the execution unit (not shown). Control block 243 also provides a second group of output lines designated 248 which are coupled to a multiplexer 250. Multiplexer 250 includes a first group of inputs which are coupled by lines 254 to the output of condition code core latches 252. The input to the condition code core latches 254 is coupled to logic within the ALU (not shown) which derives status information about the operation most recently performed by the ALU. The status information latched by the condition core latches 254 is selectively coupled to program status word register 86' by multiplexer 250 under the control of the signals provided by lines 248. PSW register 86' corresponds to PSW register 86 in FIG. 4. PSW register 86' also has an input coupled to I/F line 256 which is coupled to nano ROM 73' for determining when PSW register 86' is updated. Multiplexer 250 also includes second and third inputs which are coupled by lines 258 and 260 to the Z and C outputs of PSW register 86'. Briefly described, the purpose for conductor 258 is to allow the data processor to test for a zero result in a 32-bit (double word) operation by combining the zero result for the first 16 bits with the zero result of the second 16 bits. The purpose for conductor 260 is to allow the data processor to provide a carry during decimal arithmetic.

FIG. 16 is a table of all the operations which can be performed by the ALU in conjunction with the ALU extender (ALUE). The column entitled "ALU Function" lists the function performed by each operation and, in the case of shift operations, the pattern in which the bits are shifted. In the "ALU Function" column, the symbols "a" and "d" refer to the input ports of the ALU coupled to the address bus and data bus respectively, within the data section of the execution unit. The symbol "r" refers to the ALU result. The symbol "x" refers to an arithmetic carry (PSWX) rather than the standard carry (PSWC). A symbol which has a primed notation indicates that the complement of the indicated symbol is selected. The column entitled "Into C Bit" indicates the source of the carry output signal. The symbol "cm" refers to the carry generated from the most significant position of the ALU. The symbol "msb" refers to the most significant bit of the result. For shift right and rotate right functions, the source of the carry output signal is bit 0 of the address bus in the DATA section since this bit is coupled to the least significant input of the shift network for such function. The remainder of the columns in FIG. 16 correspond to logic signals which are generated by the ALU and condition code control unit in order to control the ALU to perform the desired function.

In FIG. 17, an ALU function and condition code table is illustrated which corresponds to the array of 15 rows and 5 columns already described with regard to ALU and condition code control block 243 in FIG. 15. In the right most column of this table, all of the macroinstructions which require an ALU function or which affect the state of the condition codes are listed adjacent to the row which contains the set of operations required by the particular macroinstruction. Within each of the five columns in the table, the left most entry specifies one of the operations found in the table in FIG. 16. The right most entry contains selection signals for controlling the condition codes stored by the PSW register. The condition code control information is a five character code corresponding to the X, N, Z, V, and C condition code bits in the PSW register. The significance of these condition codes is explained below.

| Abbrev. | Meaning |
|---|---|
| X | Extend bit used for multiprecision arithmetic |
| N | Positive/negative: most significant bit of result |
| Z | Zero result |
| V | Overflow |
| C | Carry |

The key for understanding the meaning of the condition code control information listed in the table is shown below:

| Abbreviation | Meaning |
|---|---|
| K | Condition code not changed |
| D | Don't care |
| O | Condition code always reset |
| N | Update PSWN with latest N status |
| Z | Update PSWZ with latest Z status |
| V | Update PSWV with latest V status |
| C | Update PSWC with latest C status |
| C̄ | Update PSWC with complement of latest C status |
| C* | Update PSWC with PSWC "OR"ed with carry generated during decimal correction. |
| C̄* | Update PSWC with complement of the above. |
| A | Update PSWX, PSWC with arithmetic shift carry status |

| Abbreviation | Meaning |
|---|---|
| V' | Update PSWV with latest status of N exclusive-OR C; used for arithmetic shift left. |

If the condition code control field is left blank in the table, then the condition codes are not affected. In column 1, the condition code control information for rows 2-5 and 8-11 include two entries. The reason for having two entries is that the first entry is selected by the nano ROM in some cases while the second entry is selected by the nano ROM in other cases. The nano control word output from the nano ROM includes a 2-bit field (NCC0, NCC1) corresponding to an initiate bit and a finish bit. For columns 2-4, the same condition code control information is used if either of the initiate or finish bits is set. For column 1 of the table the first entry is selected when only the initiate bit is set. However, where only the finish bit is set, then the second entry for the condition code control information is used.

Referring briefly to FIG. 12, the description of the portion of the key block labeled "ALU FUNCTION" has been deferred until now. One, two, or three characters may appear in the ALU function portion of the microword block in Appendix H. For each of the microword blocks, the first character indicates the column of the table shown in FIG. 18 which is to be selected in order to perform the desired operation. The symbols 1-5 correspond to columns 1 through 5 in this table. The symbol "x" indicates a don't care condition. In addition, the symbol 6, which occurs in microword blocks used to perform a divide algorithm, indicates that column 4 is enabled but that the "lss" ALU function will shift a logic "1" into the least significant bit of the ALUE instead of a logic "0" as is the case when a "4" appears.

If two or more characters appear in the "ALU function" portion of the microword block, then the second character refers to the finish and initiate identification for condition code control. The symbol "f" corresponds to finish and would therefore cause the second entry in column 1 of the table shown in FIG. 17 to be used in order to control the setting of the condition code bits in the PSW register. The symbol "i" specifies initiate and would select the first entry in column 1 of the table shown in FIG. 18 for controlling the setting of the condition code bits in the PSW register. The symbol "n" indicates that the condition codes are not affected for the particular operation. Finally, for those microword blocks which contain a three character code for the "ALU FUNCTION" portion, the third character is the symbol "f" which indicates to the execution unit that a byte (8 bits) transfer is involved. An example is the microword block labeled mrgw1 shown in Appendix H, page H. In these instances, only the low order 8 bits of the address bus in the DATA section of the execution unit are driven by the selected source such that only the low order 8 bits of the selected destination are changed while the upper 8 bits of the selected destination are not disturbed. Otherwise, word operation and byte operation type macroinstructions share the same basic microinstruction routines.

Referring again to FIG. 17, it should be noted that in the "addx" operation in row 3, column 2, the arithmetic carry added to the operands is the core latch copy of X rather than PSWX such that the most recent X status is used. Also in row 1, column 4, the operation performed is an "lss" operation wherein the logic state of the bit shifted into the ALUE is determined by whether column 4 or column 6 is selected by the nano control store, though column 6 does not appear as a separate column in the table. Also, in row 7, column 4, the input to the most significant bit of the ALU is PSWC, or PSWN exclusive-or PSWV, depending on whether the multiplication is unsigned or signed, respectively.

Figure 18:
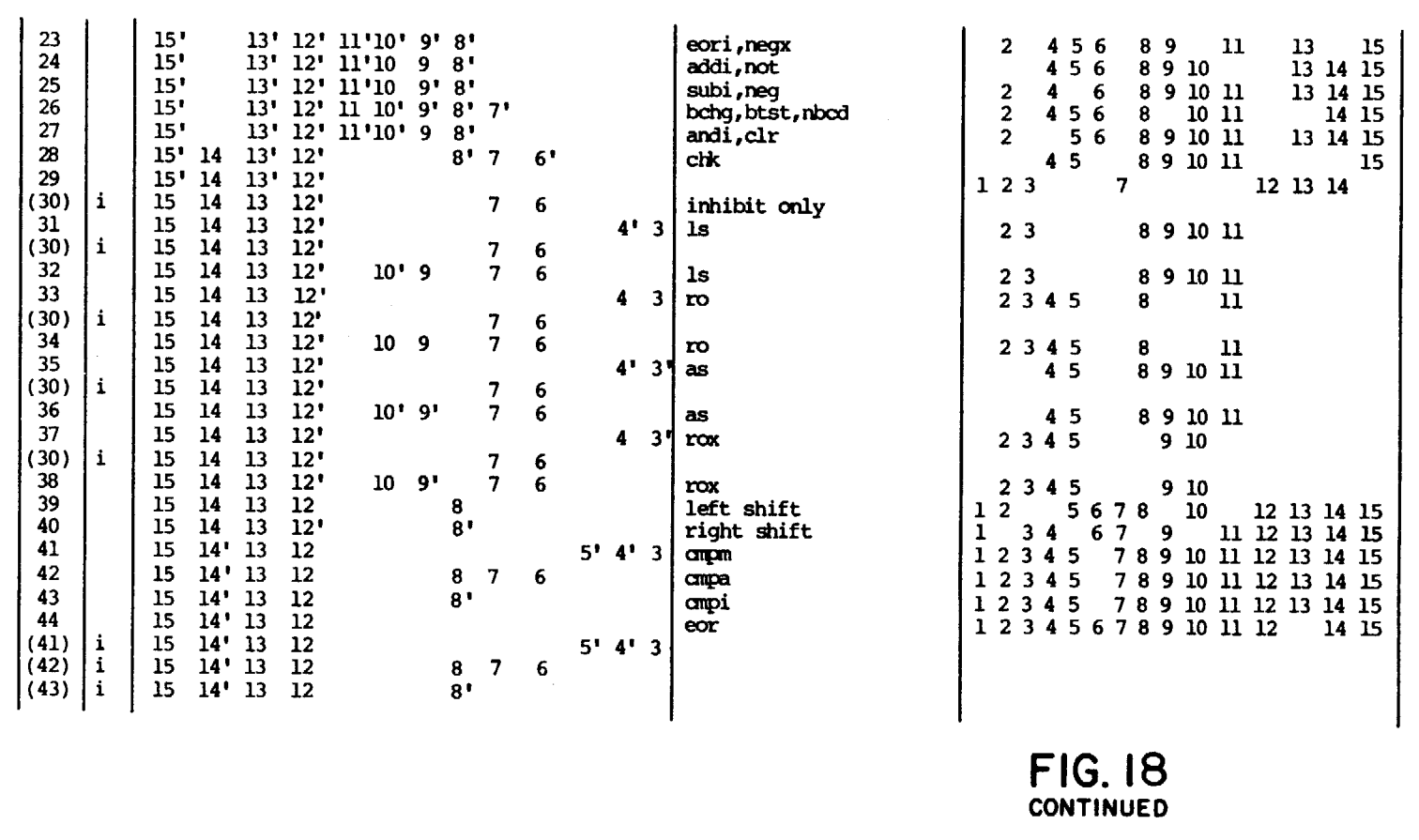

In FIG. 18, a table illustrates the decoding of the macroinstruction stored by the IRD register in order to select one of the fifteen rows in the matrix contained by the ALU and condition code control block. The macroinstructions have been grouped into 45 combinations (0-44) as determined by the bit pattern shown in the section of the table entitled Instruction Decode. In the portion of the table entitled "Row Inhibits", the numbers which appear in a given row of the table correspond to the rows in the ALU and condition code control matrix which are to be disabled whenever a macroinstruction is encountered which has the bit pattern shown in the corresponding row of the instruction decode portion of the table.

Figure 19A:
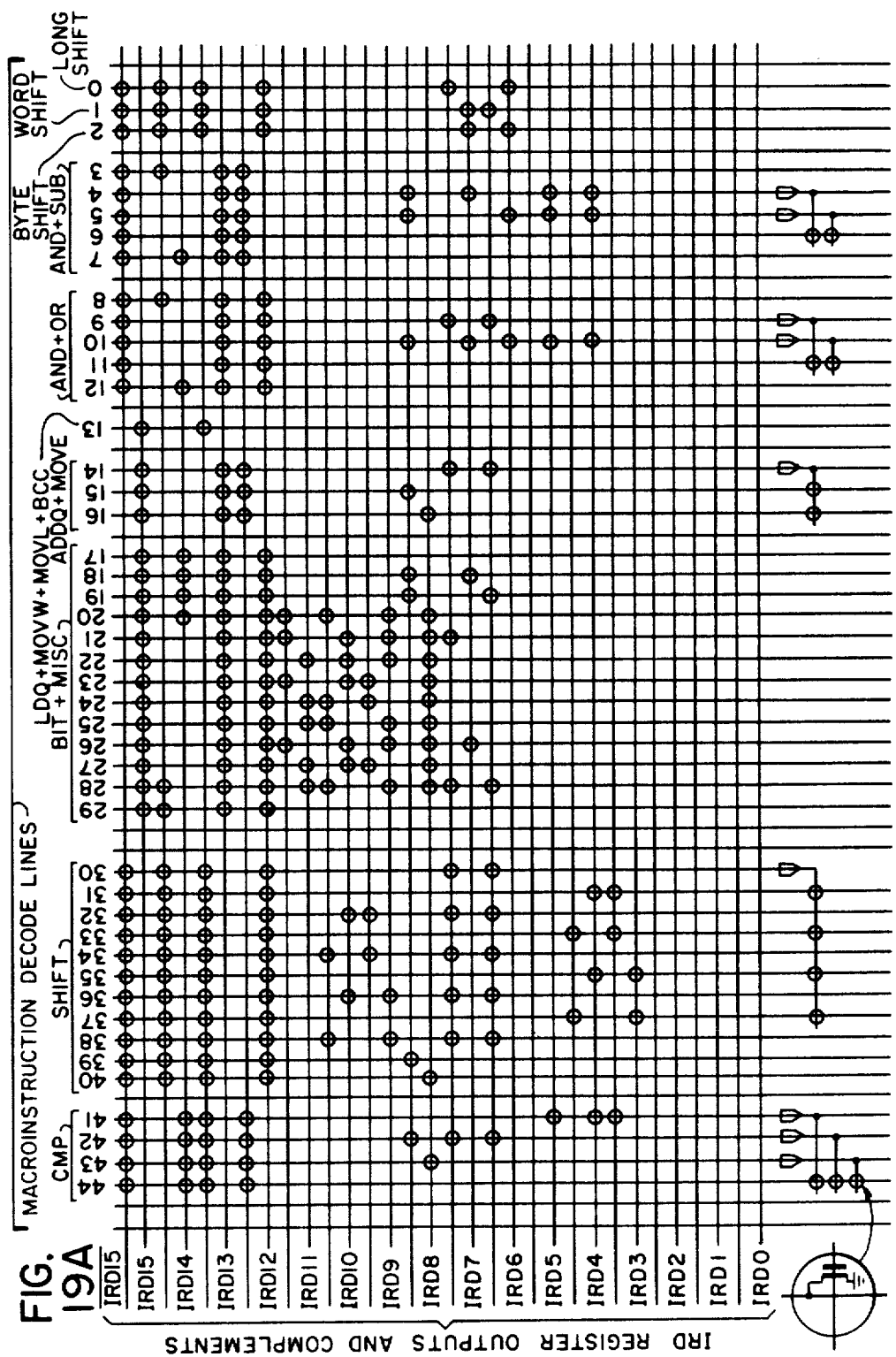
FIGS. 19A-19B illustrate PLA decoding structures responsive to the macroinstruction opcode bit fields for generating row selection lines in accordance with the table shown in FIG. 19.
Figure 19B:
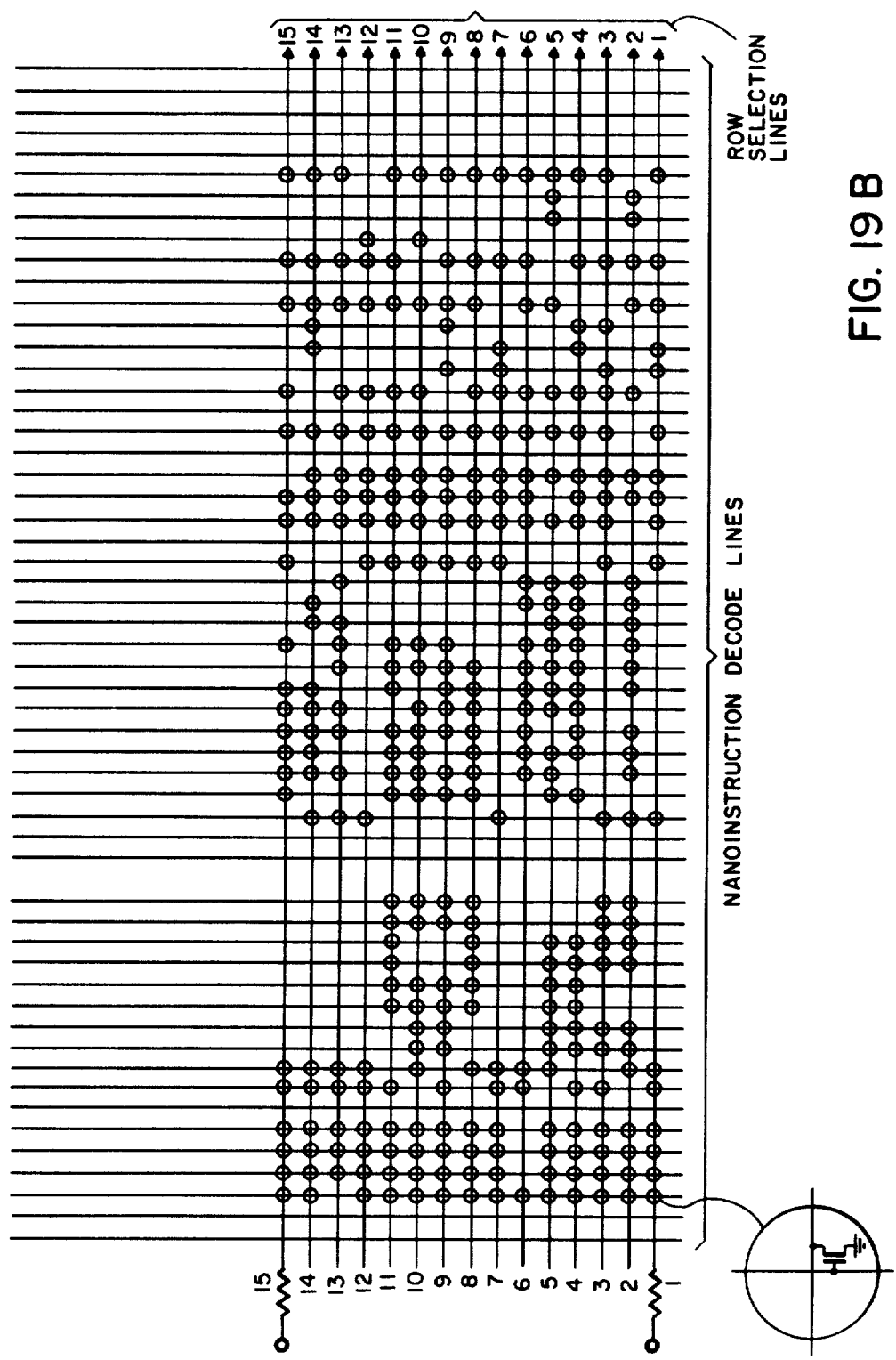

In FIGS. 19A-19B, a programmed logic array structure is illustrated for performing the decoding function described in the table of FIG. 19. In FIG. 19A, a group of lines designated IRD REGISTER OUTPUTS AND COMPLEMENTS is illustrated. Each of these lines conducts the true or complement signal of a macroinstruction bit stored in the IRD register. Intersecting this first group of lines is a second group of lines designated generally MACROINSTRUCTION DECODE LINES which continue from FIG. 19A onto FIG. 19B. The macroinstruction decode lines are labeled with a reference numeral which corresponds to a row in the table of FIG. 18. At the intersection of a line in the first group with a line in the second group (the intersection being represented by a bubble), a MOSFET device pulls the line in the second group to ground whenever a line in the first group is a logic "1". In some cases, one of the macroinstruction decode lines intersects another of the macroinstruction decode lines. For example, macroinstruction decode line 43 is shown intersecting with macroinstruction decode line 44. At this intersection, a MOSFET device operates to pull macroinstruction decode line 44 to ground whenever macroinstruction decode line 43 is a logic "1". Similarly, macroinstruction decode lines 41 and 42 also intersect macroinstruction decode line 44. Referring briefly to the table in FIG. 18, the row numbered 44 is followed by rows set off in parenthesis and labeled 41, 42 and 43. This notation is used to indicate that rows 41, 42 and 43 further decode row 44.

In FIG. 19B, the macroinstrucion decode lines are intersected by a third group of lines designated generally ROW SELECTION LINES and labeled 1 through 15. The row selection lines correspond to the 15 lines coupled to the output of row decoder 241 in FIG. 15. The decoding function performed by the PLA structure shown in FIG. 19B is effective to select one of the 15 rows in the ALU and condition code control matrix based on the information supplied by the macroinstruction decode lines.

Figure 20A:
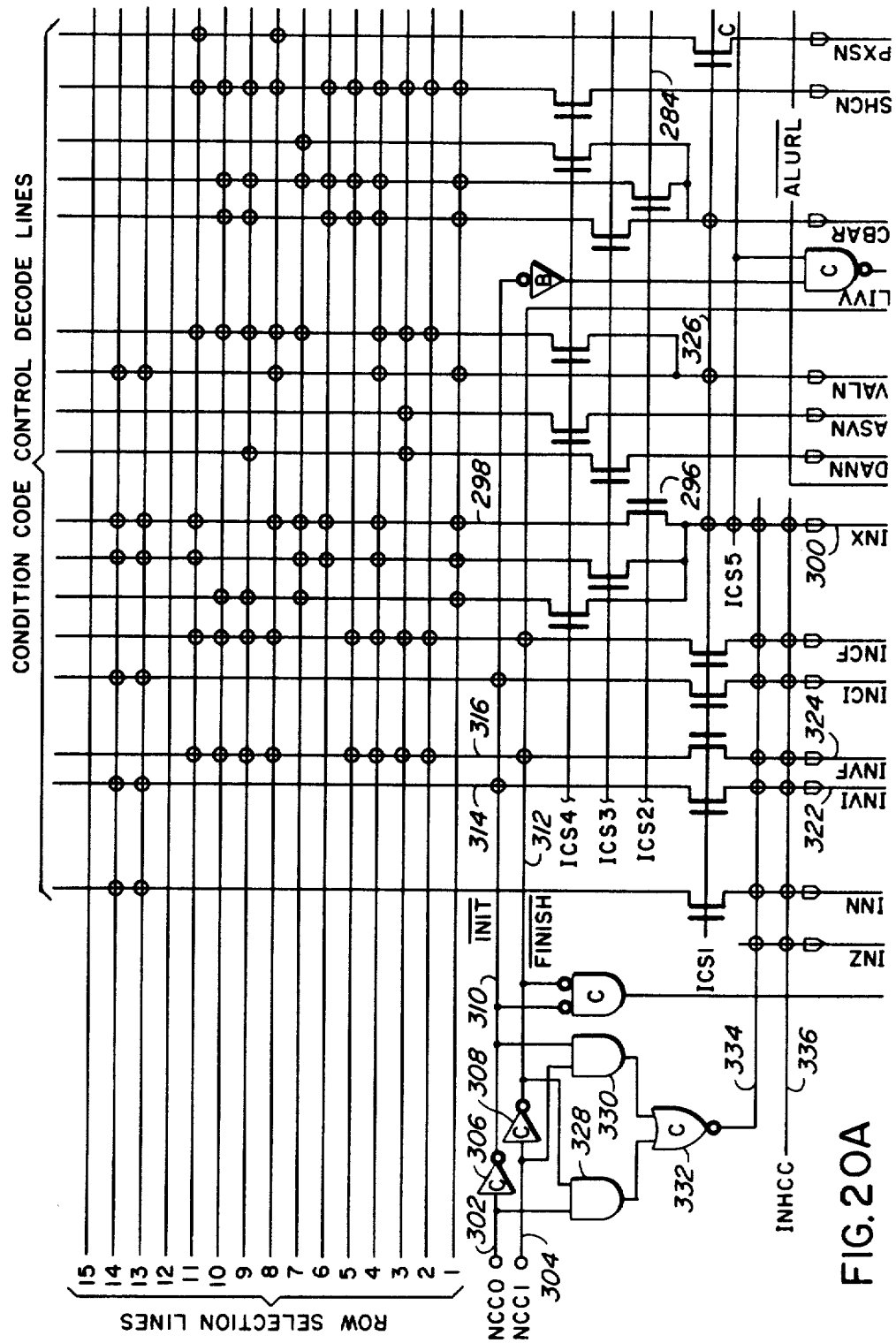
Figure 21J:
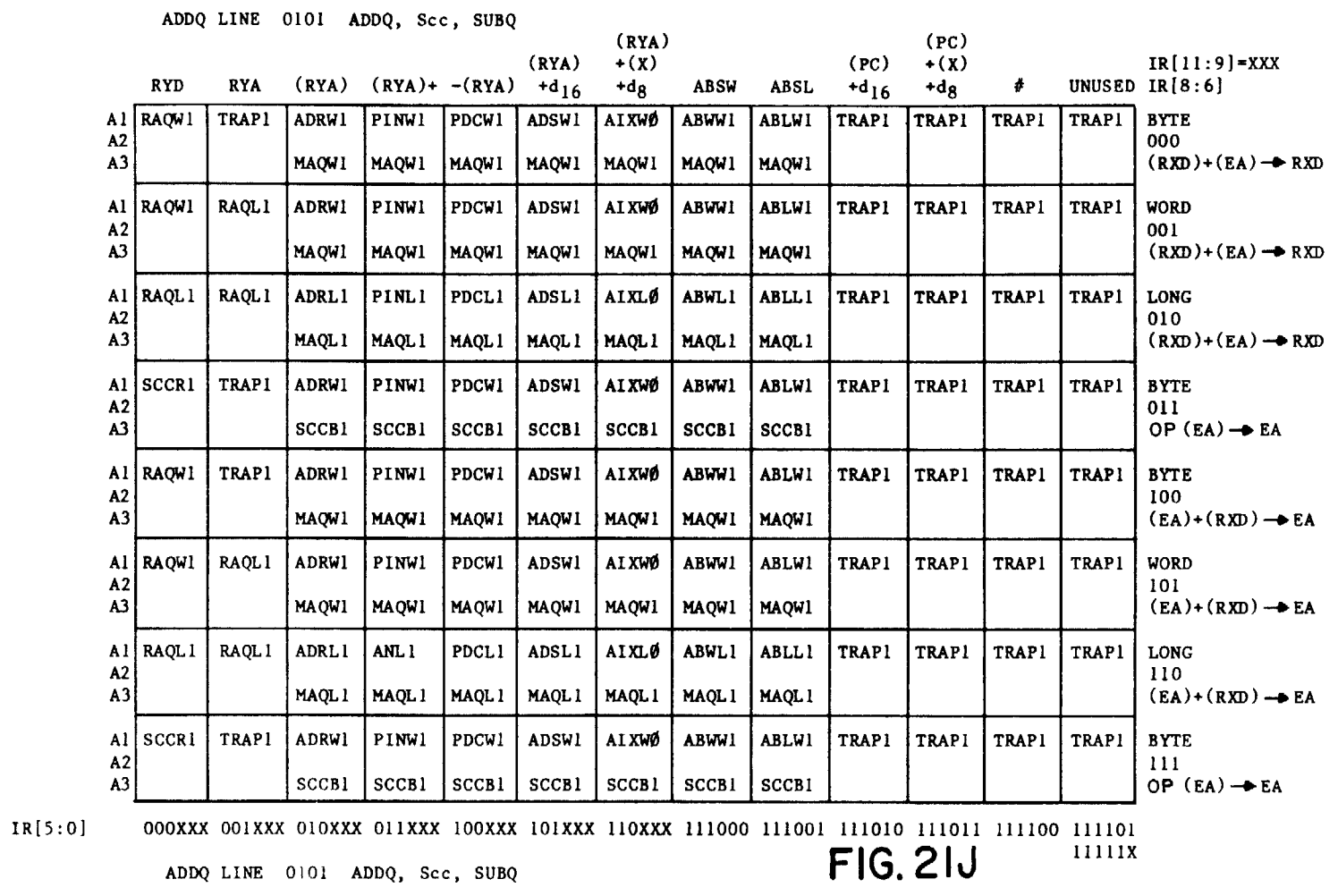
Figure 21N:
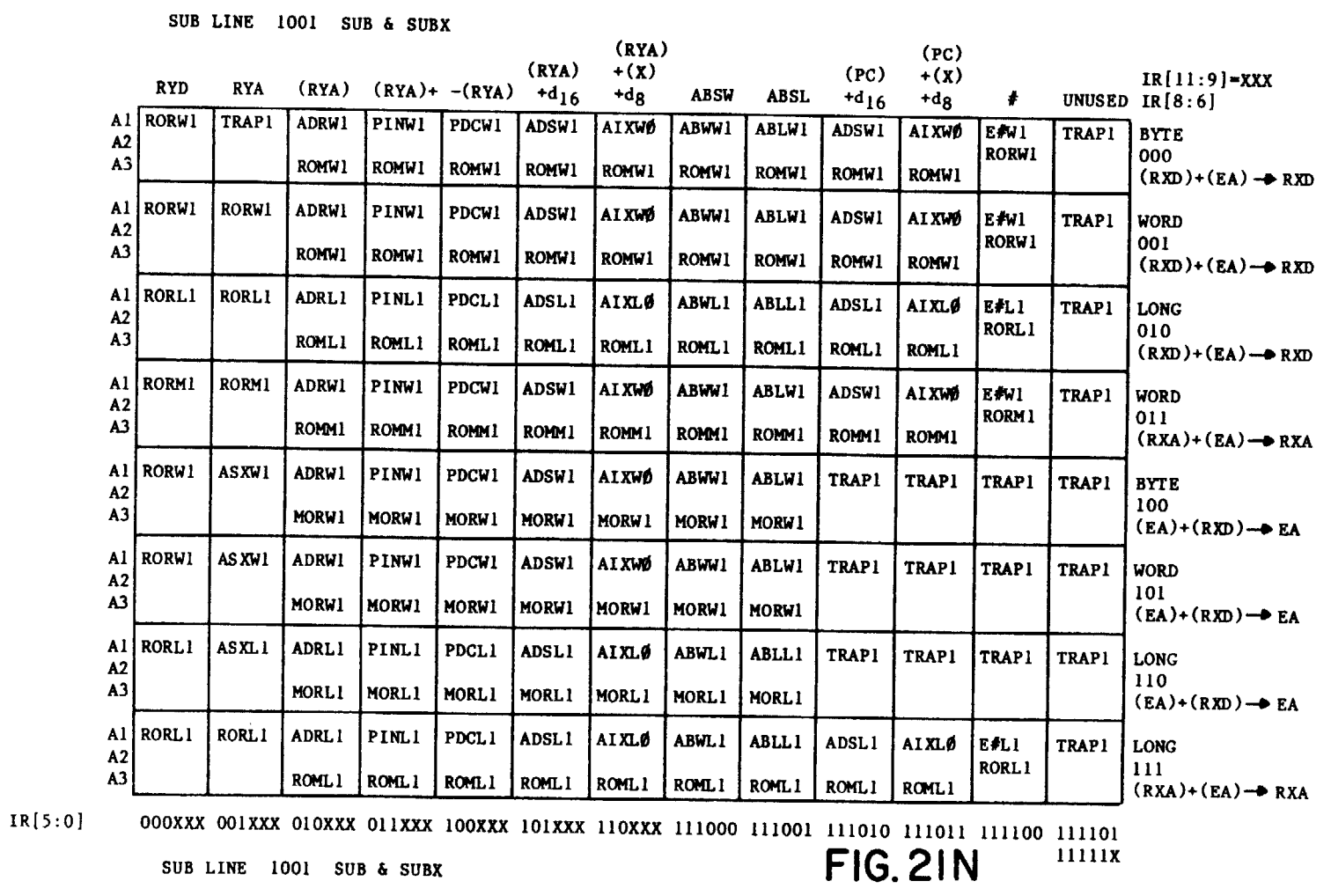

FIGS. 20A and 20B illustrate the circuit implementation of ALU and condition code control block 243 in FIG. 15. A first group of lines designated ROW SELECTION LINES is illustrated in the upper portion of FIG. 20A and FIG. 21B. This group of row selection lines corresponds to the 15 row selection lines output by the PLA structure shown in FIG. 19D. The row selection lines are intersected by a first group of lines designated ALU CONTROL DECODE LINES in FIG. 20B in order to control the signals which select the ALU function. Shown in FIG. 20B are conductors 262, 264, and 266 which receive a 3-bit field provided by the output of the nano ROM. Inverters 268, 270, and 272 are coupled to conductors 262, 264, and 266, respectively, for providing the complement signals on lines 274, 276, and 278. Lines 262, 264, 266, 274, 276 and 278 are intersected by lines designated COLUMN SELECT LINES and labeled 1,2,3,4+6,5 in order to decode the 3-bit field supplied from the nano ROM. The five lines designated column select lines correspond to the five lines coupled to the output of column decoder 244 in FIG. 16. Column selection line 2 is coupled to a load device 280 for holding column selection line 2 at a high level whenever column selection line 2 is enabled. Column selection line 2 is also coupled to a buffer device 282, and the output of buffer 282 is coupled to line 284 labeled ICS2. The other column selection lines are similarly buffered in order to drive lines ICS1, ICS3, ICS4, and ICS5.

Line 286 in FIG. 20B provides ALU control signal CAND. Referring briefly to FIG. 16, one of the columns in the table is labeled cand' and the table illustrates those operations for which the signal is active. Signal CAND is active low and the intersection of line 286 with line ICS1 causes CAND to be active whenever column 1 is selected. In FIG. 17, it will be noted that column 1 always calls for an "and" function to be performed by the ALU, and from the table in FIG. 16 it will be seen that the "and" function is one of those operations for which signal cand' is to be active. If column 2 is selected rather than column 1, then line 284 is at a high level and MOSFET 288 is enabled such that line 286 is coupled to decode line 290. In this case, line 290 is grounded such that signal CAND is active only when the row 4 selection line is enabled. Referring briefly to FIG. 17, it will be seen that within column 2 of the table, row 4 contains the only operation ("and") which requires cand' to be active. On the other hand, if column 4+6 is selected, then MOSFET 292 is enabled such that line 286 is shorted to decode line 294. Line 294 is grounded for making signal CAND active whenever row selection lines 2,5,7,8 or 10 are selected. Again referring to FIG. 18, it will be noted that the corresponding rows in column 4 of the table call for operations for which signal cand' is to be active. The remainder of the control signals which control the ALU are generated in a similar manner.

The row selection lines are also intersected by a second group of lines designated CONDITION CODE CONTROL DECODE LINES in FIG. 20A in order to generate the control signals which determine the setting of the condition code bits. The buffered column selection line ICS1-ICS5 in FIG. 20A determine which of the condition code control decode lines is coupled to the various control signals. For example, when line 284 (ICS2) is at a high level, MOSFET 296 couples decode line 298 to INX control line 300 for controlling the setting of the X bit in the program status word register (PSWX). In this example, INX control line 300 will be disabled whenever row selection lines 1,4,6,7,8,11,13, or 14 are selected. Referring briefly to the table in FIG. 17 for column 2, it will be noted that for the rows mentioned above, the symbol "k" appears for the X bit position indicating that the PSWX bit should not be changed.

Also shown in FIG. 20A are conductors 302 and 304 which receive control signals NCC0 and NCC1 which are 2 bits provided by the output of the nano control store and correspond to the initiate and finish signals previously referred to in the description of the table in FIG. 17. Conductors 302 and 304 are coupled to the input of inverters 306 and 308, respectively, for generating the signals INIT and FINISH on lines 310 and 312, respectively. Line 310 intersects decode line 314 and line 312 intersects decode line 316 such that decode line 314 is enabled when INIT is a logic "0" and decode line 316 is enabled when FINISH is a logic "0". MOSFET devices 318 and 320 couple decode lines 314 and 316 to control lines 322 and 324, respectively, and are enabled when line 326 (ICS1) is at a high level indicating that column 1 has been selected. Control lines 322 (INVI) and 324 (INVF) are gated by circuitry (not shown) in order to control the setting of the overflow bit in the program status word register (PSWV). Decode line 314 is grounded whenever rows 13 or 14 are selected while decode line 316 is grounded whenever rows 2-5 or 8-11 are selected. Referring briefly to the table in FIG. 18 in column 1, it will be noted that for an initiate type operation, the V bit in the program status word register is unchanged only in rows 13 and 14 while for the finish type operation, the V bit in the program status word register is unchanged in rows 2-5 and 8-11.

Lines 302, 304, 310, 312 are also coupled to a gating network which includes AND gates 328 and 330 and NOR gate 332 for generating a gated signal on line 334. If the signals received by conductors 302 and 304 are both logic "0", then line 334 is enabled and causes the condition code control signals to be disabled such that the condition codes in the program status word register are unchanged. This case corresponds to those microword blocks in Appendix H for which the ALU function portion indicates that the condition codes are not affected. Conductor 336 (INHCC) also intersects the condition code control lines such that these control lines are disabled when line 336 is a logic "1". Line 336 is coupled to a decoder (not shown) which detects those macroinstructions which do not affect the condition codes. In the case of these macroinstructions, line 336 is enabled in order to inhibit the condition codes in the PSW register from being affected.

Referring again briefly to FIG. 20B, a sixth column select line appears which is labeled 0 and which is coupled to the input of buffer 337 for driving conductor 338 (ALURL). The significance of this signal will now be explained. Whenever at least one of the nano control store output bits (NIF0-NIF2) received by conductors 262, 264 and 266 is a logic "1" then one of the column select lines 1-5 is enabled indicating that the ALU is to perform an operation. In this event, a temporary storage register or latch within the ALU is updated. However, during certain microcycles, no ALU function is to be performed and the latch within the ALU should not be updated. For these microcycles, conductors 262, 264 and 266 receive logic "0" signals such that column select line 0 is enabled. The ALURL signal conducted by line 338 signifies this case and inhibits activity within the ALU latch.

APPENDIX A

LIST OF MICROWORDS

| ROUTINE | LABEL | FC | NMA | TYPE | CBC | ORIGIN | ROW | DESTINATIONS | |
|---------|-------|----|----|------|-----|--------|-----|------|------|
| o#w1 | o#w1 | i | | a2 | | | | | |
| ablw1 | ablw1 | i | ablw2 | db | | | | | |
| | ablw2 | i | ablw3 | db | | | | | |
| | ablw3 | d | | a3 | | | | | |
| abww1 | abww1 | i | ablw3 | db | | | | | |
| adrw1 | adrw1 | d | adrw2 | db | | | | | |
| | adrw2 | u | | a3 | | | | | |
| adsw1 | adsw1 | i | adsw2 | db | | | | | |
| | adsw2 | u | adrw2 | db | | | | | |
| e#w1 | e#w1 | i | | a2 | | | | | |
| aixw0 | aixw0 | n | aixw1 | db | | | | | |
| | aixw1 | i | | bc | i11 | | | aixw2 | aixw4 |
| | aixw2 | i | adsw2 | db | | | aiai1 | | |
| | aixw4 | i | adsw2 | db | | | aiai1 | | |
| pinw1 | pinw1 | d | pinw2 | db | | | | | |
| | pinw2 | d | | a3 | | | | | |
| pdcw1 | pdcw1 | n | pdcw2 | db | | | | | |
| | pdcw2 | d | | a3 | | | | | |
| o#l1 | o#l1 | i | o#w1 | db | | | | | |
| abll1 | abll1 | i | abl12 | db | | ablw1 | | | |
| | abl12 | i | abl13 | db | | ablw2 | | | |
| | abl13 | d | adr12 | db | | | | | |
| abwl1 | abwl1 | i | abl13 | db | | abww1 | | | |
| adrl1 | adrl1 | d | adr12 | db | | | | | |
| | adr12 | d | | a3 | | | | | |
| adsl1 | adsl1 | i | ads12 | db | | adsw1 | | | |
| | ads12 | u | ads13 | db | | abl13 | | | |
| | ads13 | u | | a3 | | | | | |
| e#l1 | e#l1 | i | e#w1 | db | | | | | |
| aixl0 | aixl0 | n | aixl1 | db | | aixw0 | | | |
| | aixl1 | i | | bc | i11 | aixw1 | | aixl2 | aixl5 |
| | aixl2 | i | ads12 | db | | aixw2 | aiai2 | | |
| | aixl5 | i | ads12 | db | | aixw4 | aiai2 | | |
| pinl1 | pinl1 | d | pinl2 | db | | adrl1 | | | |
| | pinl2 | d | pinl3 | db | | | | | |
| | pinl3 | d | | a3 | | | | | |
| pdcl1 | pdcl1 | n | pdcl2 | db | | | | | |
| | pdcl2 | d | adr12 | db | | | | | |
| mrgw1 | mrgw1 | i | mmrw3 | dbi | | | | | |
| mrgm1 | mrgm1 | i | mmrw3 | dbi | | | | | |
| malw1 | malw1 | i | malw2 | db | | | | | |
| | malw2 | d | malw3 | dbi | | | | | |
| | malw3 | i | b | db | | | mabb1 | | |
| maww1 | maww1 | i | maww2 | db | | | | | |
| | maww2 | d | b | db | | | | | |
| mmrw1 | mmrw1 | d | mmrw2 | db | | | | | |
| | mmrw2 | i | mmrw3 | dbi | | | mmst1 | | |
| | mmaw2 | i | mmrw3 | dbi | | | mmst1 | | |
| | mmrw3 | i | | a1 | | | | | |
| mmdw1 | mmdw1 | i | maww2 | db | | | | | |
| mmxw0 | mmxw0 | n | mmxw1 | db | | | | | |
| | mmxw1 | i | | bc | i11 | | | mmxw2 | mmxw3 |
| | mmxw2 | i | maww2 | db | | | mmmm1 | | |
| | mmxw3 | i | maww2 | db | | | mmmm1 | | |
| mmiw1 | mmiw1 | d | mmiw2 | dbi | | mmrw1 | | | |
| | mmiw2 | i | | a1 | | | | | |
| mmmw1 | mmmw1 | i | mmmw2 | dbi | | | | | |
| | mmmw2 | d | | a1 | | | | | |
| asxw1 | asxw1 | n | asxw2 | db | | pdcw1 | | | |
| | asxw2 | d | asxw3 | db | | | | | |
| | asxw3 | d | asxw4 | db | | | | | |
| | asxw4 | d | asxw5 | dbi | | | | | |
| | asxw5 | i | morw2 | db | | | | | |
| asxl1 | asxl1 | n | asxl2 | db | | pdcw1 | | | |
| | asxl2 | d | asxl3 | db | | | | | |
| | asxl3 | d | asxl4 | db | | asxw2 | | | |
| | asxl4 | d | asxl5 | db | | asxw3 | | | |

| ROUTINE | LABEL | FC | NMA | TYPE | CBC | ORIGIN | ROW | DESTINATIONS | |
|---------|-------|----|----|------|-----|--------|-----|--------------|---|
| | asx15 | d | asx16 | db | | asx12 | | | |
| | asx16 | d | asx17 | db | | | | | |
| | asx17 | d | asx18 | dbi | | | | | |
| | asx18 | i | morw2 | db | | | | | |
| mrgl1 | mrgl1 | i | mrgl2 | dbi | | mrgw1 | | | |
| | mrgl2 | i | | al | | | | | |
| mall1 | mall1 | i | mal12 | db | | | | | |
| | mal12 | d | mal13 | db | | | | | |
| | mal13 | d | malw3 | dbi | | | | | |
| mawl1 | mawl1 | i | maw12 | db | | maww1 | | | |
| | maw12 | d | maw13 | db | | | | | |
| | maw13 | d | b | db | | | | | |
| mmrl1 | mmrl1 | d | mmr12 | db | | | | | |
| | mmr12 | d | mmr13 | dbi | | | | | |
| mmdl1 | mmdl1 | i | mmw12 | db | | mmdw1 | | | |
| mmx10 | mmx10 | n | mmx11 | db | | mmxw0 | | | |
| | mmx11 | i | | bc | il1 | mmxw1 | | mmx12 | mmx13 |
| | mmx12 | i | maw12 | db | | mmxw2 | mmmm2 | | |
| | mmx13 | i | mmw12 | db | | mmxw3 | mmmm2 | | |
| mmil1 | mmil1 | d | mmi12 | db | | mmrl1 | | | |
| | mmi12 | i | mmiw2 | dbi | | mmrl2 | | | |
| mmml1 | mmml1 | i | mmm12 | dbi | | mmmw1 | | | |
| | mmm12 | d | mmmw2 | db | | | | | |
| rrgw1 | rrgw1 | i | rrgw2 | dbi | | | | | |
| | rrgw2 | i | | al | | | | | |
| rrgm1 | rrgm1 | i | rrgl2 | dbi | | | | | |
| ralw1 | ralw1 | i | ralw2 | db | | ablw1 | | | |
| | ralw2 | i | maww2 | db | | | | | |
| raww1 | raww1 | i | maww2 | db | | | | | |
| rmrw1 | rmrw1 | d | mmrw2 | dbi | | | | | |
| rmdw1 | rmdw1 | i | rmdw2 | db | | | | | |
| | rmdw2 | d | b | dbi | | | | | |
| rmxw0 | rmxw0 | n | rmxw1 | db | | aixw0 | | | |
| | rmxw1 | i | | bc | il1 | mmxw1 | | rmxw2 | rmxw3 |
| | rmxw2 | i | rmdw2 | db | | aixw2 | rmrm1 | | |
| | rmxw3 | i | rmdw2 | db | | aixw4 | rmrm1 | | |
| rmiw1 | rmiw1 | d | mmiw2 | dbi | | rmrw1 | | | |
| rmmw1 | rmmw1 | i | mmmw2 | dbi | | | | | |
| rrgl1 | rrgl1 | i | rrgl2 | dbi | | rrgw1 | | | |
| | rrgl2 | i | | al | | | | | |
| rall1 | rall1 | i | ral12 | db | | ablw1 | | | |
| | ral12 | i | ral13 | db | | ralw2 | | | |
| | ral13 | d | maw13 | db | | | | | |
| rawl1 | rawl1 | i | ral13 | db | | raww1 | | | |
| rmrl1 | rmrl1 | d | rmr12 | db | | | | | |
| | rmr12 | d | rmr13 | dbi | | | | | |
| | rmr13 | i | | al | | | | | |
| rmdl1 | rmdl1 | i | rmd12 | db | | rmdw1 | | | |
| | rmd12 | d | rmd13 | db | | ral13 | | | |
| | rmd13 | d | rmr13 | dbi | | rmdw2 | | | |
| rmx10 | rmx10 | n | rmx11 | db | | aixw0 | | | |
| | rmx11 | i | | bc | il1 | mmxw1 | | rmx12 | rmx13 |
| | rmx12 | i | rmd12 | db | | aixw2 | rmrm2 | | |
| | rmx13 | i | rmd12 | db | | aixw4 | rmrm2 | | |
| rmil1 | rmil1 | d | rmi12 | db | | rmrl1 | | | |
| | rmi12 | d | rmi13 | dbi | | | | | |
| | rmi13 | i | | al | | | | | |
| rmml1 | rmml1 | i | rmm12 | dbi | | rmmw1 | | | |
| | rmm12 | d | mmmw2 | db | | | | | |
| morw1 | morw1 | i | morw2 | dbi | | | | | |
| | morw2 | d | | al | | maww2 | | | |
| morl1 | morl1 | i | mor12 | dbi | | morw1 | | | |
| | mor12 | d | morw2 | db | | | | | |
| romw1 | romw1 | i | rrgw2 | dbi | | | | | |
| romm1 | romm1 | i | rom2 | dbi | | romw1 | | | |
| roml1 | roml1 | i | rom12 | dbi | | romw1 | | | |
| | rom12 | i | rom13 | db | | | | | |
| | rom13 | d | | al | | | | | |
| rorw1 | rorw1 | i | rrgw2 | dbi | | | | | |

| ROUTINE | LABEL | FC | JMP | TYPE | CBC | ORIGIN | FROM | DESTINATIONS | | |
|---|---|---|---|---|---|---|---|---|---|---|
| rorl1 | rorl1 | i | ror12 | dbi | | rorw1 | | | | |
| | ror12 | i | ror13 | db | | | | | | |
| | ror13 | n | reml3 | db | | | | | | |
| roaw1 | roaw1 | i | roaw2 | dbi | | | | | | |
| | roaw2 | i | | al | | | rosc1 | | | |
| roal1 | roal1 | i | roal2 | dbi | | roaw1 | | | | |
| | roal2 | i | roal3 | db | | | | | | |
| | roal3 | n | roal4 | db | | | | | | |
| | roal4 | n | | al | | | | | | |
| rorm1 | rorm1 | i | rorm2 | dbi | | rorw1 | | | | |
| | rorm2 | i | rorm3 | db | | ror12 | | | | |
| | rorm3 | n | roml3 | db | | | | | | |
| dvur1 | dvur1 | n | dvur2 | db | | | | | | |
| | dvur2 | n | dvur3 | db | | | | | | |
| | dvur3 | n | trap3 | db | | | | | | |
| dvum1 | dvum1 | n | dvum2 | db | | | | | | |
| | dvum2 | n | | bc | z | | | dvum3 | dvur2 | |
| | dvum3 | n | | bc | c | | trdv1 | dvum4 | dvum5 | |
| | dvum4 | i | dvuma | dbi | | | dvdv1 | | | |
| | dvumz | i | dvuma | dbi | | | dvdv1 | | | |
| | dvuma | i | | al | | | dvdv1 | | | |
| | dvum5 | n | | bc | n | | dvdv1 | dvum8 | dvum7 | |
| | dvum6 | n | | bc | n | | dvdv2 | dvum8 | dvum7 | |
| | dvum7 | n | | bc | auz | | dvdv3 | dvum6 | dvum9 | |
| | dvum8 | n | | bc | auz | dvum7 | dvdv3 | dvumb | dvumc | |
| | dvum9 | n | dvumd | db | | | dvdv2 | | | |
| | dvumd | i | dvum0 | dbi | | | dvdv5 | | | |
| | dvumb | n | | bc | c | | dvdv4 | dvum6 | dvume | |
| | dvumc | n | | bc | c | dvum9 | dvdv4 | dvumd | dvumf | |
| | dvume | n | dvum5 | db | | | dvdv2 | | | |
| | dvumf | i | dvum0 | dbi | | | dvdv5 | | | |
| | dvum0 | i | | al | | | | | | |
| dvs01 | dvs01 | n | dvs03 | db | | dvur1 | | | | |
| dvs02 | dvs02 | n | dvs03 | db | | dvum1 | | | | |
| | dvs03 | n | | bc | nz1 | | | dvs04 | dvs05 | dvur2 dvur2 |
| | dvs04 | n | dvs06 | db | | dvum3 | trdv1 | | | |
| | dvs05 | n | dvs06 | db | | | trdv1 | | | |
| | dvs06 | n | | bc | n | | | dvs07 | dvs10 | |
| | dvs07 | n | dvs08 | db | | | dvdv6 | | | |
| | dvs08 | n | | bc | c | dvume | | dvumz | dvs09 | |
| | dvs09 | n | dvs0c | db | | dvum5 | | | | |
| | dvs10 | n | dvs11 | db | | | dvdv6 | | | |
| | dvs11 | n | dvs09 | db | | | | | | |
| | dvs0a | n | dvs0c | db | | dvum6 | | | | |
| | dvs0c | n | | bc | auz | dvum7 | dvdv7 | dvs0d | dvs0a | |
| | dvs0d | n | | bc | c | dvumb | dvdv9 | dvs0a | dvs0f | |
| | dvs0e | n | | bc | c | dvumb | dvdv9 | dvs13 | dvs12 | |
| | dvs0f | n | dvs09 | db | | dvume | dvdv8 | | | |
| | dvs12 | n | dvs14 | db | | dvum5 | dvdve | | | |
| | dvs13 | n | dvs14 | db | | | dvdve | | | |
| | dvs14 | n | dvs15 | db | | | | | | |
| | dvs15 | n | | bc | n | | | dvs16 | dvs1d | |
| | dvs16 | n | | bc | n | | dvdva | dvs17 | dvs1a | |
| | dvs17 | i | | bci | n | dvs03 | dvdvb | leaa2 | dvuma | |
| | dvs1a | n | dvs1b | db | | dvs03 | dvdvb | | | |
| | dvs1b | n | | bc | nz2 | | | dvum4 | dvs1c | dvs1c dvs1c |
| | dvs1c | i | leaa2 | dbi | | | dvdv1 | | | |
| | dvs1d | n | | bc | n | dvs16 | dvdva | dvs1f | dvs1e | |
| | dvs1e | n | | bc | n | dvs1b | dvdvd | dvs1c | dvum4 | |
| | dvs1f | n | dvs20 | dbi | | dvs03 | dvdvd | | | |
| | dvs20 | i | | bc | nz2 | dvs17 | | dvuma | leaa2 | leaa2 leaa2 |
| trap1 | trap1 | n | trap2 | db | | | trac1 | trch1 | | |
| | trap2 | n | trap3 | db | | | | | | |
| | trap3 | d | trap4 | db | | | | | | |
| | trap4 | d | trap5 | db | | | | | | |
| | trap5 | d | trap6 | db | | | itlx4 | | | |
| | trap6 | i | jmp11 | db | | | ldmd4 | | | |
| bser1 | bser1 | n | bser2 | dbc | | | | | | |
| | bser2 | n | bser3 | db | | | trac2 | | | |

| ROUTINE | LABEL | FC | NMA | TYPE | CDC | ORIGIN | Row | DESTINATIONS |
|---------|-------|----|----|------|-----|--------|-----|--------------|
|  | bser3 | d | bser4 | db |  | trap3 |  |  |
|  | bser4 | d | bser5 | db |  |  |  |  |
|  | bser5 | d | bser6 | db |  | trap3 |  |  |
|  | bser6 | d | trap3 | db |  |  |  |  |
| itlx1 | itlx1 | n | itlx2 | db |  | trac1 |  |  |
|  | itlx2 | n | itlx3 | db |  |  |  |  |
|  | itlx3 | n | itlx4 | db |  |  |  |  |
|  | itlx4 | d | itlx5 | db |  |  |  |  |
|  | itlx5 | a | itlx6 | db |  |  |  |  |
|  | itlx6 | n | itlx7 | dbi |  | dvumb |  |  |
|  | itlx7 | n | trap4 | db |  |  |  |  |
| trac1 | trac1 | n | trac2 | db |  |  |  |  |
|  | trac2 | n | trap3 | db |  |  |  |  |
| mpow1 | mpow1 | i | mpow2 | db |  | adsw1 |  |  |
|  | mpow2 | d | mpow3 | dbi |  |  |  |  |
|  | mpow3 | d | b | db |  |  |  |  |
| mpol1 | mpol1 | i | mpol2 | db |  | adsw1 |  |  |
|  | mpol2 | d | mpol3 | dbi |  |  |  |  |
|  | mpol3 | d | mpow2 | db |  |  |  |  |
| mpiw1 | mpiw1 | i | mpiw2 | db |  | adsw1 |  |  |
|  | mpiw2 | d | mpiw3 | db |  |  |  |  |
|  | mpiw3 | d | mpiw4 | dbi |  |  |  |  |
|  | mpiw4 | i |  | a1 |  |  |  |  |
| mpil1 | mpil1 | i | mpil2 | db |  | adsw1 |  |  |
|  | mpil2 | d | mpil3 | db |  | mpiw2 |  |  |
|  | mpil3 | d | mpil4 | db |  |  |  |  |
|  | mpil4 | d | mpiw3 | db |  |  |  |  |
| cmmw1 | cmmw1 | d | cmmw2 | db |  |  |  |  |
|  | cmmw2 | d | cmmw3 | db |  |  |  |  |
|  | cmmw3 | d | cmmw4 | dbi |  |  |  |  |
|  | cmmw4 | i |  | a1 |  |  |  |  |
| cmml1 | cmml1 | d | cmm12 | db |  | cmmw1 |  |  |
|  | cmm12 | d | cmm13 | db |  | cmmw2 |  |  |
|  | cmm13 | d | cmm14 | db |  |  |  |  |
|  | cmm14 | d | cmm15 | dbi |  | cmmw3 |  |  |
|  | cmm15 | d | cmm16 | db |  |  |  |  |
|  | cmm16 | i | cmm17 | db |  |  |  |  |
|  | cmm17 | i |  | a1 |  |  |  |  |
| exge1 | exge1 | i | exge2 | dbi |  |  |  |  |
|  | exge2 | i | rcal3 | db |  |  |  |  |
| asbb1 | asbb1 | n | asbb2 | db |  | pdcw1 |  |  |
|  | asbb2 | d | asbb3 | db |  | asxw2 |  |  |
|  | asbb3 | d | asbb4 | db |  | asxw3 |  |  |
|  | asbb4 | d | asbb5 | dbi |  | asxw4 |  |  |
|  | asbb5 | i | asbb6 | db |  |  |  |  |
|  | asbb6 | i | morw2 | db |  |  |  |  |
| rbrb1 | rbrb1 | i | rbrb2 | dbi |  | rorw1 |  |  |
|  | rbrb2 | i | rbrb3 | db |  | asbb6 |  |  |
|  | rbrb3 | n |  | a1 |  |  |  |  |
| b | b | i | mmrw3 | dbi |  |  |  |  |
| maqw1 | maqw1 | i | morw2 | dbi |  |  |  |  |
| maql1 | maql1 | i | mor12 | dbi |  | maqw1 |  |  |
| raqw1 | raqw1 | i | roaw2 | dbi |  |  |  |  |
| raql1 | raql1 | i | roal2 | dbi |  | raqw1 |  |  |
| rlql1 | rlql1 | i | mmrw3 | dbi |  |  |  |  |
| halt1 | halt1 | d | halt1 | db |  | dvumb |  |  |
| stop1 | stop1 | n |  | a1 |  |  |  |  |
| cpmw1 | cpmw1 | i | cprm2 | dbi |  | romw1 |  |  |
| cpdw1 | cpdw1 | i | mmrw2 | dbi |  |  |  |  |
| cpdl1 | cpdl1 | i | cpdl2 | dbi |  | cpdw1 |  |  |
|  | cpdl2 | i |  | a1 |  |  |  |  |
| rcaw1 | rcaw1 | i | rcaw2 | dbi |  | roaw1 |  |  |
|  | rcaw2 | i |  | a1 |  |  |  |  |
| rcal1 | rcal1 | i | rcal2 | dbi |  | roaw1 |  |  |
|  | rcal2 | i | rcal3 | db |  |  |  |  |
|  | rcal3 | n |  | a1 |  |  |  |  |
| cpmw1 | cpmw1 | i | rcaw2 | dbi |  | romw1 |  |  |
| cpml1 | cpml1 | i | cpml2 | dbi |  | romw1 |  |  |
|  | cpml2 | i | rcal3 | db |  |  |  |  |
| cprw1 | cprw1 | i | rcaw2 | dbi |  | rorw1 |  |  |
| cprl1 | cprl1 | i | cprl2 | dbi |  | rorw1 |  |  |

| ROUTINE | LABEL | FC | NMA | TYPE | CDC | ORIGIN | ROW | DESTINATIONS | | |
|---------|-------|----|----|------|-----|--------|-----|----|----|----|
|  | cprl2 | i | rcal3 | db |  |  |  |  |  |  |
| cprm1 | cprm1 | i | cprm2 | dbi |  |  | rorw1 |  |  |  |
|  | cprm2 | i | rcal3 | db |  |  |  |  |  |  |
| stiw1 | stiw1 | n | stiw2 | db |  |  | trac1 |  |  |  |
|  | stiw2 | n | stiw3 | db |  |  |  |  |  |  |
|  | stiw3 | n | stiw4 | db |  |  |  |  |  |  |
|  | stiw4 | n | malw3 | db |  |  |  |  |  |  |
| rstw1 | rstw1 | n | stiw4 | db |  |  |  |  |  |  |
| mstw1 | mstw1 | n | stiw4 | db |  |  |  |  |  |  |
| stmw1 | stmw1 | i | stmw2 | dbi |  |  |  |  |  |  |
|  | stmw2 | i | morw2 | db |  |  |  |  |  |  |
| strw1 | strw1 | i | strw2 | dbi |  |  | trac1 |  |  |  |
|  | strw2 | i | rcal3 | db |  |  |  |  |  |  |
| tsmw1 | tsmw1 | i | mmrw3 | dbi |  |  | rrgw1 |  |  |  |
| tsrw1 | tsrw1 | i | mmrw3 | dbi |  |  | rrgw1 |  |  |  |
| tsml1 | tsml1 | i | tsml2 | dbi |  |  | tsmw1 |  |  |  |
|  | tsml2 | i |  | a1 |  |  |  |  |  |  |
| tsrl1 | tsrl1 | i | tsrl2 | dbi |  |  | rrgw1 |  |  |  |
|  | tsrl2 | i |  | a1 |  |  |  |  |  |  |
| susp1 | susp1 | i | extr2 | dbi |  |  | exge1 |  |  |  |
| lusp1 | lusp1 | i | leaa2 | dbi |  |  | leaa1 |  |  |  |
| swap1 | swap1 | i | swap2 | dbi |  |  |  |  |  |  |
|  | swap2 | i |  | a1 |  |  |  |  |  |  |
| rset1 | rset1 | n | rset2 | db |  |  | stop1 |  |  |  |
|  | rset2 | n | rset3 | dbi |  |  |  |  |  |  |
|  | rset3 | a | rset4 | db |  |  |  | rsrs1 |  |  |
|  | rset4 | a |  | bc | auz | dvumb |  | rset3 | rset5 |  |
|  | rset5 | i |  | a1 |  |  | rsrs1 |  |  |  |
| rstp1 | rstp1 | n | rstp2 | dbc |  |  |  |  |  |  |
|  | rstp2 | n | rstp3 | db |  |  |  |  |  |  |
|  | rstp3 | i | rstp4 | db |  |  |  |  |  |  |
|  | rstp4 | i | rstp5 | db |  |  | rstp3 |  |  |  |
|  | rstp5 | i | jmal1 | db |  |  |  |  |  |  |
| mulr1 | mulr1 | i | mulm2 | dbi |  |  |  |  |  |  |
| mulm1 | mulm1 | i | mulm2 | dbi |  |  |  |  |  |  |
|  | mulm2 | i |  | bc | ms0 | rorl2 |  | mulm4 | mulm3 mulm4 mulm5 |  |
|  | mulm3 | n | mulm4 | db |  |  | mumu1 |  |  |  |
|  | mulm4 | n |  | bc | m01 |  | mumu1 | mulm6 | mulm4 mulm3 mulm5 |  |
|  | mulm5 | n | mulm4 | db |  |  | mumu1 |  |  |  |
|  | mulm6 | n |  | a1 |  |  | mumu1 |  |  |  |
| nnmw1 | nnmw1 | i | morw2 | dbi |  |  |  |  |  |  |
| nnrw1 | nnrw1 | i | roal2 | dbi |  |  |  |  |  |  |
| nnml1 | nnml1 | i | nnml2 | dbi |  |  | nnmw1 |  |  |  |
|  | nnml2 | i | morw2 | db |  |  |  |  |  |  |
| nnrl1 | nnrl1 | i | nnrl2 | dbi |  |  | nnrw1 |  |  |  |
|  | nnrl2 | i | roal4 | db |  |  |  |  |  |  |
| nbcr1 | nbcr1 | i | nbcr2 | dbi |  |  | nnrw1 |  |  |  |
|  | nbcr2 | i | nbcr3 | db |  |  | asbb5 |  |  |  |
|  | nbcr3 | n |  | a1 |  |  | nbsr1 |  |  |  |
| nbcm1 | nbcm1 | i | asbb5 | dbi |  |  |  |  |  |  |
| extr1 | extr1 | i | extr2 | dbi |  |  |  |  |  |  |
|  | extr2 | i |  | a1 |  |  |  |  |  |  |
| jsal1 | jsal1 | i | jsal2 | db |  |  | ablw1 |  |  |  |
|  | jsal2 | i | jsal2 | db |  |  |  |  |  |  |
| jsrd1 | jsrd1 | n | jsrd2 | db |  |  |  |  |  |  |
|  | jsrd2 | i | jsrd3 | db |  |  |  |  |  |  |
|  | jsrd3 | i | jsaw2 | db |  |  |  |  |  |  |
| jsaw0 | jsaw0 | n | jsaw1 | db |  |  |  |  |  |  |
|  | jsaw1 | i | jsaw2 | db |  |  |  |  |  |  |
|  | jsaw2 | d | jsaw3 | db |  |  |  |  |  |  |
|  | jsaw3 | d | b | dbi |  |  |  |  |  |  |
| jsra1 | jsra1 | i | jsaw2 | db |  |  |  |  |  |  |
| jsrx0 | jsrx0 | n | jsrx1 | db |  |  | aixw0 |  |  |  |
|  | jsrx1 | n |  | bc | ill |  |  | jsrx2 | jsrx3 |  |
|  | jsrx2 | n | jsrd2 | db |  |  | jsjs1 |  |  |  |
|  | jsrx3 | n | jsrd2 | db |  |  | jsjs1 |  |  |  |
| jmaw1 | jmaw1 | n | jmal2 | db |  |  | jsaw0 |  |  |  |
| jmpa1 | jmpa1 | i | b | db |  |  |  |  |  |  |
| jmal1 | jmal1 | i | jmal2 | db |  |  | ablw1 |  |  |  |
|  | jmal2 | i | b | db |  |  |  |  |  |  |
| jmpd1 | jmpd1 | n | bbci3 | db |  |  | jsrd1 |  |  |  |
| jmpx0 | jmpx0 | n | jmpx1 | db |  |  | aixw0 |  |  |  |
|  | jmpx1 | n |  | bc | ill | jsrx1 |  | jmpx2 | jmpx3 |  |
|  | jmpx2 | n | bbci3 | db |  |  | jsrx2 | jmjm1 |  |  |

| ROUTINE | LABEL | FC | NMA | TYPE | CBC | ORIGIN | ROW | DESTINATIONS | | |
|---------|-------|----|----|------|-----|--------|-----|--------------|---|---|
|  | jmpx3 | n | bbci3 | db |  | jsrx3 | jmjm1 |  |  |  |
| dcnt1 | dcnt1 | n | dcnt2 | db |  |  |  |  |  |  |
|  | dcnt2 | i |  | bci | ze |  |  | dcnt4 | dcnt3 |  |
|  | dcnt3 | i | dcnt5 | db |  | rcaw2 | dcdc1 |  |  |  |
|  | dcnt4 | i | b | db |  | rorl2 | dcdc1 |  |  |  |
|  | dcnt5 | i | mmrw3 | db |  | b |  |  |  |  |
| bbci1 | bbci1 | n |  | bc | cc | dcnt1 | mabb1 | bbci2 | bbci3 |  |
|  | bbci2 | n | b | db |  | rcal3 |  |  |  |  |
|  | bbci3 | i | b | db |  |  |  |  |  |  |
| bbcw1 | bbcw1 | n |  | bc | cc |  |  | bbcw3 | bbci3 |  |
|  | bbcw3 | n | malw3 | db |  | rcal3 | mabb1 |  |  |  |
| laal1 | laal1 | i | laal2 | db |  | o#l1 |  |  |  |  |
|  | laal2 | i | b | db |  | o#w1 |  |  |  |  |
| laaw1 | laaw1 | i | b | db |  |  |  |  |  |  |
| leaa1 | leaa1 | i | leaa2 | dbi |  |  |  |  |  |  |
|  | leaa2 | i |  | a1 |  |  | dvdv1 |  |  |  |
| lead1 | lead1 | i | lead2 | db |  |  |  |  |  |  |
|  | lead2 | i | b | db |  |  |  |  |  |  |
| leax0 | leax0 | n | leax1 | db |  | aixw0 |  |  |  |  |
|  | leax1 | i |  | bc | i11 | aixw1 |  | leax2 | leax3 |  |
|  | leax2 | i | leax4 | db |  |  | lelx1 |  |  |  |
|  | leax3 | i | leax4 | db |  |  | lelx1 |  |  |  |
|  | leax4 | n | b | db |  |  |  |  |  |  |
| peax0 | peax0 | n | peax1 | db |  | aixw0 |  |  |  |  |
|  | peax1 | i |  | bc | i11 | aixw1 |  | peax2 | peax3 |  |
|  | peax2 | i | peax4 | db |  | aixw2 | pepx1 |  |  |  |
|  | peax3 | i | peax4 | db |  | aixw4 | pepx1 |  |  |  |
|  | peax4 | n | peax5 | db |  |  |  |  |  |  |
|  | peax5 | i | peax6 | db |  |  |  |  |  |  |
|  | peax6 | d | morm2 | db |  | bsri2 |  |  |  |  |
| paal1 | paal1 | i | paal2 | db |  | ablw1 |  |  |  |  |
|  | paal2 | i | paaw2 | db |  |  |  |  |  |  |
| paaw1 | paaw1 | i | paaw2 | db |  |  |  |  |  |  |
|  | paaw2 | d | maw3 | db |  | bsri2 |  |  |  |  |
| peaa1 | peaa1 | i | peax6 | dbi |  |  |  |  |  |  |
| pead1 | pead1 | i | pead2 | db |  |  |  |  |  |  |
|  | pead2 | i | pead3 | dbi |  |  |  |  |  |  |
|  | pead3 | i | peax5 | db |  |  |  |  |  |  |
| bsri1 | bsri1 | n | bsri2 | db |  |  |  |  |  |  |
|  | bsri2 | d | bsri3 | db |  |  |  |  |  |  |
|  | bsri3 | d | malw3 | db |  |  |  |  |  |  |
| bsrw1 | bsrw1 | n | bsrw2 | do |  |  |  |  |  |  |
|  | bsrw2 | d | bsrw3 | db |  | bsri2 |  |  |  |  |
|  | bsrw3 | d | malw3 | db |  |  |  |  |  |  |
| unlk1 | unlk1 | d | unlk2 | db |  | ldmr2 |  |  |  |  |
|  | unlk2 | d | unlk3 | dbi |  | ablw1 |  |  |  |  |
|  | unlk3 | i | unlk4 | db |  |  |  |  |  |  |
|  | unlk4 | i |  | a1 |  |  |  |  |  |  |
| link1 | link1 | i | link2 | db |  |  |  |  |  |  |
|  | link2 | i | link3 | db |  | jsrd3 |  |  |  |  |
|  | link3 | d | link4 | dbi |  |  |  |  |  |  |
|  | link4 | d | mmiw2 | db |  |  |  |  |  |  |
| chkr1 | chkr1 | i | chkr2 | dbi |  |  |  | trap1 | trap1 chkr3 trap1 |  |
|  | chkr2 | i |  | bc | nv |  |  |  |  |  |
|  | chkr3 | n |  | bc | n | dvumb |  | trch1 | chkr4 | trap1 |
|  | chkr4 | n |  | a1 |  |  |  | trch1 |  |  |
| chkm1 | chkm1 | i | chkr2 | dbi |  |  |  |  |  |  |
| rtr1 | rtr1 | d | rtr2 | db |  | cmmw3 |  |  |  |  |
|  | rtr2 | d | rtr3 | db |  | malw3 |  |  |  |  |
|  | rtr3 | d | rtr4 | db |  | smaw2 |  |  |  |  |
|  | rtr4 | d | jmal2 | db |  |  |  |  |  |  |
| rts1 | rts1 | d | rts2 | db |  | cmmw3 |  |  |  |  |
|  | rts2 | d | rts3 | db |  | ablw1 |  |  |  |  |
|  | rts3 | i | b | db |  |  |  |  |  |  |
| bcsm1 | bcsm1 | i | bcsm2 | dbi |  |  |  |  |  |  |
|  | bcsm2 | d |  | a1 |  |  |  |  |  |  |
| bcsr1 | bcsr1 | i | bcsr2 | dbi |  | exge1 |  |  |  |  |
|  | bcsr2 | i |  | bc | d4 |  |  | bcsr4 | bcsr3 |  |
|  | bcsr3 | n | bcsr5 | db |  |  | bcbc1 |  |  |  |
|  | bcsr4 | n |  | a1 |  |  | bcbc1 |  |  |  |
|  | bcsr5 | n |  | a1 |  |  |  |  |  |  |
| bclm1 | bclm1 | i | bclm2 | dbi |  |  |  |  |  |  |

| ROUTINE | LABEL | FC | NMA | TYPE | CBC | ORIGIN | ROW | DESTINATIONS |

| ROUTINE | LABEL | FC | NMA | TYPE | CBC | ORIGIN | ROW | DESTINATIONS | | | |
|---|---|---|---|---|---|---|---|---|---|---|---|
|  | bclm2 | i | bcsm2 | db |  |  |  |  |  |  |  |
| bclr1 | bclr1 | i | bclr2 | dbi |  | exge1 |  |  |  |  |  |
|  | bclr2 | i |  | bc | d4 | bcsr2 |  | bclr4 | bclr3 |  |  |
|  | bclr3 | n | bclr5 | db |  | bcsr3 | bcbc2 |  |  |  |  |
|  | bclr4 | n | bcsr4 | db |  |  | bcbc2 |  |  |  |  |
|  | bclr5 | n | bcsr5 | db |  | bclr4 |  |  |  |  |  |
| btsm1 | btsm1 | i | mmrw3 | dbi |  |  |  |  |  |  |  |
| btsr1 | btsr1 | i | btsr2 | dbi |  | exge1 |  |  |  |  |  |
|  | btsi1 | i | btsr2 | dbi |  |  |  |  |  |  |  |
|  | btsr2 | i |  | bc | d4 |  |  | bcsr4 | btsr3 |  |  |
|  | btsr3 | n |  | a1 |  |  | bcbc1 |  |  |  |  |
| tasr1 | tasr1 | i | tasr2 | dbi |  |  |  |  |  |  |  |
|  | tasr2 | i |  | a1 |  |  |  |  |  |  |  |
| tasm1 | tasm1 | n | tasm2 | db |  |  |  |  |  |  |  |
|  | tasm2 | d | b | db |  |  |  |  |  |  |  |
| smal1 | smal1 | i | smal2 | db |  | malw3 |  |  |  |  |  |
|  | smal2 | i | smal3 | db |  | ablw1 |  |  |  |  |  |
|  | smal3 | i | smaw3 | db |  |  |  |  |  |  |  |
| stmx1 | stmx1 | i | stmx2 | db |  |  |  |  |  |  |  |
|  | stmx2 | n | stmx3 | db |  | aixw1 |  |  |  |  |  |
|  | stmx3 | i |  | bc | ill |  |  | stmx4 | stmx5 |  |  |
|  | stmx4 | i |  | bc | enl | aixw2 | stst1 | stmr5 | mmrw2 | stmr4 | mmrw2 |
|  | stmx5 | i |  | bc | enl | aixw4 | stst1 | stmr5 | mmrw2 | stmr4 | mmrw2 |
| smaw1 | smaw1 | i | smaw2 | db |  | malw3 |  |  |  |  |  |
|  | smaw2 | i | smaw3 | db |  |  |  |  |  |  |  |
|  | smaw3 | i |  | bc | enl |  |  | stmr5 | mmrw2 | stmr4 | mmrw2 |
| stmd1 | stmd1 | i | stmd2 | db |  | malw3 |  |  |  |  |  |
|  | stmd2 | i | stmd3 | db |  | smaw2 |  |  |  |  |  |
|  | stmd3 | i |  | bc | enl |  |  | stmr5 | mmrw2 | stmr4 | mmrw2 |
| stmr1 | stmr1 | i | stmr2 | db |  | rtr2 |  |  |  |  |  |
|  | stmr2 | i |  | bc | enl |  |  | stmr5 | mmrw2 | stmr4 | mmrw2 |
|  | stmr4 | d | stmr6 | db |  |  | mmst1 |  |  |  |  |
|  | stmr5 | d |  | bc | enl | stmr6 | mmst1 | stmr5 | mmrw2 | stmr4 | mmrw2 |
|  | stmr6 | d |  | bc | enl |  |  | stmr5 | mmrw2 | stmr4 | mmrw2 |
| ldmx0 | ldmx0 | i | ldmx1 | db |  | malw3 |  |  |  |  |  |
|  | ldmx1 | n | ldmx2 | db |  | aixw0 |  |  |  |  |  |
|  | ldmx2 | i |  | bc | ill | aixw1 |  | ldmx3 | ldmx4 |  |  |
|  | ldmx3 | i | ldmx5 | db |  |  | ldld1 |  |  |  |  |
|  | ldmx4 | i | ldmx5 | db |  |  | ldld1 |  |  |  |  |
|  | ldmx5 | u | ldmx6 | db |  | adsw2 |  |  |  |  |  |
|  | ldmx6 | u |  | bc | enl |  |  | ldmr4 | mmaw2 | ldmr3 | mmaw2 |
| lmaw1 | lmaw1 | i | lmaw2 | db |  | malw3 |  |  |  |  |  |
|  | lmaw2 | i | ldmr2 | db |  |  |  |  |  |  |  |
| ldmd1 | ldmd1 | i | ldmd2 | db |  | malw3 |  |  |  |  |  |
|  | ldmd2 | i | ldmd3 | db |  | lead1 |  |  |  |  |  |
|  | ldmd3 | i | ldmd4 | db |  |  |  |  |  |  |  |
|  | ldmd4 | u |  | bc | enl |  |  | ldmr4 | mmaw2 | ldmr3 | mmaw2 |
| lmal1 | lmal1 | i | lmal2 | db |  | malw3 |  |  |  |  |  |
|  | lmal2 | i | lmal3 | db |  | e#l1 |  |  |  |  |  |
|  | lmal3 | i | ldmr2 | db |  | e#w1 |  |  |  |  |  |
| ldmr1 | ldmr1 | i | ldmr2 | db |  | malw3 |  |  |  |  |  |
|  | ldmr2 | d |  | bc | enl |  |  | ldmr4 | mmaw2 | ldmr3 | mmaw2 |
|  | ldmr3 | u | ldmr5 | db |  | o#l1 | mmst1 |  |  |  |  |
|  | ldmr4 | u |  | bc | enl |  | mmst1 | ldmr4 | mmaw2 | ldmr3 | mmaw2 |
|  | ldmr5 | u |  | bc | enl |  |  | ldmr4 | mmaw2 | ldmr3 | mmaw2 |
| sccr1 | sccr1 | i |  | bci | cc | sccb1 |  | roaw2 | sccr2 |  |  |
|  | sccr2 | i | nbcr3 | db |  | sccb2 | rosc1 |  |  |  |  |
| sccb1 | sccb1 | i |  | bci | cc |  |  | sccb3 | sccb2 |  |  |
|  | sccb2 | i | morw2 | db |  |  | scsc1 |  |  |  |  |
|  | sccb3 | i | morw2 | db |  | smaw3 | scsc1 |  |  |  |  |
| trpv1 | trpv1 | i |  | bci | v | bclm1 |  | trpv2 | trpv3 |  |  |
|  | trpv2 | i |  | a1 |  |  | tvtv1 |  |  |  |  |
|  | trpv3 | i | trap3 | db |  |  | tvtv1 |  |  |  |  |
| popm1 | popm1 | i | popm2 | db |  | malw3 |  |  |  |  |  |
|  | popm2 | d |  | bci | enl | ldmr2 |  | popm4 | popm6 | popm3 | popm6 |
|  | popm3 | d | popm5 | db |  | o#l1 |  | popo1 |  |  |  |
|  | popm4 | d |  | bc | enl | ldmr4 | popo1 | popm4 | popm6 | popm3 | popm6 |
|  | popm5 | d |  | bc | enl | ldmr5 |  | popm4 | popm6 | popm3 | popm6 |
|  | popm6 | i | mmrw3 | db |  |  | popo1 |  |  |  |  |
| push1 | push1 | i | push2 | db |  | rtr2 |  |  |  |  |  |

| ROUTINE LABEL | FC | NMA (MBC) | TYPE | CBC | ORIGIN | ROW | DESTINATIONS | | | |
|---|---|---|---|---|---|---|---|---|---|---|
| | push2 | i | | bc | en1 | | push5 | push3 | push4 | push3 |
| | push3 | i | mmrw3 | dbi | | popm6 | puph1 | | | |
| | push4 | d | push6 | db | | | puph1 | | | |
| | push5 | d | | bc | en1 | | puph1 | push5 | push3 | push4 push3 |
| | push6 | d | | bc | en1 | | | push5 | push3 | push4 push3 |
| srrw1 | srrw1 | i | srrw2 | dbi | | | | | | |
| | srrw2 | i | | bc | auz | | | srrw3 | nbcr3 | |
| | srrw3 | n | | bc | auz | | nbsr1 | srrw3 | nbcr3 | |
| sril1 | sril1 | i | srrl2 | dbi | | sriw1 | | | | |
| sriw1 | sriw1 | i | srrw2 | dbi | | | | | | |
| srrl1 | srrl1 | i | srrl2 | dbi | | srrw1 | | | | |
| | srrl2 | i | | bc | auz | srrw2 | | srrl3 | srrl4 | |
| | srrl3 | n | | bc | auz | srrw3 | srsr1 | srrl3 | srrl4 | |
| | srrl4 | n | srrl5 | db | | | srsr1 | | | |
| | srrl5 | n | | a1 | | | | | | |
| sftm1 | sftm1 | i | sftm2 | dbi | | tsmw1 | | | | |
| | sftm2 | i | morw2 | db | | | | | | |
| zzz (2nd) | zzz00 | n | halt1 | db | | | | | | |
| | zzz01 | n | halt1 | db | | | | | | |
| | zzz02 | n | halt1 | db | | | | | | |
| | zzz03 | n | halt1 | db | | | | | | |
| | zzz04 | n | halt1 | db | | | | | | |
| | zzz05 | n | halt1 | db | | | | | | |
| | zzz06 | n | halt1 | db | | | | | | |
| | zzz07 | n | halt1 | db | | | | | | |
| | zzz08 | n | halt1 | db | | | | | | |
| | zzz09 | n | halt1 | db | | | | | | |
| | zzz0a | n | halt1 | db | | | | | | |
| | zzz0b | n | halt1 | db | | | | | | |
| | zzz0c | n | halt1 | db | | | | | | |
| | zzz0d | n | halt1 | db | | | | | | |
| | zzz0e | n | halt1 | db | | | | | | |
| | zzz0f | n | halt1 | db | | | | | | |
| | zzz10 | n | halt1 | db | | | | | | |
| | zzz11 | n | halt1 | db | | | | | | |
| | zzz12 | n | halt1 | db | | | | | | |
| | zzz14 | n | halt1 | db | | | | | | |
| | zzz15 | n | halt1 | db | | | | | | |
| | zzz17 | n | halt1 | db | | | | | | |
| | zzz18 | n | halt1 | db | | | | | | |
| | zzz19 | n | halt1 | db | | | | | | |
| | zzz1a | n | halt1 | db | | | | | | |
| | zzz1b | n | halt1 | db | | | | | | |
| | zzz1c | n | halt1 | db | | | | | | |
| | zzz1d | n | halt1 | db | | | | | | |
| | zzz1e | n | halt1 | db | | | | | | |
| | zzz1f | n | halt1 | db | | | | | | |
| | zzz20 | n | halt1 | db | | | | | | |
| | zzz21 | n | halt1 | db | | | | | | |
| | zzz22 | n | halt1 | db | | | | | | |
| | zzz23 | n | halt1 | db | | | | | | |
| | zzz24 | n | halt1 | db | | | | | | |

APPENDIX B

| abbrev | meaning |
|---|---|
| rx | register (data or address) designated by $R_X$ field in macroinstruction |
| rxa | address register designated by $R_X$ field in macroinstruction |
| rxd | data register designated by $R_X$ field in macroinstruction |

| abbrev | meaning |
|---|---|
| rxh | upper half (16 most significant bits) of register (data or address) designated by $R_X$ field in macroinstruction |
| rxl | lower half (16 least significant bits) of register (data or address) designated by $R_X$ field in macroinstruction |
| rxdl | lower half (16 least significant bits) of data register designated by $R_X$ field in macroinstruction |
| ry | register (data or address) designated by $R_Y$ field in macroinstruction |
| rya | address register designated by $R_Y$ field in macroinstruction |
| ryd | data register designated by $R_Y$ field in macroinstruction |
| ryh | upper half (16 most significant bits) of register (data or address) designated by $R_Y$ field in macroinstruction |
| ryl | lower half (16 least significant bits) of register (data or address) designated by $R_Y$ field in macroinstruction |
| rydl | lower half (16 least significant bits) of data register designated by $R_Y$ field in macroinstruction |
| rz | register (data or address) designated by 4-bit field of secnod word of macro-instructions using indexed addressing for specifying register to be used as the index |
| rzl | lower half (16 least significant bits) of register described immediately above |
| db | DATA BUS (including high, low, and data sections) |
| dbh | DATA BUS (high section only) |
| dbl | DATA BUS (low section only) |
| dbd | DATA BUS (data section only) |
| db* | DATA BUS (at least data section) |
| dbe | sign extend sign bit onto high section of DATA BUS |

| abbrev | meaning |
|---|---|
| edb | external data bus |
| dbin | data bus input buffer (including a latch) coupled to external data bus |
| dbinh | upper byte (8 most significant bits) of data bus buffer |
| dbinl | lower byte (8 least significant bits) of data bus input buffer |
| dob | data bus output buffer coupled to external data bus |
| dobh | upper byte (8 most significant bits) of data bus output buffer |
| dobl | lower byte (8 least significant bits) of data bus output buffer |
| ab | ADDRESS BUS (including high, low, and data sections) |
| abh | ADDRESS BUS (high section only) |
| abl | ADDRESS BUS (low section only) |
| abd | ADDRESS BUS (data section only) |
| ab* | ADDRESS BUS (at least data section) |
| abe | sign extend sign bit onto high section of ADDRESS BUS |
| aob | address output buffer coupled to external address bus |
| * | ADDRESS BUS (high, low, and data sections) or alternatively DATA BUS (high, low, and data sections) |
| *e | sign extend sign bit onto high section of ADDRESS BUS or alternatively onto high section of DATA BUS |
| psw | program status word which stores condition codes, interrupt level, trace mode bit, supervisor mode bit |
| psws | supervisor mode bit in the program status word |

| abbrev | meaning |
|---|---|
| ssw | special word which monitors status of current microinstruction; accessed in event of address error or bus error to aid processor in recovery from error |
| at | temporary address register |
| ath | upper half (16 most significant bits) of temporary address register |
| atl | lower half (16 least significant bits) of temporary address register |
| sp | user or supervisor stack pointer |
| sph | upper half (16 most significant bits) of user or supervisor stack pointer |
| spl | lower half (16 least significant bits) of user or supervisor stack pointer |
| pc | program counter register |
| pch | upper half (16 most significant bits) of program counter register |
| pcl | lower half (16 least significant bits) of program counter register |
| dcr | decoder in data section of execution unit which is used for bit manipulation |
| reset pren | used during instruction which specifies access to multiple registers in order to advance encoder to the address of the next register to be accessed |
| ftu | field translation unit |
| idle wait | no transfers occur during this microcycle |
| tpend | a one-bit latch which indicates whether the current macroinstruction should implement a trace upon completion of the macroinstruction |

| abbrev | meaning |
|---|---|
| inl | latch which stores the interrupt level of the interrupting device upon recognition of an interrupt for subsequent transfer into program status word |
| trap | stores vector which can be supplied to field translate unit for addressing a trap routine in event of trap condition (e.g. divide-by-zero) |
| corf | correction factor for decimal arithmetic which can be provided to ALU |
| 'sr c-alu-alue' | shift right used in multiply operation; carry bit coupled to msb of ALU; lsb of ALU coupled to msb of ALUE |

APPENDIX C

CBC    Conditional Branch Choice

| CBC | VARIABLE | SOURCE | VALUES | C1 | C0 | REMARKS |
|---|---|---|---|---|---|---|
| 0 | ili | irc | 0 | 0 | 0 | |
|   |     |     | 1 | 1 | 1 | |
| 1 | auz | eu | 0 | 1 | 1 | |
|   |     |    | 1 | 0 | 1 | |
| 11 | auz | eu | 0 | 1 | 1 | |
|    |     |    | 1 | 0 | 0 | |
| 2 | c | psw | 0 | 0 | 1 | |
|   |   |     | 1 | 0 | 0 | |
| 12 | c | psw | 0 | 1 | 1 | |
|    |   |     | 1 | 1 | 0 | |
| 3 | z | psw | 0 | 0 | 0 | |
|   |   |     | 1 | 1 | 1 | |
| 4 | nz1 | psw | 00 | 1 | 0 | $n \wedge z$ |
|   |     |     | 10 | 0 | 1 | |
|   |     |     | x1 | 1 | 1 | |
| 5 | n | psw | 0 | 0 | 1 | |
|   |   |     | 1 | 1 | 1 | |
| 15 | n | psw | 0 | 1 | 0 | |
|    |   |     | 1 | 1 | 1 | |
| 6 | nz2 | psw | 00 | 1 | 1 | $n \wedge z$ |
|   |     |     | 1x,x1 | 0 | 1 | |
| 7 | ms0 | eu,ird | x0 | 1 | 1 | ir[8]^alue[0] |
|   |     |        | 01 | 0 | 1 | |
|   |     |        | 11 | 1 | 0 | |
| 8 | m01 | eu,ird | 1xxx | 0 | 0 | auz^ir[8]^alue[1:0] |
|   |     |        | 000x | 1 | 1 | |
|   |     |        | 001x | 0 | 1 | |
|   |     |        | 0100 | 1 | 1 | |
|   |     |        | 0101 | 0 | 1 | |
|   |     |        | 0110 | 1 | 0 | |
|   |     |        | 0111 | 1 | 1 | |
| a | ze | eu | 0 | 1 | 1 | |
|   |    |    | 1 | 0 | 0 | |
| b | nv | psw | x1,0x | 1 | 1 | $n \wedge v$ |
|   |    |     | 10 | 0 | 0 | |
| c | d4 | dcr | 0 | 1 | 1 | |

CBC   Conditional Branch Choice

| | | | | | | |
|---|---|---|---|---|---|---|
| | | | 1 | 0 | 1 | |
| 1c | d4 | dcr | 0 | 1 | 1 | |
| | | | 1 | 1 | 0 | |
| d | v | psw | 0 | 1 | 1 | |
| | | | 1 | 0 | 0 | |
| e | en1 | eu, ird | 00 | 1 | 0 | end^ir[6] |
| | | | 10 | 1 | 1 | |
| | | | x1 | 0 | 0 | |
| 1e | en1 | eu, ird | 00 | 1 | 0 | |
| | | | 10 | 1 | 1 | |
| | | | x1 | 0 | 1 | |
| 9 | cc | psw | 0 F | 0 | 1 | |
| | | | 1 T | 1 | 1 | |
| 19 | cc | psw | 0 F | 1 | 0 | |
| | | | 1 T | 1 | 1 | |

APPENDIX D

| abbrev | meaning |
|---|---|
| i11 | bit 11 in IRC register (IRC11); signifies whether or not to sign extend for indexed addressing |
| auz | arithmetic unit result equals zero (AU=0) |
| c | ALU carry bit stored in program status word (PSWC) |
| z | ALU result equals zero bit stored in program status word (PSWZ) |
| nz1 | logical combination of n and z condition codes (PSWN, PSWZ); used in signed-division algorithm |
| n | ALU result negative bit stored in program status word (PSWN) |
| nz2 | logical combination of n and z condition codes (PSWN, PSWZ); used in signed-division algorithm |
| mso | logical combination of bit 8 in IRD register (IRD8) and bit 0 in ALUE shift register (ALUE 0); used in multiply algorithm |
| m01 | logical combination of auz (AU=0), bit 8 in IRD register (IRD8), and bits 1 and 0 in ALUE shift register (ALUE1, ALUE0); used in multiply algorithm |
| ze | local copy of ALU result equal to zero (LOCZ); local copy required apart from z bit in program status word for operations which must test ALU=0 |

| abbrev | meaning |
|---|---|
| | without changing program status word, such as "Decrement Counter and Branch if Non-Zero" (DCNT) macroinstruction |
| nv | logical combination of n and v condition codes (PSWN, PSWV); used in "Check Register Against Bounds" (CHK) macroinstruction |
| d4 | bit 4 of the decoder in the data section of the execution unit used for bit manipulation (DCR4); bit 4 specifies whether upper half or lower half of 32-bit register is required for bit manipulation |
| v | ALU result overflow bit stored in program status word (PSWV) |
| enl | logical combination of bit 6 in IRD register (IRD6) and signal generated by the multiple register access encoder in execution unit which indicates that all registers specified have been accessed (END) |
| cc | 4-bit field of macroinstruction stored in IRD register (IRDB-IRD8) which specifies conditions to be tested for "Branch Conditionally" (Bcc) and "Set According to Condition" (Scc) macroinstructions |
| irc | IRC register 52 in FIG. 4 |
| eu | execution unit |
| psw | program status word register 86 in FIG. 4 |
| ird | IRD register 56 in FIG. 4 |
| dcr | bit manipulation decoder in data section of execution unit |

APPENDIX E

| cc | abbrev | meaning | condition |
|---|---|---|---|
| 0 | ----- | branch always, set always | |
| 1 | ----- | never branch, reset always | |
| 2 | HI | high | $\bar{z} \cdot \bar{c}$ |
| 3 | LS | low or same | $z + c$ |
| 4 | CC | carry clear | $\bar{c}$ |

| cc | abbrev | meaning | condition |
|----|--------|---------|-----------|
| 5 | CS | carry set | $c$ |
| 6 | NE | not equal | $\bar{z}$ |
| 7 | EQ | equal | $z$ |
| 8 | VC | no overflow | $\bar{v}$ |
| 9 | VS | overflow | $v$ |
| A | PL | plus | $\bar{n}$ |
| B | MI | minus | $n$ |
| C | GE | greater or equal | $n \cdot v + \bar{n} \cdot \bar{v}$ |
| D | LT | less | $\bar{n} \cdot v + n \cdot \bar{v}$ |
| E | GT | greater | $\bar{z} \cdot n \cdot v + \bar{z} \cdot \bar{n} \cdot \bar{v}$ |
| F | LE | less or equal | $z + \bar{n} \cdot v + n \cdot \bar{v}$ |

APPENDIX F

| Mnemonic | Description | Operand |
|----------|-------------|---------|
| ABCD | Add Decimal with Extend | 8 |
| ADD | Add Binary | 8, 16, 32 |
| ADDA | Add Address | 16, 32 |
| ADDI* | Add Immediate | 8, 16, 32 |
| ADDQ* | Add Quick | 8, 16, 32 |
| ADDX | Add Extended | 8, 16, 32 |
| AND | Logical AND | 8, 16, 32 |
| ANDI* | Logical AND Immediate | 8, 16, 32 |
| ASL, ASR | Arithmetic Shift | 8, 16, 32 |
| Bcc | Conditional Branch | 8, 16 |
| BCHG | Test a Bit and Change | 16, 32 |
| BCLR | Test a Bit and Clear | 16, 32 |
| BRA | Unconditional Branch | 8, 16 |
| BSET | Test a Bit and Set | 16, 32 |
| BSR | Subroutine Branch | 8, 16 |
| BTST | Test a Bit | 16, 32 |
| CHK | Check register against bounds | 16 |
| CLR | Clear an operand | 8, 16, 32 |
| CMP | Compare | 8, 16, 32 |
| CMPA | Compare Address | 16, 32 |
| CMPI* | Compare Immediate | 8, 16, 32 |
| CMPM | Compare Memory | 8, 16, 32 |
| DCNT | Decrement Counter and Branch if Non-zero | — |
| DIVS | Signed Divide | 32/16 → 32 |
| DIVU | Unsigned Divide | 32/16 → 32 |
| EOR | Exclusive OR | 8, 16, 32 |
| EORI* | Exclusive OR Immediate | 8, 16, 32 |
| EXG | Exchange Registers | 32 |
| EXT | Sign Extend | 8, 16 → 16, 32 |
| JMP | Unconditional Jump | — |
| JSR | Subroutine Jump | — |
| LEA | Load Effective Address | 32 |
| LINK | Link and Allocate | — |
| LSL, LSR | Logical Shift | 8, 16, 32 |
| MOVE | Move | 8, 16, 32 |
| MOVE CC | Move Condition Code | 16 |
| MOVE Status | Move Status Register | 16 |
| MOVE USP | Move User Stack Pointer | 32 |
| MOVEM | Move Multiple Registers | 16, 32 |
| MOVEP | Move Peripheral | 16, 32 |
| MOVEQ* | Load Register Quick | 32 |
| MULS | Signed Multiply | 16·16 → 32 |
| MULU | Unsigned Multiply | 16·16 → 32 |
| NBCD | Negate Decimal with Extend | 8 |
| NEG | Negate Binary | 8, 16, 32 |
| NEGX | Negate Binary with Extend | 8, 16, 32 |
| NOP | No operation | — |
| NOT | Logical Complement | 8, 16, 32 |
| OR | Inclusive OR | 8, 16, 32 |
| ORI* | Inclusive OR Immediate | 8, 16, 32 |
| PEA | Push Effective Address | 32 |
| RESET | Reset External Devices | — |
| ROL, ROR | Rotate without Extend | 8, 16, 32 |
| ROXL, ROXR | Rotate with Extend | 8, 16, 32 |
| RTE | Return from Exception | — |
| RTR | Return and Restore Condition Codes | — |
| RTS | Return from Subroutine | — |
| SBCD | Subtract Decimal with Extend | 8 |
| Scc | Set Conditionally | 8 |
| STOP | Stop | — |
| SUBA | Subtract Address | 16, 32 |
| SUBI* | Subtract Immediate | 8, 16, 32 |
| SUBQ* | Subtract Quick | 8, 16, 32 |
| SUBX | Subtract Extended | 8, 16, 32 |
| SWAP | Swap Register Halves | 16 → 16 |
| TAS | Test Operand, then Set | 8 |
| TRAP | Trap | — |
| TRAPV | Trap on Overflow | — |
| TST | Test Operand | 8, 16, 32 |
| TST | Test Operand | 8, 16, 32 |
| UNLK | Unlink | — |

APPENDIX G

| Line Number = Bits [15:12] |
|---|
| 0000 — Bit Manipulation/MOVEP/Immediate |
| 0001 — Move Byte |
| 0010 — Move Long |
| 0011 — Move Word |
| 0100 — Miscellaneous |
| 0101 — ADDQ/SUBQ/Scc |
| 0110 — Bcc |
| 0111 — MOVEQ/DCNT |
| 1000 — OR/DIV/SBCD |
| 1001 — SUB/SUBX |
| 1010 — (Unassigned, reserved) |
| 1011 — CMP/EOR |
| 1100 — AND/MUL/ABCD/EXG |
| 1101 — ADD/ADDX |
| 1110 — Shift/Rotate |
| 1111 — (Unassigned, reserved) |

Dynamic Bit

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | Register | | | 1 | Type | | Effective Address | | | | | |

Static Bit

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 1 | 0 | 0 | 0 | Type | | Effective Address | | | | | |

Bit Type Codes: TST = 00, CHG = 01, SET = 10, CLR = 11

MOVEP

| 0 | 0 | 0 | 0 | Register | | | Op-Mode | | | 0 | 0 | 1 | Register | | |
|---|---|---|---|---|---|---|---|---|---|---|---|---|---|---|---|

OR Immediate

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | Size | | Effective Address | | | | | |

AND Immediate

| 0 | 0 | 0 | 0 | 0 | 0 | 1 | 0 | Size | | Effective Address | | | | | |
|---|---|---|---|---|---|---|---|---|---|---|---|---|---|---|---|

SUB Immediate

| 0 | 0 | 0 | 0 | 0 | 1 | 0 | 0 | Size | | Effective Address | | | | | |
|---|---|---|---|---|---|---|---|---|---|---|---|---|---|---|---|

ADD Immediate

| 0 | 0 | 0 | 0 | 0 | 1 | 1 | 0 | Size | | Effective Address | | | | | |
|---|---|---|---|---|---|---|---|---|---|---|---|---|---|---|---|

EOR Immediate

| 0 | 0 | 0 | 0 | 1 | 0 | 1 | 0 | Size | | Effective Address | | | | | |
|---|---|---|---|---|---|---|---|---|---|---|---|---|---|---|---|

CMP Immediage

| 0 | 0 | 0 | 0 | 1 | 1 | 0 | 0 | Size | | Effective Address | | | | | |
|---|---|---|---|---|---|---|---|---|---|---|---|---|---|---|---|

MOVE Byte

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 1 | | Destination | | | | | Source | | | | | |
| | | | | | Register | | | Mode | | Mode | | | Register | | |

MOVE Long

| 0 | 0 | 1 | 0 | | Destination | | | | | Source | | | | | |
|---|---|---|---|---|---|---|---|---|---|---|---|---|---|---|---|
| | | | | | Register | | | Mode | | Mode | | | Register | | |

MOVE Word

| 0 | 0 | 1 | 1 | | Destination | | | | | Source | | | | | |
|---|---|---|---|---|---|---|---|---|---|---|---|---|---|---|---|
| | | | | | Register | | | Mode | | Mode | | | Register | | |

NEGX

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 0 | 0 | 0 | Size | | Effective Address | | | | | |

MOVE from SR

| 0 | 1 | 0 | 0 | 0 | 0 | 0 | 0 | 1 | | Effective Address | | | | | |
|---|---|---|---|---|---|---|---|---|---|---|---|---|---|---|---|

CLR

| 0 | 1 | 0 | 0 | 0 | 0 | 1 | 0 | Size | | Effective Address | | | | | |
|---|---|---|---|---|---|---|---|---|---|---|---|---|---|---|---|

NEG

| 0 | 1 | 0 | 0 | 0 | 1 | 0 | 0 | Size | | Effective Address | | | | | |
|---|---|---|---|---|---|---|---|---|---|---|---|---|---|---|---|

MOVE to CC

| 0 | 1 | 0 | 0 | 0 | 1 | 0 | 0 | 1 | 1 | Effective Address | | | | | |
|---|---|---|---|---|---|---|---|---|---|---|---|---|---|---|---|

NOT

| 0 | 1 | 0 | 0 | 0 | 1 | 1 | 0 | Size | | Effective Address | | | | | |
|---|---|---|---|---|---|---|---|---|---|---|---|---|---|---|---|

MOVE to SR

| 0 | 1 | 0 | 0 | 0 | 1 | 1 | 0 | 1 | 1 | Effective Address | | | | | |
|---|---|---|---|---|---|---|---|---|---|---|---|---|---|---|---|

NBCD

| 0 | 1 | 0 | 0 | 1 | 0 | 0 | 0 | 0 | 0 | Effective Address | | | | | |
|---|---|---|---|---|---|---|---|---|---|---|---|---|---|---|---|

PEA

| 0 | 1 | 0 | 0 | 1 | 0 | 0 | 0 | 0 | 1 | Effective Address | | | | | |
|---|---|---|---|---|---|---|---|---|---|---|---|---|---|---|---|

SWAP

| 0 | 1 | 0 | 0 | 1 | 0 | 0 | 0 | 0 | 1 | 0 | 0 | 0 | Register | | |
|---|---|---|---|---|---|---|---|---|---|---|---|---|---|---|---|

MOVEM Registers to EA

| 0 | 1 | 0 | 0 | 1 | 0 | 0 | 0 | 1 | Sz | Effective Address | | | | | |
|---|---|---|---|---|---|---|---|---|---|---|---|---|---|---|---|

EXT

| 0 | 1 | 0 | 0 | 1 | 0 | 0 | 0 | 1 | Sz | 0 | 0 | 0 | Register | | |
|---|---|---|---|---|---|---|---|---|---|---|---|---|---|---|---|

TST

| 0 | 1 | 0 | 0 | 1 | 0 | 1 | 0 | Size | | Effective Address | | | | | |
|---|---|---|---|---|---|---|---|---|---|---|---|---|---|---|---|

TAS

| 0 | 1 | 0 | 0 | 1 | 0 | 1 | 0 | 1 | 1 | Effective Address | | | | | |
|---|---|---|---|---|---|---|---|---|---|---|---|---|---|---|---|

MOVEM EA to Registers

| 0 | 1 | 0 | 0 | 1 | 1 | 0 | 0 | 1 | Sz | Effective Address | | | | | |
|---|---|---|---|---|---|---|---|---|---|---|---|---|---|---|---|

TRAP

| 0 | 1 | 0 | 0 | 1 | 1 | 1 | 0 | 0 | 1 | 0 | 0 | Vector | | | |
|---|---|---|---|---|---|---|---|---|---|---|---|---|---|---|---|

LINK

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 0 | 1 | 0 | Register | | |

UNLK

| 0 | 1 | 0 | 0 | 1 | 1 | 1 | 0 | 0 | 1 | 0 | 1 | 1 | Register | | |
|---|---|---|---|---|---|---|---|---|---|---|---|---|---|---|---|

MOVE USP

| 0 | 1 | 0 | 0 | 1 | 1 | 1 | 0 | 0 | 1 | 1 | 0 | dr | Register | | |
|---|---|---|---|---|---|---|---|---|---|---|---|---|---|---|---| dr (direction): 0 — to USP, 1 — from USP

RESET

| 0 | 1 | 0 | 0 | 1 | 1 | 1 | 0 | 0 | 1 | 1 | 1 | 0 | 0 | 0 | 0 |
|---|---|---|---|---|---|---|---|---|---|---|---|---|---|---|---|

NOP

| 0 | 1 | 0 | 0 | 1 | 1 | 1 | 0 | 0 | 1 | 1 | 1 | 0 | 0 | 0 | 1 |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |

STOP

| 0 | 1 | 0 | 0 | 1 | 1 | 1 | 0 | 0 | 1 | 1 | 1 | 0 | 0 | 1 | 0 |
|---|---|---|---|---|---|---|---|---|---|---|---|---|---|---|---|

RTE

| 0 | 1 | 0 | 0 | 1 | 1 | 1 | 0 | 0 | 1 | 1 | 1 | 0 | 0 | 1 | 1 |
|---|---|---|---|---|---|---|---|---|---|---|---|---|---|---|---|

RTS

| 0 | 1 | 0 | 0 | 1 | 1 | 1 | 0 | 0 | 1 | 1 | 1 | 0 | 1 | 0 | 1 |
|---|---|---|---|---|---|---|---|---|---|---|---|---|---|---|---|

TRAPV

| 0 | 1 | 0 | 0 | 1 | 1 | 1 | 0 | 0 | 1 | 1 | 1 | 0 | 1 | 1 | 0 |
|---|---|---|---|---|---|---|---|---|---|---|---|---|---|---|---|

RTR

| 0 | 1 | 0 | 0 | 1 | 1 | 1 | 0 | 0 | 1 | 1 | 1 | 0 | 1 | 1 | 1 |
|---|---|---|---|---|---|---|---|---|---|---|---|---|---|---|---|

JSR

| 0 | 1 | 0 | 0 | 1 | 1 | 1 | 0 | 1 | 0 | Effective Address |
|---|---|---|---|---|---|---|---|---|---|---|

JMP

| 0 | 1 | 0 | 0 | 1 | 1 | 1 | 0 | 1 | 1 | Effective Address |
|---|---|---|---|---|---|---|---|---|---|---|

MOVEP

| 0 | 1 | 0 | 0 | Data Register | Op-Mode | 0 | 0 | 1 | Addr Register |
|---|---|---|---|---|---|---|---|---|---|

CHK

| 0 | 1 | 0 | 0 | Register | 1 | 1 | 0 | Effective Address |
|---|---|---|---|---|---|---|---|---|

LEA

| 0 | 1 | 0 | 0 | Register | 1 | 1 | 1 | Effective Address |
|---|---|---|---|---|---|---|---|---|

ADDQ

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 1 | Data | 0 | Size | Effective Address |

SUBQ

| 0 | 1 | 0 | 1 | Data | 1 | Size | Effective Address |
|---|---|---|---|---|---|---|---|

Scc

| 0 | 1 | 0 | 1 | Condition | 1 | 1 | Effective Address |
|---|---|---|---|---|---|---|---|

Bcc

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 1 | 0 | Condition | 8-bit Displacement |

MOVEQ

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 1 | 1 | Register | 0 | Data |

DCNT (Displacement is always negative)

| 0 | 1 | 1 | 1 | Register | 1 — Displacement |
|---|---|---|---|---|---|

OR

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 0 | Register | Op-Mode | Effective Address |

DIVU

| 1 | 0 | 0 | 0 | Register | 0 | 1 | 1 | Effective Address |
|---|---|---|---|---|---|---|---|---|

DIVS

| 1 | 0 | 0 | 0 | Register | 1 | 1 | 1 | Effective Address |
|---|---|---|---|---|---|---|---|---|

SBCD

| 1 | 0 | 0 | 0 | Dest'n Register | 1 | 0 | 0 | 0 | 0 | R/M | Source Register |
|---|---|---|---|---|---|---|---|---|---|---|---|

R/M (register/memory): register - register = 0, memory - memory = 1

SUB
SUBA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 1 | \multicolumn{3}{c}{Register} | \multicolumn{3}{c}{Op-Mode} | \multicolumn{6}{c}{Effective Address} |

SUBX

| 1 | 0 | 0 | 1 | Dest'n Register | | | 1 | Size | | 0 | 0 | R/M | Source Register | | |

R/M (register/memory): register - register = 0, memory - memory = 1

CMP
CMPA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 1 | 1 | Register | | | Op-Mode | | | Effective Address | | | | | |

EOR

| 1 | 0 | 1 | 1 | Register | | | 1 | Size | | Effective Address | | | | | |

CMPM

| 1 | 0 | 1 | 1 | Register | | | 1 | Size | | 0 | 0 | 1 | Register | | |

AND

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Register | | | Op-Mode | | | Effective Address | | | | | |

MULU

| 1 | 1 | 0 | 0 | Register | | | 0 | 1 | 1 | Effective Address | | | | | |

MULS

| 1 | 1 | 0 | 0 | Register | | | 1 | 1 | 1 | Effective Address | | | | | |

ABCD

| 1 | 1 | 0 | 0 | Dest'n Register | | | 1 | 0 | 0 | 0 | 0 | R/M | Source Register | | |

R/M (register/memory): register - register = 0, memory - memory = 1

EXGD

| 1 | 1 | 0 | 0 | Data Register | | | 1 | 0 | 1 | 0 | 0 | 0 | Data Register | | |

EXGM

| 1 | 1 | 0 | 0 | Data Register | | | 1 | 0 | 1 | 0 | 0 | 1 | Address Register | | |

EXGA

| 1 | 1 | 0 | 0 | Address Register | | | 1 | 1 | 0 | 0 | 0 | 1 | Address | | |

ADD
ADDA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 1 | Register | | | Op-Mode | | | Effective Address | | | | | |

ADDX

| 1 | 1 | 0 | 1 | Dest'n Register | | | 1 | Size | | 0 | 0 | R/M | Source Register | | |

R/M (register/memory): register - register = 0, memory - memory = 1

Data Register Shifts

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 0 | Count/Register | | | d | Size | | i/r | Type | | Register | | |

Memory Shifts

| 1 | 1 | 1 | 0 | 0 | Type | | d | 1 | 1 | Effective Address | | | | | |

Shift Type Codes: AS = 00, LS = 01, ROX = 10, RO = 11 d (direction): Right = 0, Left = 1 i/r (count source): Immediate Count = 0, Register Count = 1

We claim:

1. A data processor using microprogrammed control to execute a plurality of macroinstructions, the data processor comprising:
   a. first means for storing a macroinstruction;
   b. control means for storing a plurality of microinstruction routines, each of the microinstruction routines including one or more microinstructions for controlling operations performed by the data processor, and each of the microinstruction routines being associated with a corresponding starting address; and
   c. decoding means coupled to the first means and to the control means, the decoding means being responsive to a field of the macroinstruction stored by the first means for providing simultaneously a plurality of possible starting addresses associated with the execution of the stored macroinstruction, said decoding means being effective to selectively and sequentially present each of the plurality of starting addresses to the control means to cause each of the microinstruction routines associated with addresses provided by the decoding means to be executed in order to execute the stored macroinstruction.

2. A data processor as recited in claim 1 wherein the microinstructions included within each microinstruction routine are utilized by the data processor in a sequential manner, each of the microinstruction routines including a starting microinstruction which is utilized before other microinstructions in the microinstruction routine such that each starting address provided by the decoding means corresponds to an address in the control means at which the starting microinstruction is stored for each associated microinstruction routine.

3. A data processor as recited in claim 2 further comprising addressing means coupled to the decoding means for receiving the starting addresses provided by the decoding means and being coupled to the control means for selecting the microinstruction to be utilized next in sequence by the data processor.

4. A data processor for performing operations upon digital information according to a plurality of instructions, executable by the data processor comprising:
   (a) first means for storing an instruction;
   (b) decoding means coupled to the first means and responsive to the instruction stored by the first means for simultaneously generating a plurality of output words;
   (c) control means having an input port for receiving an input word, the control means being responsive to the input word for providing an output control word for controlling execution of the instruction stored by the first means, the control means also being responsive to the input word for providing at least one selection signal; and
   (d) selection means coupled to the decoding means for receiving the plurality of output words generated by the decoding means and coupled to the input port of the control means for providing the input word to the control means, the selection means being responsive to the at least one selection signal provided by the control means for selecting one of the plurality of output words generated by the decoding means as the input word provided to the control means.

5. A data processor as recited in claim 4 wherein: the control means comprises a microprogram storage means having addressing means responsive to the input word received by the input port of the control means for selecting one of a plurality of microprogram words stored by the microprogram storage means, the microprogram storage means deriving the output control word and the at least one selection signal from the selected microprogram word.

6. A data processor for performing operations upon digital information acording to a plurality of instructions, executable by the data processor comprising:
   (a) an instruction register for storing an instruction;
   (b) a first decoder coupled to the instruction register and responsive to the stored instruction for providing a first word;
   (c) a second decoder coupled to the instruction register and responsive to the stored instruction for providing at least a second word;
   (d) control means having an input port for receiving an input word, the control means being responsive to the input word for providing an output control word for controlling execution of the instruction stored by the instruction register, the control means also being responsive to the input word for providing at least one selection signal; and
   (e) selection means coupled to the first and second decoders for receiving simultaneously the first and at least second words, respectively, the selection means also being coupled to the input port of the control means for providing the input word to the control means, the selection means being responsive to the at least one selection signal provided by the control means for selecting the first or at least second words as the input words provided to the control means.

7. A data processor as recited in claim 6 wherein: the control means comprises a microprogram storage means having addressing means responsive to the input word received by the input port of the control means for selecting one of a plurality of microprogram words stored by the microprogram storage means, the microprogram storage means deriving the output control word and the at least one selection signal from the selected microprogram word.

8. A data processor as recited in claim 7, wherein: the control means derives the at least one selection signal from a first microprogram word which is selected during a first time period, and the selection means is responsive to the at least one selection signal during a second time period subsequent to the first time period for selecting a second microprogram word.

9. A data processor as recited in claim 7 further comprising: a third decoder coupled to the selection means for providing a third word to the selection means, the third decoder being responsive to predetermined conditions for generating a substitution signal, the selection means being responsive to the substitution signal for selecting said third word as the input word provided to said control means.

10. A data processor as recited in claim 9 wherein: the third decoder is coupled to the instruction register for receiving the stored instruction, the third decoder being adapted to identify at least one instruction as one of the predetermined conditions.

11. A method of controlling a data processor adapted to execute a plurality of macroinstructions, the data processor including a microprogrammed control storage containing a plurality of microinstruction routines, each of the microinstruction routines including a plurality of microwords, the method comprising the steps of:
- (a) receiving a macroinstruction and storing the macroinstruction in an instruction register;
- (b) decoding the macroinstruction and providing a plurality of decoded words as a function of the particular macroinstruction;
- (c) selecting a first of the plurality of decoded words;
- (d) addressing the microprogrammed control storage with the selected first of the plurality of decoded words for selecting one of the plurality of microinstruction routines;
- (e) deriving at least one selection signal from a microword in the selected microinstruction routine;
- (f) selecting a second of the plurality of decoded words in response to the at least one selection signal; and
- (g) addressing the microprogrammed control storage with the selected second of the plurality of decoded words for selecting one of the plurality of microinstruction routines.

* * * * *

UNITED STATES PATENT AND TRADEMARK OFFICE
CERTIFICATE OF CORRECTION

PATENT NO. : 4,342,078
DATED : July 27, 1982
INVENTOR(S) : Harry L. Tredennick et al It is certified that error appears in the above-identified patent and that said Letters Patent are hereby corrected as shown below:

In column 71, claim 4, line 45, insert --, the data processor-- between processor and comprising; and In column 72, claim 6, line 12, insert --, the data processor-- between processor and comprising.

Signed and Sealed this

Twenty-first Day of February 1984

[SEAL]

Attest:

*Attesting Officer*

GERALD J. MOSSINGHOFF
*Commissioner of Patents and Trademarks*